(12) United States Patent
Lakkis

(10) Patent No.: US 8,351,521 B2
(45) Date of Patent: Jan. 8, 2013

(54) MULTI-RESOLUTION BEAMFORMING BASED ON CODEBOOKS IN MIMO SYSTEMS

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 12/405,020

(22) Filed: Mar. 16, 2009

(65) Prior Publication Data

US 2009/0232245 A1 Sep. 17, 2009

Related U.S. Application Data

(60) Provisional application No. 61/037,139, filed on Mar. 17, 2008.

(51) Int. Cl.
*H04K 1/10* (2006.01)
*H04L 27/28* (2006.01)

(52) U.S. Cl. .......................... 375/260; 375/295; 375/316

(58) Field of Classification Search .................. 375/260, 375/267, 295, 316
See application file for complete search history.

(56) References Cited

U.S. PATENT DOCUMENTS

| | | | |
|---|---|---|---|
| 5,708,441 A | 1/1998 | Kanai | |
| 7,095,987 B2 | 8/2006 | Brothers, Jr. et al. | |
| 7,103,386 B2 | 9/2006 | Hoffmann et al. | |
| 7,180,956 B1 | 2/2007 | Banister | |
| 7,190,956 B2 | 3/2007 | Dorenbosch et al. | |
| 7,602,745 B2 | 10/2009 | Lin et al. | |
| 7,630,339 B2 * | 12/2009 | Laroia et al. | 370/330 |
| 2002/0068590 A1 | 6/2002 | Suzuki et al. | |
| 2006/0116092 A1 | 6/2006 | Uno et al. | |
| 2007/0099666 A1 * | 5/2007 | Astely et al. | 455/562.1 |
| 2007/0113159 A1 | 5/2007 | Lakkis | |
| 2008/0134254 A1 | 6/2008 | Xia et al. | |
| 2008/0304464 A1 * | 12/2008 | Borkar et al. | 370/342 |
| 2009/0046798 A1 | 2/2009 | Xia et al. | |
| 2009/0086842 A1 | 4/2009 | Shi et al. | |
| 2009/0121936 A1 | 5/2009 | Maltsev et al. | |
| 2009/0232240 A1 | 9/2009 | Lakkis | |
| 2009/0238156 A1 | 9/2009 | Yong et al. | |
| 2009/0296788 A1 | 12/2009 | Hottinen | |
| 2012/0114064 A1 | 5/2012 | Kotecha et al. | |

FOREIGN PATENT DOCUMENTS

| | | |
|---|---|---|
| EP | 1267501 A2 | 12/2002 |
| EP | 1701466 A1 | 9/2006 |
| EP | 1850507 A2 | 10/2007 |
| EP | 1912347 A1 | 4/2008 |
| EP | 2073471 A1 | 6/2009 |
| JP | 8331040 A | 12/1996 |
| JP | 9247063 A | 9/1997 |
| JP | 2002232350 A | 8/2002 |

(Continued)

OTHER PUBLICATIONS

Written Opinion—PCT/US2009/037426, International Search Authority, European Patent Office, Dec. 4, 2009.

(Continued)

*Primary Examiner* — Sam K Ahn
*Assistant Examiner* — Freshteh N Aghdam
(74) *Attorney, Agent, or Firm* — Dang M. Vo

(57) ABSTRACT

Certain aspects of the present disclosure relate to methods for beamforming that achieve beamforming optimality criterions. Some proposed beamforming techniques are based on antenna directions with multiple resolutions.

22 Claims, 41 Drawing Sheets

FOREIGN PATENT DOCUMENTS

| | | |
|---|---|---|
| JP | 2006148928 A | 6/2006 |
| JP | 2007318728 A | 12/2007 |
| JP | 2007318729 A | 12/2007 |
| WO | WO 0178254 A1 | 10/2001 |
| WO | 03023995 A1 | 3/2003 |
| WO | WO 2007096821 | 8/2007 |
| WO | WO 2008023311 | 2/2008 |

OTHER PUBLICATIONS

Fumihide Kojima et al: "Necessary Modificaitons on Conventional IEEE802.15.3b MAC to Achieve IEEE802.15.3c Millimeter Wave WPAN" IEEE International Symposium on Personal, Indoor and Mobile Radio Communications. PIMRC, IEEE; PI, XX, Sep. 1, 2007, pp. 1-5, XP031168693.

"International Search Report—PCT/US2009/037421- International Search Authority, European Patent Office, Oct. 9, 2009".

International Search Report—PCT/US2009/037426- International Search Authority, European Patent Office, Dec. 4, 2009.

Lakkis I. et al: "IEEE 802.15-0760-03-003c mmWave OFDM Physical Layer Proposal" IEEE 802.15 TG3C, Sep. 19, 2007, pp. 1-75, XP002507726.

Penfei Xia et al: "Short Range Gigabit Wireless Communications Systems: Potentials, Challenges and Techniques" Ultra-Wideband, 2007. ICUWB 2007. IEEE International Conference on, IEEE, PI, Sep. 1, 2007, pp. 123-128, XP031159333.

Philips, "System-level simulation results for channel vector quantisation feedback for MU-MIMO" 3GPP Draft; R1-063028, (Nov. 2, 2006), XP050103495, Sophia-Antipolis, FR [retrieved on Nov. 2, 2006].

Samsung, "Downlink MIMO for EUTRA" 3GPP Draft; R1-060335, (Feb. 9, 2006), XP050101282, Sophia-Antipolis, FR [retrieved on Feb. 9, 2006].

Ericsson: "Precoding Considerations in LTE MIMO Downlink", 3GPP TSG-RAN WG1 #47bis, R1-070466, Jan. 15-19, 2007.

ETRI: "Multiuser Precoding MIMO for E-UTRA Downlink", 3GPP TSG RAN WG1 Meeting #42, R1-050809, Sep. 2, 2005.

NTT DoCoMo et al., "Dedicated Reference Signal for Beam-forming in E-UTRA Downlink", 3GPP TSG RAN WG1 Meeting #47bis, R1-070089, Jan. 19, 2007.

QUALCOMM Europe: "D-TxAA for MIMO in Rel-7", 3GPP TSG-RAN WG1 #44bis, R1-060938, Oct. 14, 2005.

\* cited by examiner

| 1b | 1b | 2b | 4b | 4b | 2b | 2b |
|---|---|---|---|---|---|---|
| Tracking support | PET | Antenna array type | # Rx sectors | # Tx sectors | # Rx Q-omni directions | # Tx Q-omni directions |

FIG. 10

| Sector training cycle # 0 | ... | Sector training cycle # $J^{(1,t)}-1$ |

DEV1 → DEV2

FIG. 14A

| Sector training cycle # 0 | ... | Sector training cycle # $J^{(2,t)}-1$ |

DEV2 → DEV1

FIG. 14B

| Feedback message # 0 $S_0^{(1,t)} \rightarrow S_j^{(2,r)}$ | ... | Feedback message # $j^{(1,t)}-1$ $S_{j^{(1,t)}}^{(1,t)} \rightarrow S_j^{(2,r)}$ |

DEV1 → DEV2

FIG. 14C

| Feedback message $S_{j^{(2,t)}}^{(2,t)} \rightarrow S_j^{(1,r)}$ |

DEV2 → DEV1

FIG. 14D

DEV1 → DEV2

| Sector training cycle # $J^{(1)}-1$ | ... | Sector training cycle # 1 | Sector training cycle # 0 |

FIG. 16A

DEV2 → DEV1

| Feedback message # $J^{(1)}-1$ $S_j^{(2)} \to S_{J^{(1)}-1}^{(1)}$ | ... | Feedback message # $j^{(1)}$ $S_j^{(2)} \to S_j^{(1)}$ | ... | Feedback message # 0 $S_j^{(2)} \to S_0^{(1)}$ |

FIG. 16B

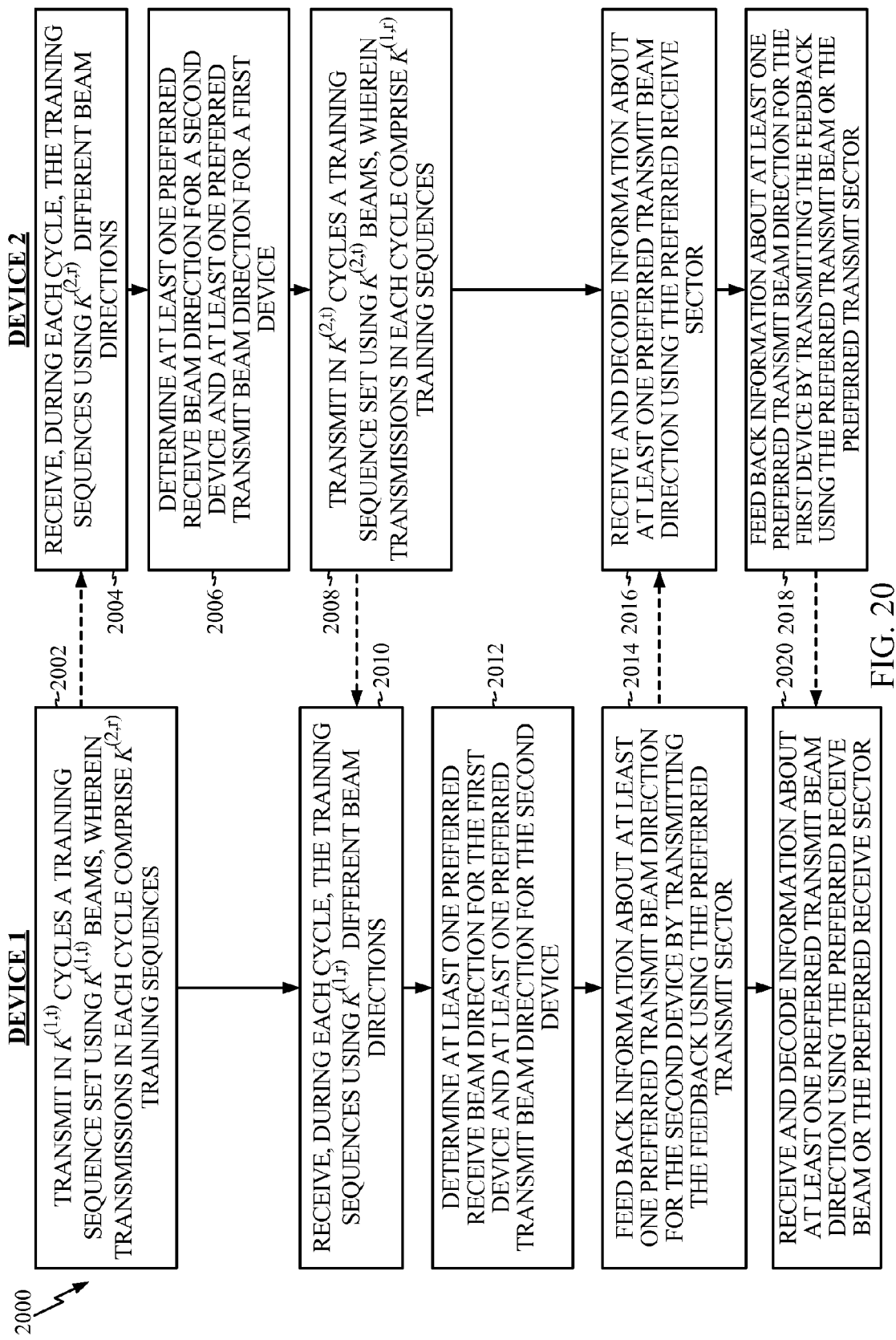

DEV1 → DEV2

| Beam training cycle # 0 | ⋯ | Beam training cycle # $K^{(1,t)}$-1 |

FIG. 21A

DEV2 → DEV1

| Beam training cycle # 0 | ⋯ | Beam training cycle # $K^{(2,t)}$-1 |

FIG. 21B

DEV1 → DEV2

| Feedback message $S_j^{(1,t)} \to S_j^{(2,r)}$ |

FIG. 21C

DEV2 → DEV1

| Feedback message $B_k^{(2,t)} \to B_k^{(1,r)}$ |

FIG. 21D

MULTI-RESOLUTION BEAMFORMING BASED ON CODEBOOKS IN MIMO SYSTEMS

CLAIM OF PRIORITY UNDER 35 U.S.C. §119

This application claims benefit of U.S. Provisional Patent Application Ser. No. 61/037,139, filed Mar. 17, 2008, and assigned to the assignee hereof and hereby expressly incorporated by reference herein.

CROSS REFERENCE TO RELATED APPLICATIONS

The present Application is related by subject matter to Ser. No. 12/404,994, entitled "MULTI-RESOLUTION BEAMFORMING IN MIMO SYSTEMS" filed herewith and assigned to the assignee hereof and hereby expressly incorporated by reference herein.

TECHNICAL FIELD

Certain aspects of the present disclosure generally relate to wireless communication and, more particularly, to beamforming of a transmission signal.

BACKGROUND

A dual-mode ultra-wideband (UWB) Physical Layer (PHY) supporting single carrier and Orthogonal Frequency Division Multiplexing (OFDM) modulation can employ a common mode. The UWB PHY may be used for millimeter wave (e.g., with carrier frequency of 60 GHz) communications. The common mode is a single-carrier mode used by both single-carrier and OFDM devices for beaconing, network-control signaling, and base-rate data communications. The common mode is typically necessary for interoperability between different devices and different networks.

Millimeter-wave communications may also employ beamforming on one or more antennas in order to provide both spatial diversity and array gains. A multitude of antenna configurations such as single antenna element, sectored antennas, switched antennas, and 1-dimensional (1-D) and 2-dimensional (2-D) antenna arrays may support beamforming. Conventional beamforming, such as Eigen-beamforming, requires channel state information matrices or beamforming matrices to be fed back to the transmitting array. The Institute of Electrical and Electronics Engineers (IEEE) 802.11n standard specifies feedback information that includes row and column sizes of feedback matrices, subcarrier grouping size (e.g., cluster size), quantization bit size, and an array of actual quantized data elements starting from the lowest subcarrier index to the highest subcarrier index. For the purpose of beamforming that employs preceding matrices, the feedback information can be reduced by replacing contents of beamforming matrix with indices of a precoding-matrix codebook.

Two types of beamforming protocols are considered: an on-demand beamforming and a pro-active beamforming. On-demand beamforming may be used between two devices (DEVs) or between a piconet controller (PNC) and a device (DEV) and may occur in a channel time allocation (CTA) period allocated to the DEV for the purpose of beamforming. Pro-active beamforming may be used when the PNC is a source of data to one or multiple DEVs. This protocol may allow multiple DEVs to train their own receiver antennas for preferred reception from the PNC with a lower overhead.

Two beamforming optimality criteria are considered: a beam switching (steering) and tracking (BST) criterion suitable for all antenna configurations, and pattern estimation and tracking (PET) option for 1-D linear antenna arrays and 2-D planar antenna arrays. All DEVs that support the PET method may support the BST criterion. The PET criterion may be used only if the to DEVs that form a communication link support it. The BST is based on selecting the preferred beam from a given set of beams, whereas the PET is based on finding the preferred beam former and combiner vectors (i.e., antenna weights) that do not necessarily fail into a given set of beam directions.

Therefore, there is a need in the art for methods to efficiently achieve beamforming optimality criteria.

SUMMARY

Certain aspects provide a method for wireless communications. The method generally includes receiving training signals using a first subset of a first set of codebooks, employing a second subset of the first set of codebooks to acquire channel state information (CSI), wherein the second subset is same or different than the first subset, estimating a first preferred vector of coefficients from the first subset and a second preferred vector of coefficients from the second subset, providing, as a feedback to a device, the first preferred vector of coefficients and the second preferred vector of coefficients, and using the first preferred vector of coefficients and the second preferred vector of coefficients to communicate with the device on a transmit direction from a first set of transmit directions.

Certain aspects provide an apparatus for wireless communications. The apparatus generally includes a receiver for receiving training signals using a first subset of a first set of codebooks, a circuit for employing a second subset of the first set of codebooks to acquire channel state information (CSI), wherein the second subset is same or different than the first subset, an estimator for estimating a first preferred vector of weights from the first subset and a second preferred vector of weights from the second subset, a circuit for providing, as a feedback to a device, the first preferred vector of weights, and a circuit for using the second preferred vector of weights to communicate with the device on a receive direction from a set of receive directions.

Certain aspects provide an apparatus for wireless communications. The apparatus generally includes means for receiving training signals using a first subset of a first set of codebooks, means for employing a second subset of the first set of codebooks to acquire channel state information (CSI), wherein the second subset is same or different than the first subset, means for estimating a first preferred vector of weights from the first subset and a second preferred vector of weights from the second subset, means for providing, as a feedback to a device, the first preferred vector of weights, and means for using the second preferred vector of weights to communicate with the device on a receive direction from a set of receive directions.

Certain aspects provide a computer-program product for wireless communications. The computer-program product includes a computer readable medium encoded with instructions executable to receive training signals using a first subset of a first set of codebooks, employ a second subset of the first set of codebooks to acquire channel state information (CSI), wherein the second subset is same or different than the first subset, estimate a first preferred vector of weights from the first subset and a second preferred vector of weights from the second subset, provide, as a feedback to a device, the first preferred vector of weights, and use the second preferred vector of weights to communicate with the device on a receive direction from a set of receive directions.

Certain aspects provide an access point. The access point generally includes at least one antenna, a receiver for receiving via the at least one antenna training signals using a first subset of a first set of codebooks, a circuit for employing a second subset of the first set of codebooks to acquire channel state information (CSI), wherein the second subset is same or different than the first subset, an estimator for estimating a first preferred vector of weights from the first subset and a second preferred vector of weights from the second subset, a circuit for providing, as a feedback to a device, the first preferred vector of weights, and a circuit for using the second preferred vector of weights to communicate with the device on a receive direction from a set of receive directions.

Certain aspects provide a method for wireless communications. The method generally includes transmitting training signals using a first subset of a first set of codebooks, receiving, as a feedback from a device, a first preferred vector of weights, and using the first preferred vector of weights to communicate with the device on a transmit direction from a first set of transmit directions.

Certain aspects provide an apparatus for wireless communications. The apparatus generally includes a transmitter for transmitting training signals using a first subset of a first set of codebooks, a receiver for receiving, as a feedback from a device, a first preferred vector of weights, and a circuit for using the first preferred vector of weights to communicate with the device on a transmit direction from a first set of transmit directions.

Certain aspects provide an apparatus for wireless communications. The apparatus generally includes means for transmitting training signals using a first subset of a first set of codebooks, means for receiving, as a feedback from a device, a first preferred vector of weights, and means for using the first preferred vector of weights to communicate with the device on a transmit direction from a first set of transmit directions.

Certain aspects provide a computer-program product for wireless communications. The computer-program product includes a computer readable medium encoded with instructions executable to transmit training signals using a first subset of a first set of codebooks, receive, as a feedback from a device, a first preferred vector of weights, and use the first preferred vector of weights to communicate with the device on a transmit direction from a first set of transmit directions.

Certain aspects provide an access point. The access point generally includes at least one antenna, a transmitter for transmitting via the at least one antenna training signals using a first subset of a first set of codebooks, a receiver for receiving via the at least one antenna, as a feedback from a device, a first preferred vector of weights; and a circuit for using the first preferred vector of weights to communicate with the device on a transmit direction from a first set of transmit directions.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10 illustrates a structure of beamforming capability information element (IE) in accordance with certain aspects of the present disclosure.

FIGS. 14A-14D illustrate frame structures used for determining preferred sectors in the AAS in accordance with certain aspects of the present disclosure.

FIGS. 16A-16B illustrate frame structures used for determining preferred sectors in the SAS in accordance with certain aspects of the present disclosure.

FIG. 20 illustrates example operations for determining preferred beams in the AAS in accordance with certain aspects of the present disclosure.

FIGS. 21A-21D illustrate frame structures used for determining preferred beams in the AAS in accordance with certain aspects of the present disclosure.

DETAILED DESCRIPTION

Figure 1:
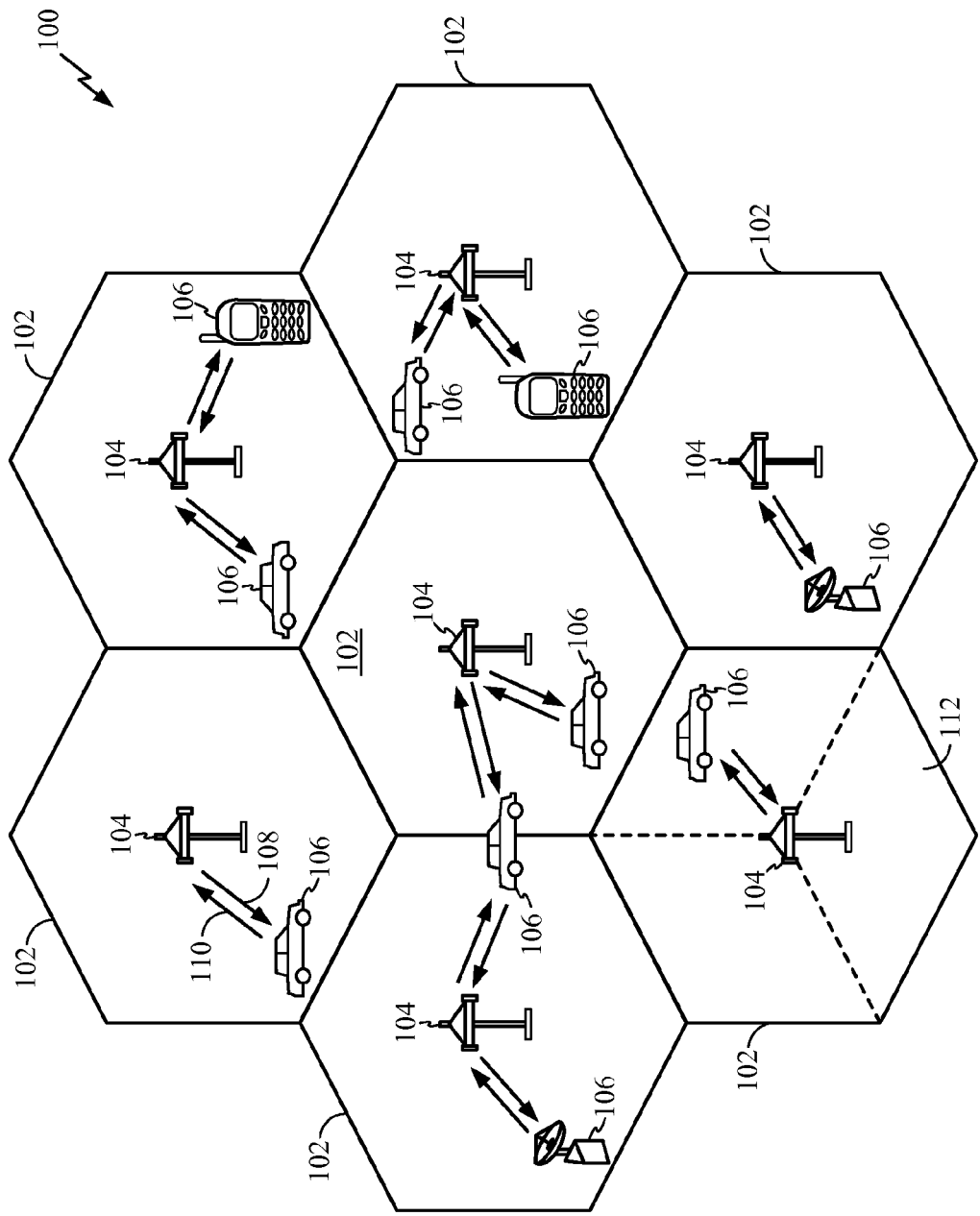
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Accordingly, while the aspects of the present disclosure are susceptible to various modifications and alternative forms, specific exemplary aspects thereof are shown by way of example in the drawings and will herein be described in detail. It should be understood, however, that there is no intent to limit the disclosure to the particular forms disclosed, but on the contrary, the disclosure is intended to cover all modifications, equivalents, and alternatives falling within the scope of the disclosure. Like numbers may refer to like elements throughout the description of the figures.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality and procedures involved.

An Example Wireless Communication System

The techniques described herein may be used for various broadband wireless communication systems, including communication systems that are based on a single carrier transmission or based on an Orthogonal Frequency Division Multiplexing (OFDM). Aspects disclosed herein may be advantageous to systems employing Ultra Wide Band (UWB) signals including millimeter-wave signals, wherein a beamforming may be accomplished using a common mode, i.e., using a single carrier. However, the present disclosure is not intended to be limited to such systems, as other coded signals may benefit from similar advantages.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as a piconet controller (PNC), an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with UWB techniques. If this is the case, the wireless communication system 100 may be referred to as an UWB system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
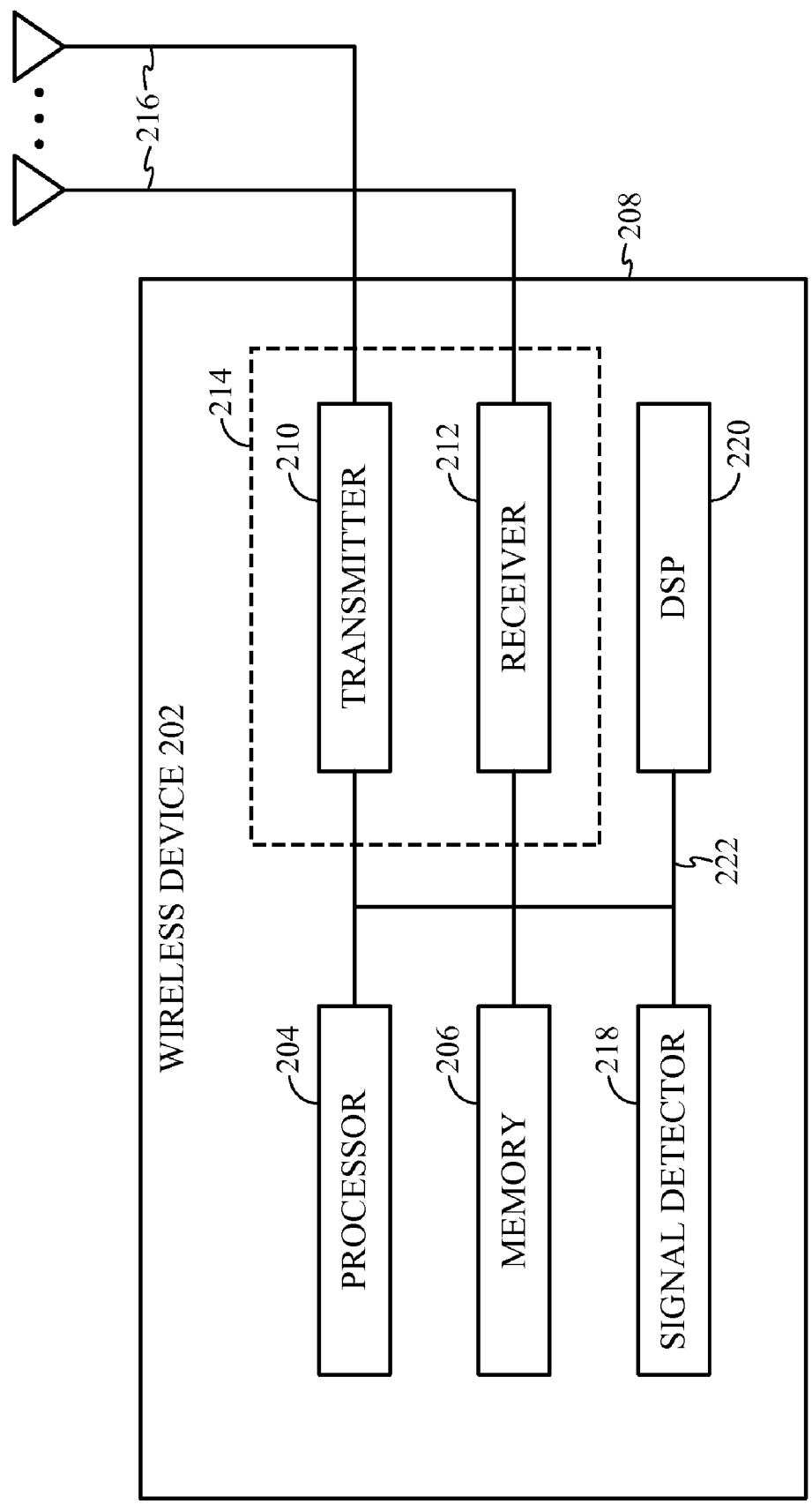
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Beamforming System Model

Figure 3:
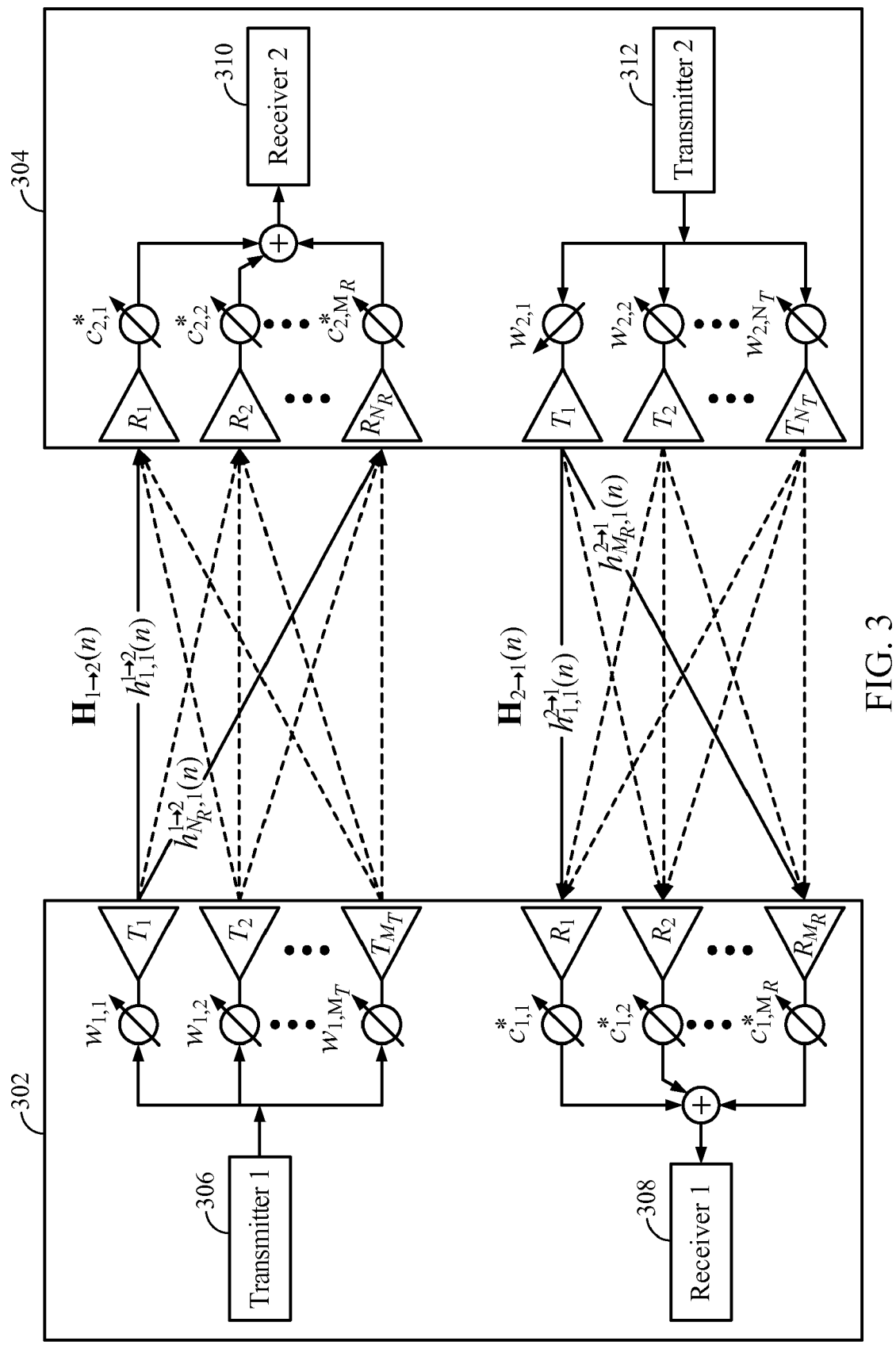
FIG. 3 illustrates a block diagram of an Asymmetric Antenna System (AAS) in accordance with certain aspects of the present disclosure.

A transceiver that employs the same antenna(s) for both transmission and reception, while a multipath channel to another transceiver is reciprocal, is referred to as a Symmetric Antenna System (SAS). A transceiver that employs one set of antennas for transmission and another set of antennas for reception or the multipath channel to another transceiver is not reciprocal is referred to as an Asymmetric Antenna System (AAS). FIG. 3 illustrates a block diagram of the AAS. A first transceiver 302 employs $M_T$ transmit antennas and $M_R$ receive antennas. A second transceiver 304 employs $N_T$ transmit antennas and $N_R$ receive antennas.

Channel model $H_{1\to 2}$ may be used to express the propagation environment when the first transceiver 302 transmits signals to the second transceiver 304. Similarly, channel model $H_{2\to 1}$ may express the propagation environment when the transceiver 304 transmits signals received by the transceiver 302. The channel models may be used to express any of the possible antenna configurations that may be employed in the related art. Furthermore, the channel models may be used to express different transmission protocols. In one aspect of the present disclosure, OFDM signaling with a cyclic prefix and a fast Fourier transform (FFT) of N subcarriers may employ the same channel model as a transmission that is Single Carrier (SC) with a cyclic prefix having a burst length N. In such cases, it is typical to assume that the cyclic prefix is longer than any multipath delay spread between any transmit-receive pair of antenna elements.

An OFDM symbol stream or SC burst x(t) generated at the first transceiver 302 may be expressed as:

$$x(t) = \sum_{k=0}^{N-1} s_k \delta(t - kT_c), \quad (1)$$

where $T_c$ is a sample (or chip) duration, and $s_k$ represents the complex data. The symbol stream may be modulated by a beamforming vector of weights $w=[_{1,1}, w_{1,2}, \ldots, w_{1,M_T}]^T$ prior to being transmitted into a communication channel.

A multiple input multiple output (MIMO) channel may be expressed by a frequency domain Channel State Information (CSI) at an arbitrary $n^{th}$ frequency bin such as:

$$H_{1\to 2}(n) \in C^{M_T \times N_R}, \quad (2)$$

$$H_{1\to 2}(n) = \begin{bmatrix} h_{1,1}^{1\to 2}(n) & h_{1,2}^{1\to 2}(n) & \ldots & h_{1,N_R}^{1\to 2}(n) \\ h_{2,1}^{1\to 2}(n) & h_{2,2}^{1\to 2}(n) & \ldots & h_{2,N_R}^{1\to 2}(n) \\ \vdots & \vdots & \ddots & \vdots \\ h_{M_T,1}^{1\to 2}(n) & h_{M_T,2}^{1\to 2}(n) & \ldots & h_{M_T,N_R}^{1\to 2}(n) \end{bmatrix}, \quad (3)$$

where terms $h_{i,j}(n)$ may include both transmit and receive filtering, along with the channel impulse response between the $j^{th}$ transmit antenna of the first transceiver 302 and the $i^{th}$ receive antenna of the second transceiver 304, $j=1, 2, \ldots, M_T$ and $i=1, 2, \ldots, N_R$.

Signals received at the second transceiver 304 may be processed with a combining vector of weights $c_2 = [c_{2,1}\, c_{2,2} \ldots c_{2,N_R}]^T$ in order to produce a combined baseband signal given by:

$$y(t) = c_2^H [\Sigma s_k \delta((t-kT_c) \otimes H_{1\to 2}(t)w_1 + b(t)], \quad (4)$$

where b(t) is an additive white Gaussian noise (AWGN) vector across receive antennas of the second transceiver 304.

The discrete channel model between a transmitter 306 of the first transceiver and a receiver 310 of the second transceiver may be expressed by a single input single output (SISO) channel as:

$$y_r = c_2^H \sum_{k=0}^{L-1} H_k s_{r-k} w_1 + c_2 b_i = \sum_{k=0}^{L-1} p_k s_{r-k} + b'_i, \quad (5)$$

where $p_k = c_2^H H_k w_1$ and i denotes the sample (or chip) index within an OFDM sample (or a single-carrier burst). The SISO channel may be characterized by a frequency response at frequency bins n=0, 1, ..., N−1 given by:

$$p_n = c_2^H H_{1\to 2}(n) w_1. \quad (6)$$

The discrete-frequency received signal model may be represented as:

$$Y_n = P_n S_n + B_n, \quad (7)$$

where $[S_0, S_1, \ldots, S_{N-1}]$ is the OFDM data symbol (or the FFT of the SC data burst), and $[B_0, B_1, \ldots, B_{N-1}]$ is the AWGN vector.

A channel model expressing the channel between a transmitter 312 of the second transceiver 304 to a receiver 308 of the first transceiver 302 may be given by:

$$Q_n = c_2^H H_{2 \to 1}(n) w_2. \quad (8)$$

For both OFDM and SC transmissions, the signal-to-noise ratio (SNR) on the $n^{th}$ subcarrier ($n=0, 1, \ldots, N-1$) in both directions of the AAS may be given by:

$$SNR_n^{1 \to 2} = \frac{E_s |P_n|^2}{N_0} = \frac{E_s |c_2^H H_{1 \to 2}(n) w_1|^2}{N_0}, \quad (9)$$

$$SNR^{2 \to 1} = \frac{E_s |Q_n|^2}{N_0} = \frac{E_s |c_1^H H_{2 \to 1}(n) w_2|^2}{N_0}.$$

One objective of the system design may be to determine preferred beamforming vectors $w_1$ and $w_2$ and preferred combining vectors $c_1$ and $c_2$ that maximize an effective SNR (ESNR) constrained by the alphabets of weight vectors.

The ESNR can be defined as a mapping from the instantaneous SNRs of subcarriers given by equation (9) to an equivalent SNR that takes into account a forward error correction (FEC) employed in the system. There are various methods that can be used for computing the ESNR, such as: calculation of a mean of SNRs over a plurality of subcarriers, a quasi-static method such as the one commonly used in the 3$^{rd}$ generation partnership project 2 (3GPP2) and 1×EV-DV/DO (Evolution Data and Video/Data Optimized) communication systems, a capacity effective signal-to-interference-plus-noise ratio (SINR) mapping (CESM) also used in the 3GPP2 and the 1×EV-DV/DO systems, a CESM technique based on a convex metric that may be employed in the 3GPP2 and the 1×EV-DV/DO systems, and an exponential effective SINR mapping (EESM) used in the 3GPP2 systems.

Different ESNR calculation methods may be utilized for the SC and OFDM systems. For example, a minimum mean square error (MMSE) based SC equalizer typically has an ESNR that can be approximated by the average of SNRs over different bursts. However, OFDM may tend to have an ESNR that may be best approximated using the geometric mean of SNRs over different subcarriers. The various other ESNR calculation methods may be further configured in order to account for additional parameters, such as FEC, receiver imperfections, and/or bit-error rate (BER).

Beamforming Terminology

When describing beamforming between two devices, the following notation can be used. Two devices that are communicating can be referred to as DEV1 and DEV2, for example, DEV1 may be a piconet, controller (PNC) and DEV2 may be a subscriber station. The device number d can be 1 for DEV1 and 2 for DEV2.

Figure 4:
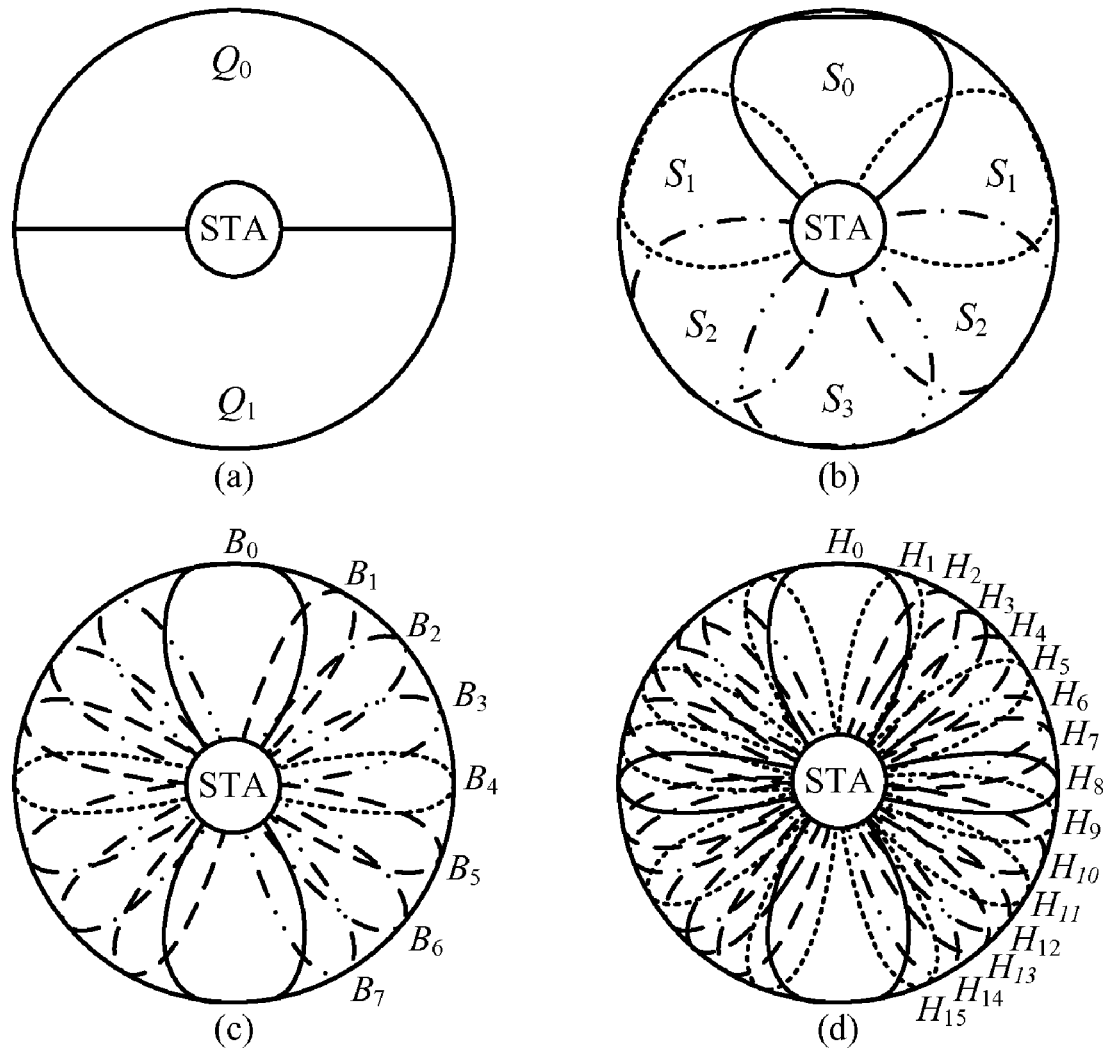
FIG. 4 illustrates a beamforming terminology in accordance with certain aspects of the present disclosure.

The term quasi-omni pattern generally relates to the lowest resolution pattern that covers a very broad area of a region of space of interest around a device (DEV). A PNC may cover the region of space of interest with a minimal set of, possibly overlapping, quasi-omni patterns. A set size equal to one may indicate that the PNC is able to cover the spatial region of interest with only one quasi-omni pattern, indicating that the PNC is omni-capable. The total number of quasi-omni transmit and receive patterns of interest for DEV number d can be denoted as $I^{(d,t)}$ and $I^{(d,r)}$, respectively. The corresponding quasi-omni transmit and receive patterns can be denoted as $Q_n^{(d,t)}$ where $n=0, 1, \ldots, I^{(d,t)}-1$ for the transmit patterns and $Q_n^{(d,r)}$ where $n=0, 1, \ldots, I^{(d,r)}-1$ for the receive patterns. The preferred pair of quasi-omni transmit and receive patterns for DEV d when communicating with the other DEV can be identified by indices $i^{(d,t)}$ and $i^{(d,r)}$, respectively. The corresponding quasi-omni transmit and receive patterns can be denoted as $Q_{i^{(d,t)}}^{(d,t)}$ and $Q_{i^{(d,r)}}^{(d,r)}$, respectively. If both devices are SAS devices, the superscripts t and r can be omitted since same antenna arrays are utilized for both transmission and reception. FIG. 4A illustrates example of two quasi-omni patterns $Q_0$ and $Q_1$ for the SAS device.

As used herein, the term sector generally refers to a second level resolution pattern that covers a relatively broad area of multiple beams. A sector can cover a set of consecutive or nonconsecutive beams and different, sectors can overlap. The total number of transmit and receive sectors of interest for DEV number d can be denoted as $J^{(d,t)}$ and $J^{(d,r)}$, respectively. The corresponding transmit and receive sectors can be denoted as $S_n^{(d,t)}$ where $n=0, 1, \ldots, J^{(d,t)}-1$ for the transmit sectors, and $S_n^{(d,r)}$ where $n=0, 1, \ldots, J^{(d,r)}-1$ for the receive sectors. The preferred pair of transmit and receive sectors for DEV d when communicating with the other DEV can be identified by indices $j^{(d,t)}$ and $j^{(d,r)}$, respectively. The corresponding transmit and receive sectors can be denoted as $S_{j^{(d,t)}}^{(d,t)}$ and $S_{j^{(d,r)}}^{(d,r)}$, respectively. If both devices are SAS devices, the superscripts t and r can be omitted. FIG. 4B illustrates example of four overlapping sectors $S_0, S_1, S_2, S_3$ for the SAS device.

Sectors can be divided into beams as a higher level resolution pattern. The total number of transmit and receive beams of interest for DEV number d can be denoted as $K^{(d,t)}$ and $K^{(d,r)}$, respectively. The corresponding transmit and receive beams can be denoted as $B_n^{(d,t)}$ where $n=0, 1, \ldots, K^{(d,t)}-1$ for the transmit beams, and $B_n^{(d,r)}$ where $n=0, 1, \ldots, K^{(d,r)}-1$ for the receive beams. The preferred pair of transmit and receive beams for DEV d when communicating with the other DEV can be identified by indices $k^{(d,t)}$ and $k^{(d,r)}$, respectively. The corresponding transmit and receive beams can be denoted as $B_{k^{(d,t)}}^{(d,t)}$ and $B_{k^{(d,r)}}^{(d,r)}$, respectively. If both devices are SAS devices, the superscripts t and r can be omitted. FIG. 4C illustrates an example of an 8-element linear antenna array with eight beams $B_0, B_1, \ldots, B_7$ for the SAS device.

Beams can be further divided into high-resolution (HRS) beams as the highest level of resolution pattern. The total number of transmit and receive HRS beams of interest for DEV number d can be denoted as $L^{(d,t)}$ and $L^{(d,r)}$, respectively. The corresponding transmit and receive HRS beams can be denoted as $H_n^{(d,t)}$ where $n=0:L^{(d,t)}-1$ for the transmit HRS beams, and $H_n^{(d,r)}$ where $n=0:L^{(d,r)}-1$ for the receive HRS beams. The preferred pair of transmit and receive HRS beams for DEV d when communicating with the other DEV can be identified by indices $l^{(d,t)}$ and $l^{(d,r)}$, respectively. The corresponding transmit and receive HRS beams can be denoted as $H_{l^{(d,t)}}^{(d,t)}$ and $H_{l^{(d,r)}}^{(d,r)}$, respectively. If both devices are SAS devices, the superscripts t and r can be omitted. FIG. 4D illustrates an example of and 8-element linear antenna array with 16 HRS beams $H_0, H_1, \ldots, H_{15}$ for the SAS device.

In general, the multi-resolution definition of quasi-omni patterns, sectors, beams and HRS beams becomes a multi-level definition, where each level may use a set of antenna patterns. Therefore, quasi-omni patterns may represent a first set of antenna patterns, sectors may represent a second set of antenna patterns, beams may represent a third set of antenna patterns preferably derived from the second set of antenna patterns, and HRS beams may represent a fourth level of antenna patterns preferably derived from the third set of antenna patterns.

For a two-dimensional (2-D) antenna array with $K_x$ beams on the x-axis and $K_z$ beams on the z-axis, the $K_x$ beams along the x-axis may be identified by indices zero through $K_x-1$ in the direction of increasing polar angle and may correspond one-to-one with the beam vectors 0 to $K_x-1$ from the selected x-beam codebook. The $K_z$ beams along the z-axis may be identified by indices zero through $K_z-1$ in the direction of increasing polar angle and may correspond one-to-one with the beam vectors 0 to $K_z-1$ from the selected z-beams codebook. This is further illustrated in FIG. 5 for a 2-D antenna array with eight beams in each direction.

Figure 5:
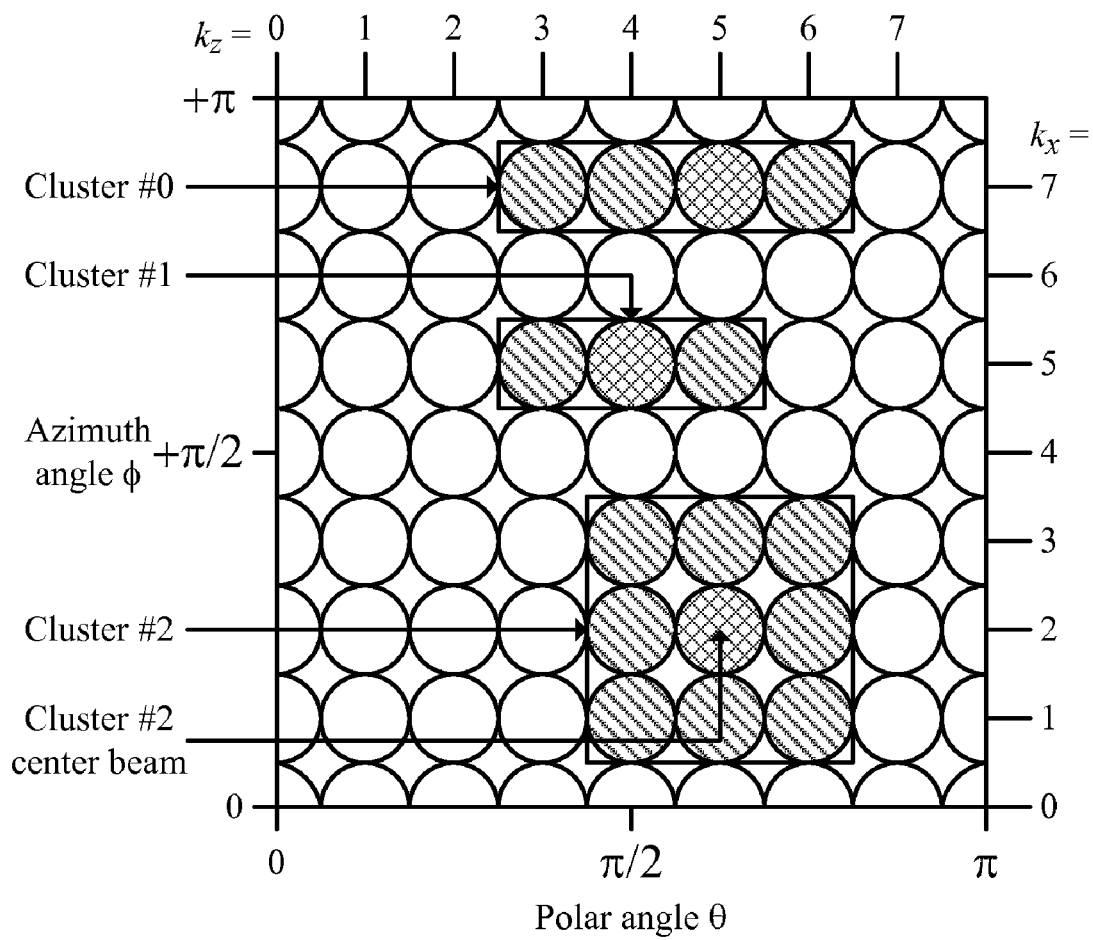
FIG. 5 illustrates beams organized in clusters in accordance with certain aspects of the present disclosure.

As used herein, a cluster generally refers to a group of beams around a center beam. The clustering concept is introduced in order to facilitate tracking of preferred beam directions or in general case to facilitate tracking of preferred antenna patterns (directions). The number of clusters per sector(s) may be left to the implementer. FIG. 5 illustrates examples of clusters of different sizes. Cluster encoding may be used for DEVs supporting the pattern estimation and tracking (PET) option. For DEVs implementing the beam switching and steering option, cluster encoding support may not be required. A cluster may be encoded by an 8-bit filed c7c6c5c4c3c2c1c0. The first three least significant bits, i.e., c2c1c0, may encode the beams in the polar angle direction in reference to FIG. 5, while the second set of three bits, i.e., c5c4c3, may encode the beams in the azimuth angle direction. The last set of two bits, c7c6, may specify three different 2-D puncturing patterns, i.e., different cluster geometrics.

Computing and Tracking Preferred Beamforming and Combining Vectors

Certain aspects of the present disclosure may provide for one or more beamforming algorithms configured to select the beamforming vectors of antenna weights ($w_1$ and $w_2$) and the combining vectors of antenna weights ($c_1$ and $c_2$) that maximize at least one signal-quality parameter, such as an ESNR. In the general AAS case, the first transceiver 302 may transmit known information to the second transceiver 304, which then derives matrices characterizing the channel state information (CSI). This enables estimates of $w_1$ and $c_2$ to be calculated. The second transceiver 304 may transmit known information to the first transceiver 302 in order to provide the CSI that allows for estimates of $w_2$ and $c_1$ to be calculated. Some aspects of the present disclosure may employ known data symbols, pilot signals, or other training information to be transmitted for acquiring the CSI. Alternative aspects of the present disclosure may employ blind adaptive processing or other techniques utilizing unknown transmitted data to derive the CSI.

In the case of AAS, both directions of the link may need to be utilized in order to estimate vectors $w_1$, $w_2$, $c_2$, and $c_1$. In the case of SAS, the beamforming vectors $w_1$ and $w_2$ and the combining vectors $c_2$ and $c_1$ in a particular direction may be equal. Thus, $w_1=w_2$ and $c_2=c_1$, and only one direction of the link may be employed for calculating vectors $w_1$, $w_2$, $c_2$, and $c_1$.

Figure 6:
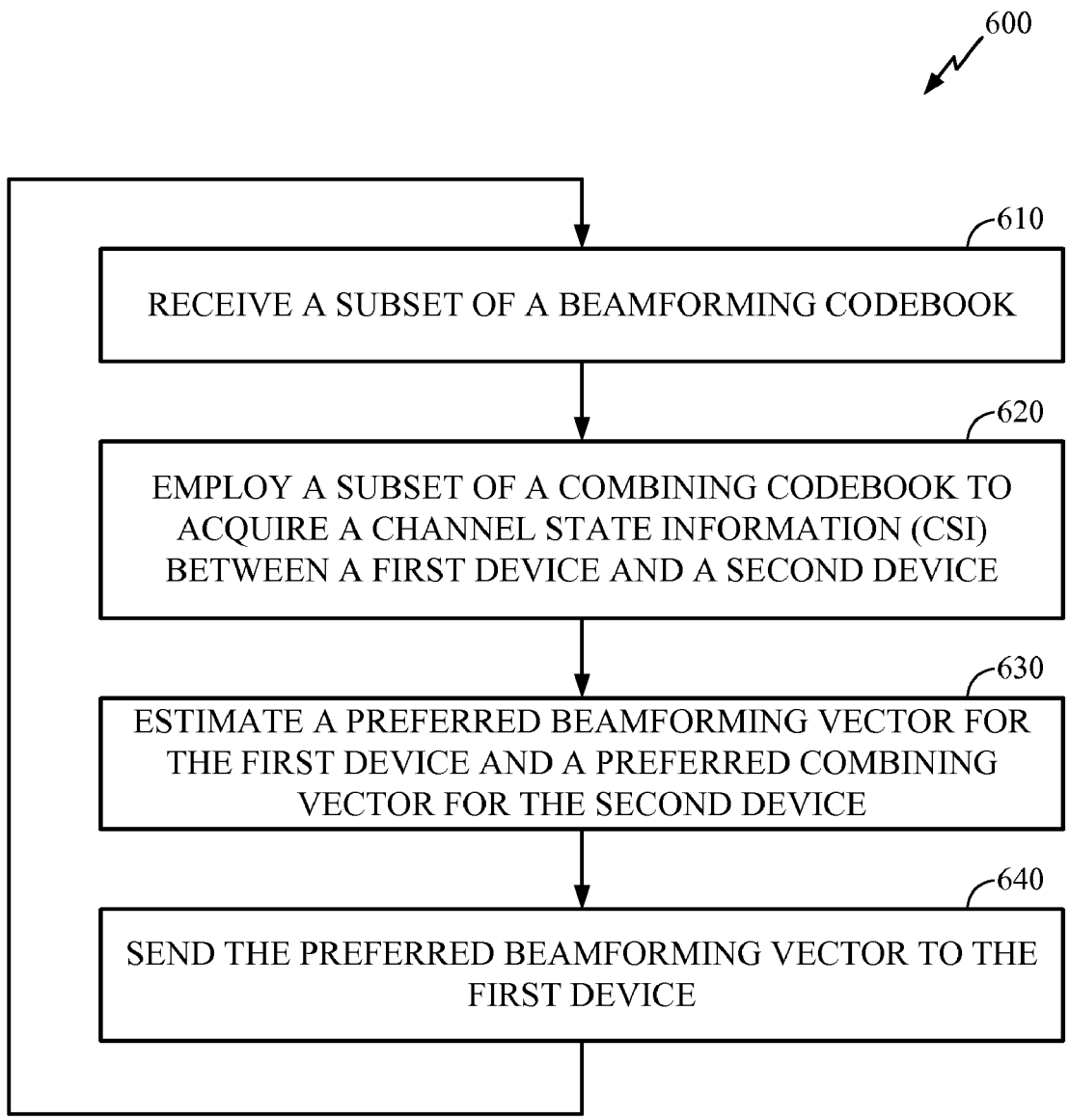
FIG. 6 illustrates example operations from a receiver perspective for beamforming in accordance with certain aspects of the present disclosure.
Figure 6A:
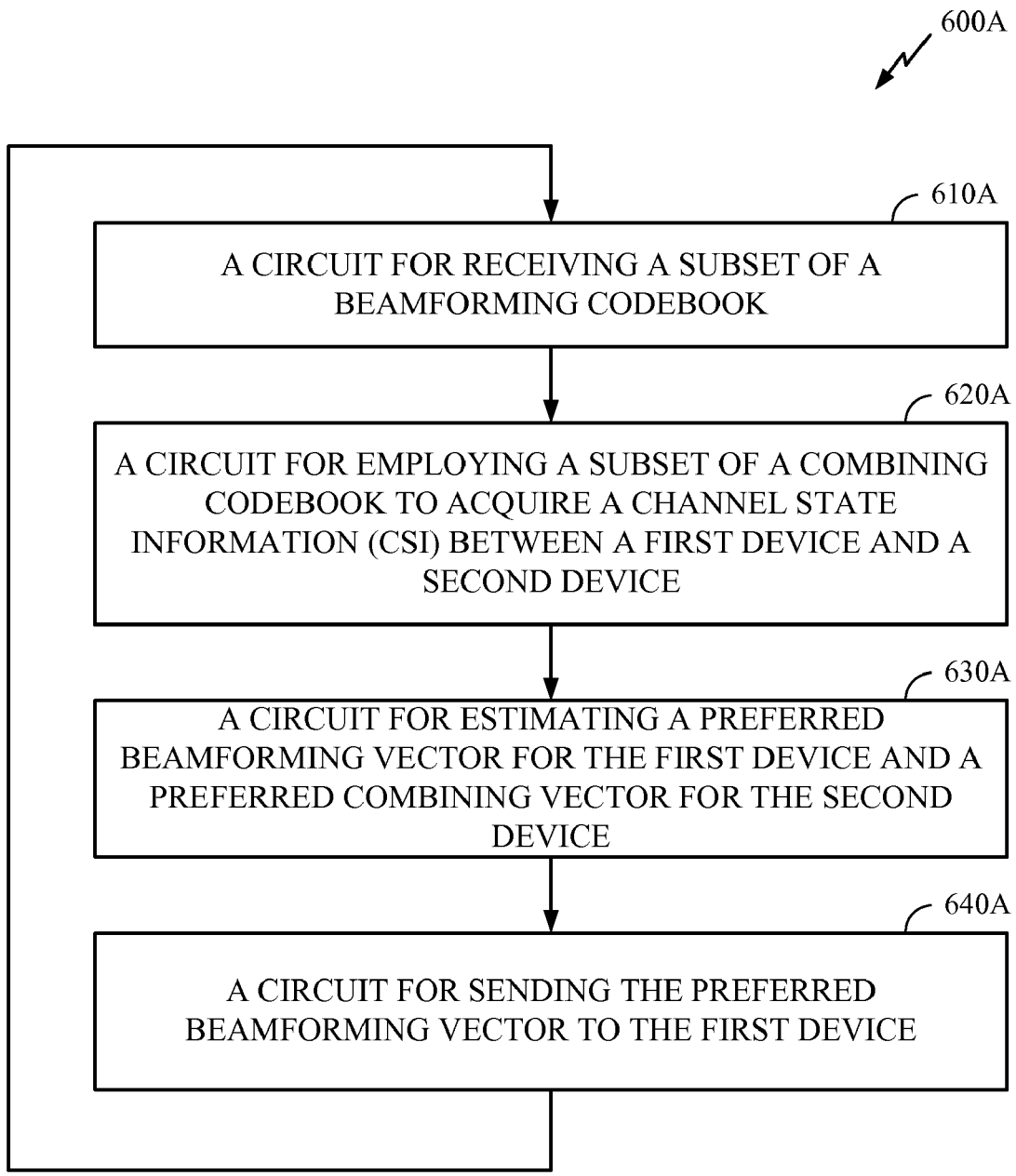
FIG. 6A illustrates example components capable of performing the operations illustrated in FIG. 6.

FIG. 6 illustrates example operations 600 from a receiver perspective for beamforming between a first transceiver and a second transceiver. For example, one transceiver may be a piconet controller (PNC) and the other transceiver may be a piconet subscriber device. At 610, the second transceiver (or the second device) may receive a subset of a beamforming codebook from the first transceiver (or the first device). At 620, the second device may employ a subset of a combining codebook to acquire a first CSI matrix, which may be used to estimate the preferred beamforming vector $w_1$ of the first device and the preferred combining vector $c_2$ of the second device.

A codebook is a matrix comprising one or more columns wherein each column denotes a beamforming vector or a combining vector. Thus, each column may correspond to a particular beam pattern and/or beam direction. Typically, the set of columns spans the entire space (i.e., 360 degrees).

At 630, the preferred beamforming vector $w_1$ and the preferred combining vector $c_2$ may be estimated and produced. It should be appreciated that the terms preferred beamforming vector and preferred combining vector denote estimates of preferred values, and the optimality of such estimates may be limited with respect to one or more processing constraints, including (but not limited to) loss of information due to quantization, simplifying assumptions that sacrifice some accuracy and/or precision in order to reduce computational complexity, and limited processing time, which may limit the number of iterative calculations. Other constraints may also apply. For example, in some aspects of the present disclosure, a beamforming and/or combining vector resulting in a signal-quality metric above a predetermined threshold may be deemed as the preferred relative to a subset of available vectors. Accordingly, the term "preferred beamforming vector" may be equivalent to preferred beamforming vector, as used herein. Similarly, the term "preferred combining vector" may be equivalent to preferred beamforming vector. The estimation step 630 may employ any of various optimality criteria, such as the EESM or the mean SNR.

At 640, the preferred beamforming vector $w_1$ (and, optionally, the preferred combining vector $c_2$) may be sent back to the first device. For the AAS, steps 610 to 640 may be repeated wherein the designations of "first device" and "second device" are swapped. Thus, a preferred beamforming vector $w_2$ and a preferred combining vector $c_1$ may be also estimated. For the SAS, $w_1=w_2$ and $c_2=c_1$.

Figure 26:
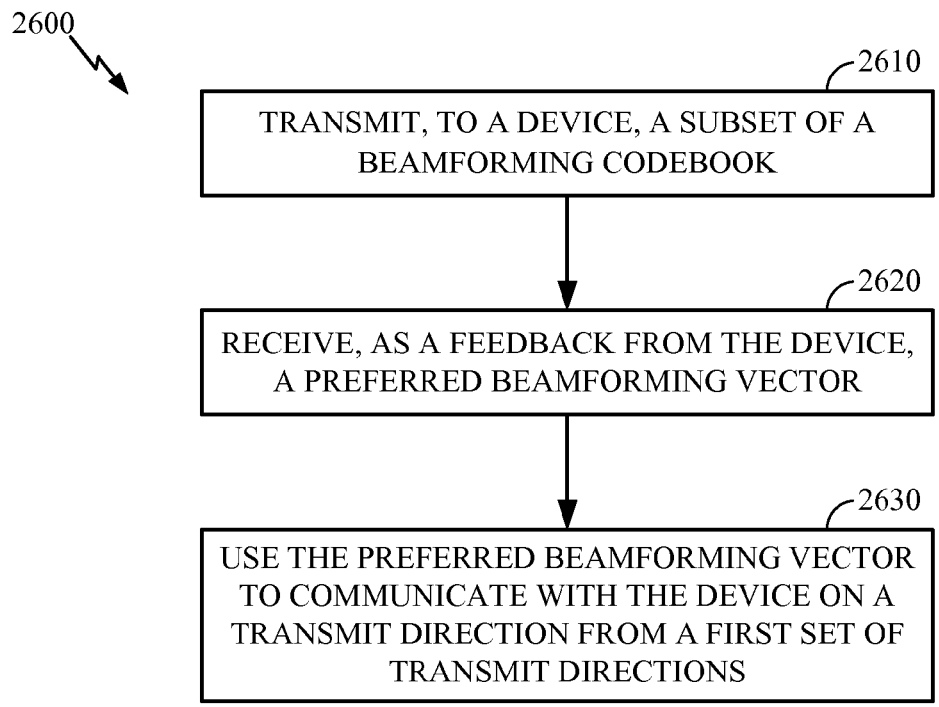
FIG. 26 illustrates example operations from a transmitter perspective for beamforming in accordance with certain aspects of the present disclosure.
Figure 26A:
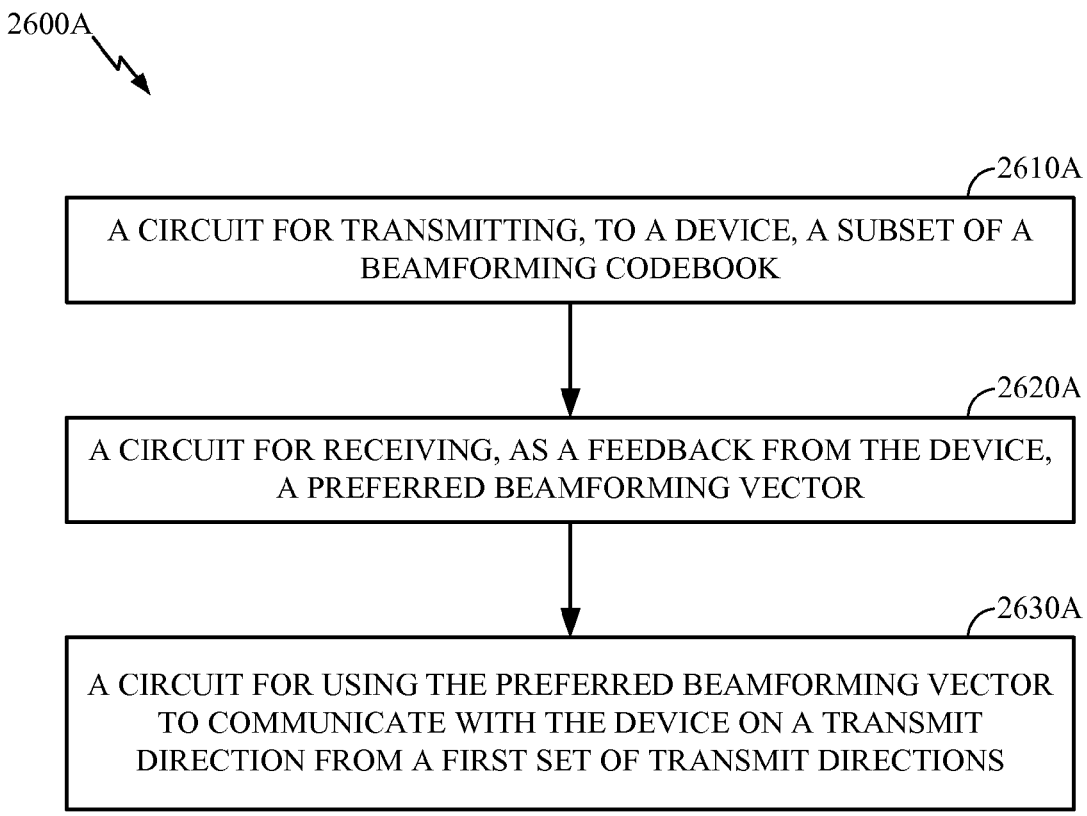
FIG. 26A illustrates example components capable of performing the operations illustrated in FIG. 26.

FIG. 26 illustrates example operations 2600 from a transmitter perspective for beamforming between a first transceiver and a second transceiver. At 2610, the first transceiver (or the first device) may transmit a subset of a beamforming codebook to the second transceiver (or the second device). At 2620, once a preferred beamforming vector $w_1$ is determined at the second device, the first device may receive, as a feedback from the second device, the preferred beamforming vector $w_1$. At 2630, the beamforming vector $w_1$ may be used at the first device to communicate with the second device on a transmit direction (e.g., a beam direction) from a set of transmit directions.

Figure 7:
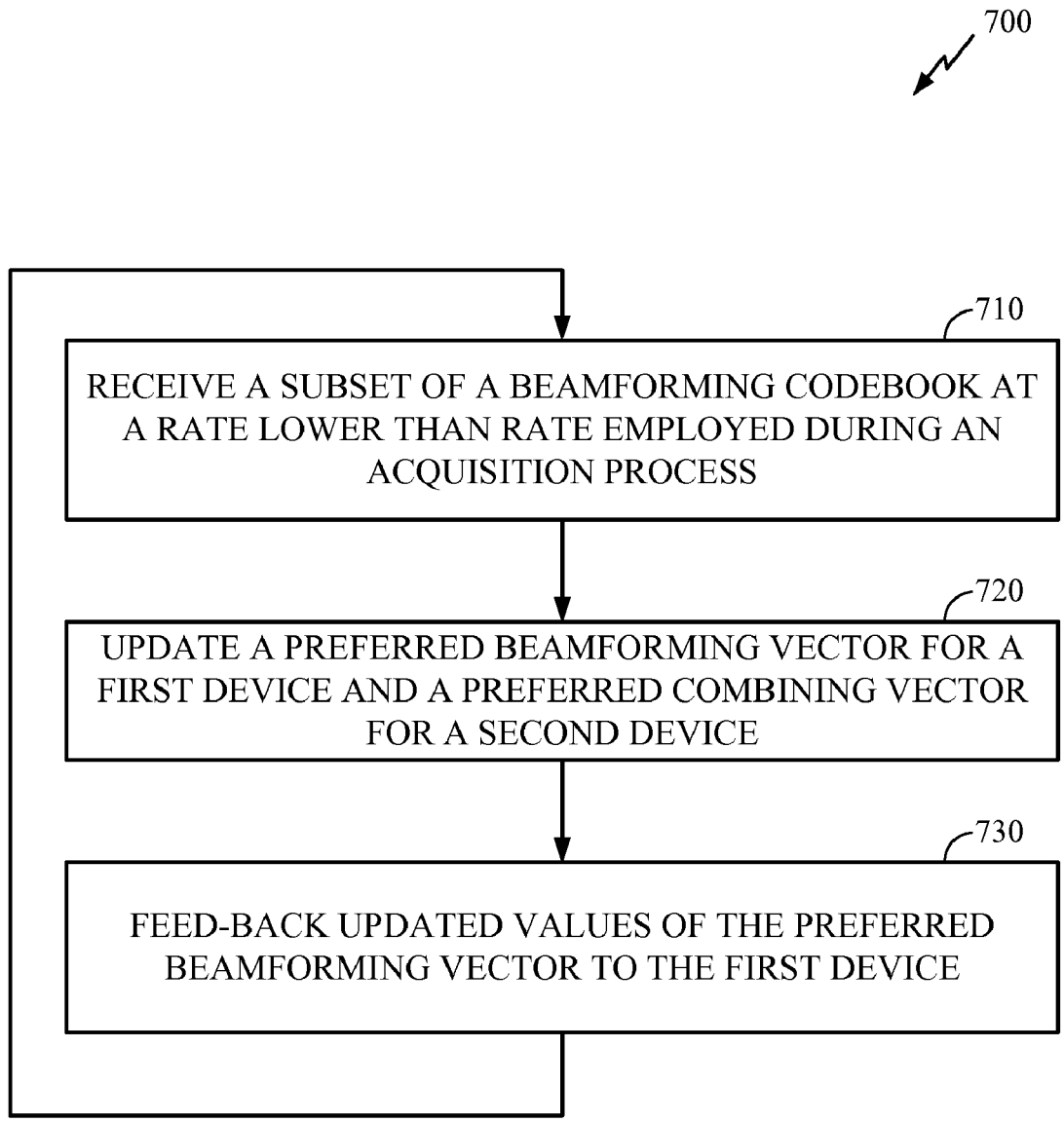
FIG. 7 illustrates example operations for updating beamforming and combining vectors in accordance with certain aspects of the present disclosure.
Figure 7A:
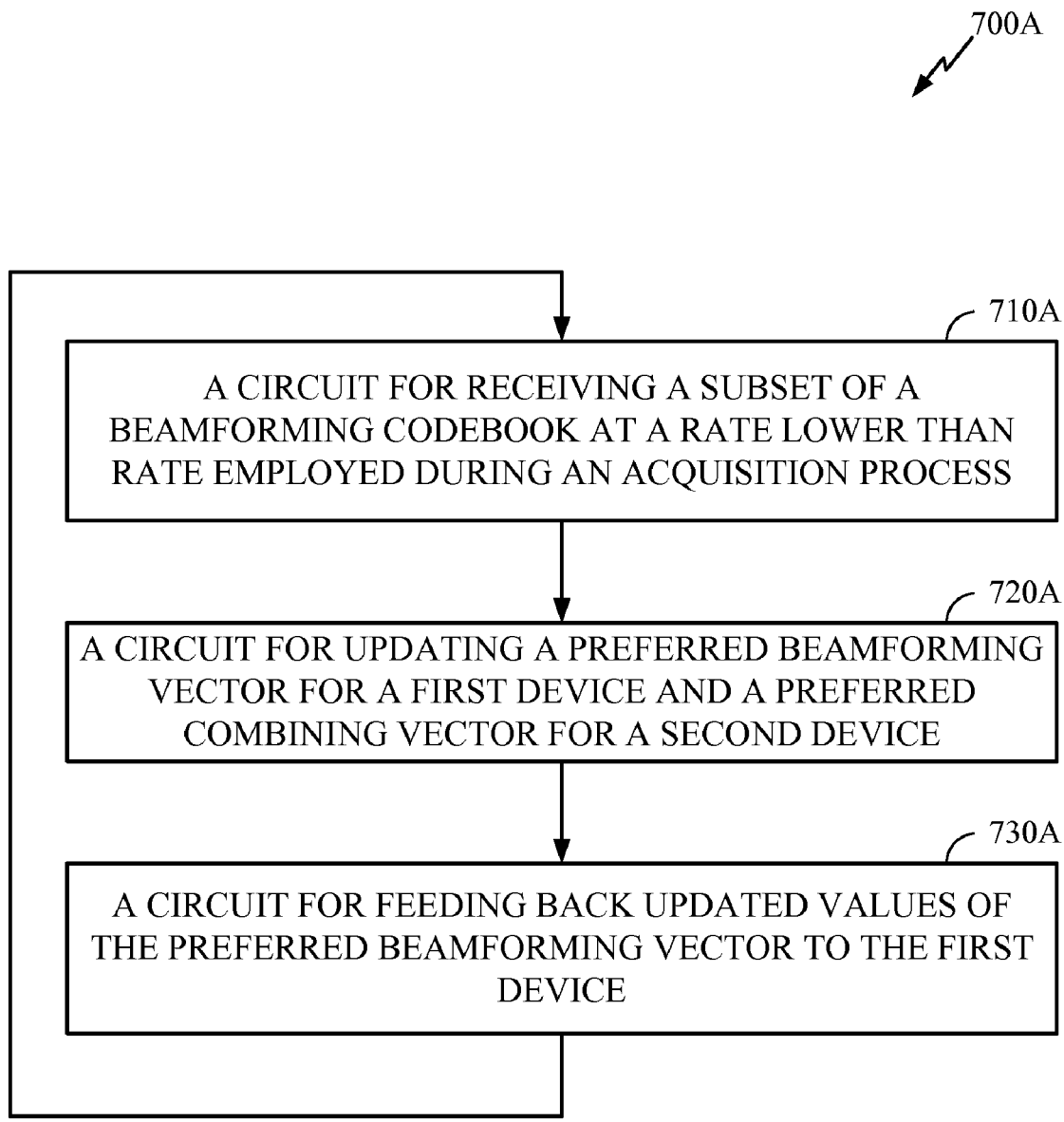
FIG. 7A illustrates example components capable of performing the operations illustrated in FIG. 7.

FIG. 7 illustrates example operations 700 for updating beamforming and combining vectors. At 710, a subset of a beamforming codebook may be received at the second device at a rate lower than the rate employed during acquisition operations 610-640. At 720, the preferred beamforming vector $w_1$ and the preferred combining vector $c_2$ may be updated. At 730, updated beamforming vector $w_1$ (and, optionally, the updated combining vector $c_2$) may be fed back to the first device. For the AAS, steps 710 to 730 may be repeated, wherein the designations of "first device" and "second device" are swapped. Thus, the estimates for the preferred beamforming vector $w_2$ and the preferred combining vector $c_1$ may be also updated. For the SAS, $w_1=w_2$ and $c_2=c_1$.

Beamforming Codebooks and Beam Patterns

For a uniformly spaced linear antenna array with N elements, the array factor may be defined as:

$$A(\theta) = \sum_{n=1}^{N} w_n e^{j2\pi n(d/\lambda)\cos\theta}, \quad (10)$$

where d is a spacing between array elements, θ denotes an angle from the axis of the linear array, λ is a wavelength, and $w_n$ is an array element weight of the $n^{th}$ array element. The antenna array directivity may be given by:

$$D = \frac{\max|A(\theta)|^2}{w^H \cdot K \cdot w}, \quad (11)$$

where $$K_{n,m} = \frac{\sin[2\pi(d/\lambda)(n-m)]}{2\pi(d/\lambda)(n/m)}, \quad n, m = 0, 1, \ldots, N-1. \quad (12)$$

The maximum possible directivity may be $D_{Max}=N$.

The array factor of a two-dimensional array may be given as:

$$A(\theta, \phi) = \sum_{m=1}^{N_x} \sum_{n=1}^{N_z} w_{m,n} e^{j2\pi[m(d_x/\lambda)\sin\theta\cos\phi + n(d_y/\lambda)\sin\theta\sin\phi]}, \quad (13)$$

where $d_x$ denotes array spacing along the x-axis, $d_z$ denotes array spacing along the z-axis, $N_x$ is a number of elements along the x-axis, $N_y$ is a number of elements along the z-axis, and φ is a rotation angle from the x-axis. The antenna weights $w_{m,n}$ may be expressed as $w_m = w_{x,m} \cdot w_{z,n}$, where $m=0:N_x-1$, and $n=0:N_z-1$. Thus, an antenna weight matrix may be expressed by $W_{xz} = w_x \cdot w_z^T$.

In one aspect of the present disclosure, two-dimensional antenna arrays may be trained by employing codewords along the x-axis and the z-axis. The array factor of a two dimensional array that is separable into one-dimensional (x-axis and z-axis) array components may be expressed as:

$$A(\theta, \phi) = A_x(\theta, \phi) \cdot A_z(\theta, \phi), \quad (14)$$

where $$A_x(\theta, \phi) = \sum_{n=1}^{N_x} w_{x,n} e^{j2\pi[m(d_x/\lambda)\sin\theta\cos\phi]}, \quad (15)$$

$$A_z(\theta, \phi) = \sum_{n=1}^{N_z} w_{z,n} e^{j2\pi n(d_z/\lambda)\sin\theta\sin\phi}. \quad (16)$$

Specifically, for the purpose of training, two-dimensional codebooks derived from one-dimensional codebooks (e.g., x-axis and z-axis codebooks) may be utilized. For example, a two-dimensional codebook $W_{xz} \in C^{N_x \times N_z}$ may be expressed using a codebook for one-dimensional antenna arrays along the x-axis, $w_x \in C^{N_x \times 1}$ and a codebook for one-dimensional antenna arrays along the z-axis, $w_z \in C^{N_z \times 1}$. For example, two-dimensional antennas weights may be computed from x-axis and z-axis antenna weights, such as:

$$w_{m,n} = w_{x,n} \cdot w_{z,n} \text{ for } m=0:N_x-1 \text{ and } n=0:N_z-1 \quad (17)$$

Certain aspects of the present disclosure may support generating and/or employing beam codebooks and sector codebooks. A beam codebook, as used herein, denotes a codebook in which the number of beams may be greater than or equal to the number of antennas. A sector codebook, as used herein, denotes a quasi-omni codebook comprising a number of beams that may be less than the number of antennas.

For certain aspects of the present disclosure wherein beam codebooks are employed for training, it may be sufficient to employ a pair of one-dimensional beam codebooks instead of a two-dimensional codebook. In one aspect of the present disclosure, a beam codebook matrix for N antennas and M beams may be expressed as:

$$W(n, m) = j^{fix\left[\frac{n \times mod(m+(M/2),M)}{(M/4)}\right]} \text{ for } n = 0: N-1 \text{ and } m = 0: M-1 \quad (18)$$

wherein fix(•) is a function that returns the integer part of its argument. In an alternative aspect, the function fix(•) may be replaced with a function round(•) that rounds its argument to the nearest integer. It should be appreciated that alternative formulas and functions may be employed for calculating elements of a beam codebook matrix, and that the aspects described herein are intended to illustrate examples, not limitations, of the claimed disclosure.

Figure 8A:
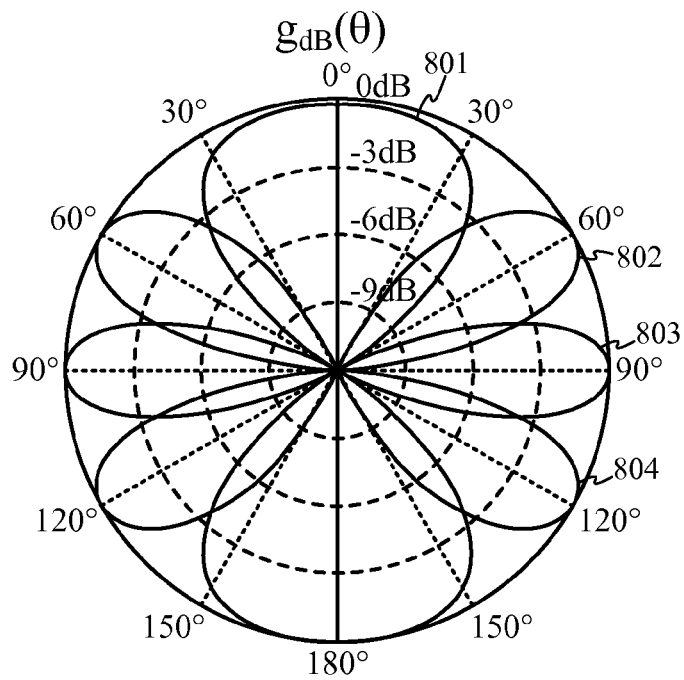
FIGS. 8A-8C illustrate four, six, and eight beam patterns, respectively for a four-element antenna array in accordance with certain aspects of the present disclosure.

FIG. 8A illustrates four beam patterns 801-804 generated by a four-element linear array corresponding to the following codebook matrix:

$$W = \begin{bmatrix} +1 & +1 & +1 & +1 \\ -1 & -j & +1 & +j \\ +1 & -1 & +1 & -1 \\ -1 & +j & +1 & -j \end{bmatrix}. \quad (19)$$

Figure 8B:
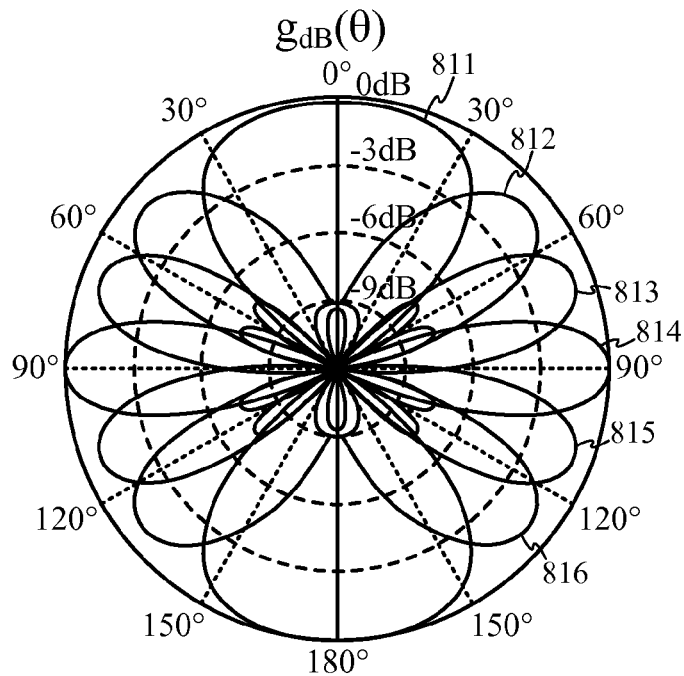

FIG. 8B illustrates six beam patterns 811-816 generated by a four-element linear array that employs the following codebook matrix:

$$W = \begin{bmatrix} +1 & +1 & +1 & +1 & +1 & +1 \\ -1 & -1 & -j & +1 & +1 & +j \\ +1 & +j & -1 & +1 & +j & -1 \\ -1 & +1 & -1 & +1 & -1 & +1 \end{bmatrix}. \quad (20)$$

A benefit of employing the beam patterns illustrated in FIG. 8B is that if the four-element array is in a receiving mode and the strongest received signal direction is 45°, the beam pattern 813 (and thus, the array gain) may achieve maximum in the direction of the strongest received signal. If the four beam patterns in FIG. 8A were employed, the strongest received signal may arrive between beam patterns 801 and 802 where the array gain is very low.

Figure 8C:
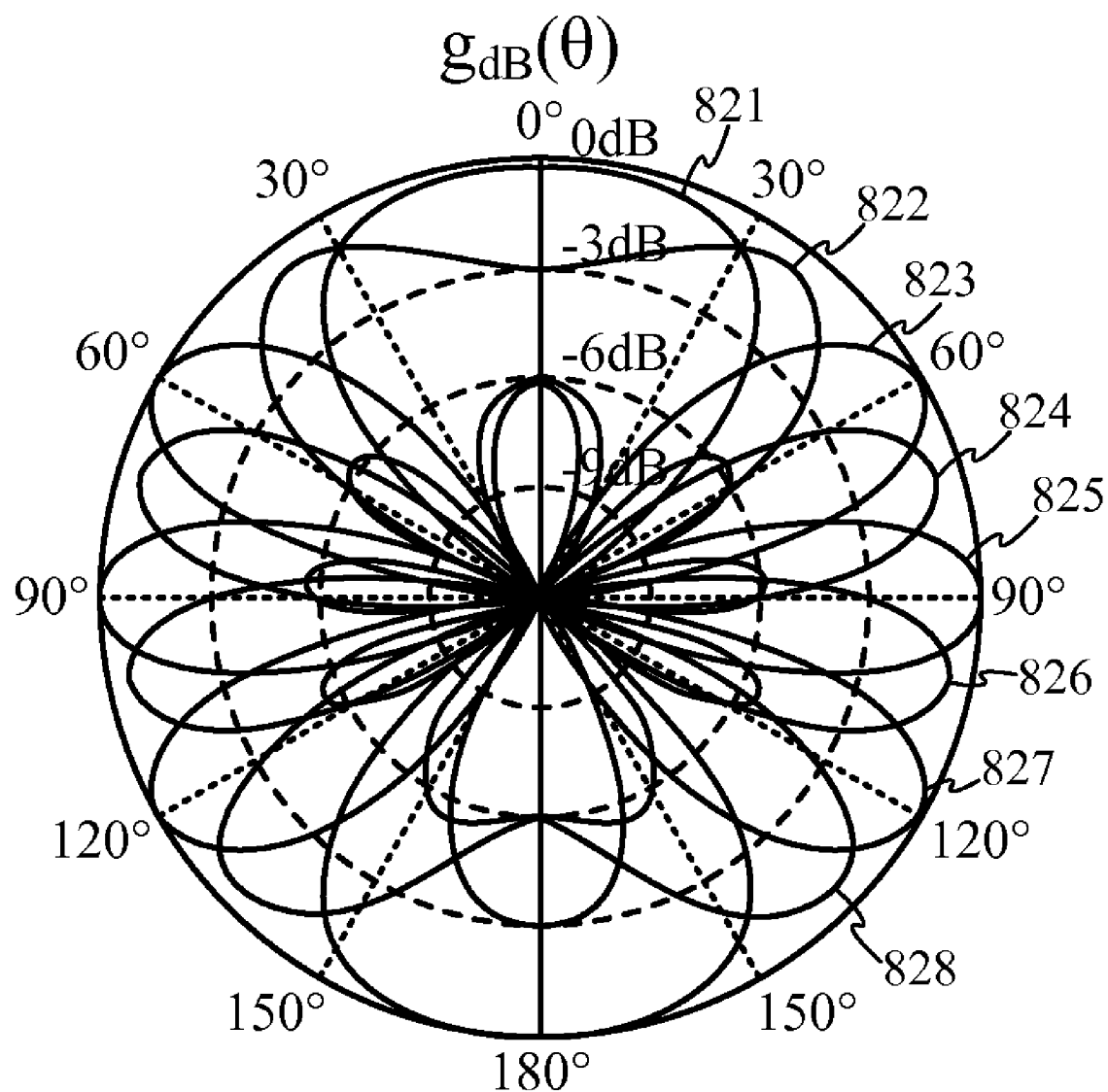

The same four-element array may employ alternative codebooks that enable it to generate other beam patterns. For example, FIG. 8C illustrates eight beam patterns 821-828 generated by a four-element linear array that employs the following codebook matrix:

$$W = \begin{bmatrix} +1 & +1 & +1 & +1 & +1 & +1 & +1 & +1 \\ -1 & -1 & -j & -j & +1 & +1 & +j & +j \\ +1 & +j & -1 & -j & +1 & +j & -1 & -j \\ -1 & -j & +j & -1 & +1 & +j & -j & +1 \end{bmatrix}. \quad (21)$$

Antenna arrays may employ a variety of codebooks that provide for varying numbers of beam patterns in order to provide for different angular resolutions. In one aspect of the present disclosure, training may first employ a low resolution (i.e., fat) beam followed by high resolution (i.e., narrow) beams. In some aspects, a fat beam may comprise a plurality of narrow beams.

When beam codebooks are employed for training of two-dimensional arrays, beam codebooks for x-axis and z-axis one-dimensional arrays may be employed for calculating the beam codebook for the two-dimensional array. If the x-axis codebook comprises $K_x$ beams and the z-axis codebook comprises $K_z$ beams, then the two-dimensional array has $K_x \cdot K_z$ beams.

For certain aspects of the present disclosure wherein sector codebooks are employed, sector codebook matrices for N antennas (where N is even number) and M=N/2 sectors may be given by:

$$W(n,m) = \begin{cases} (-j)^{mod(n,2)} & m = 0 \\ (-1)^{fix\left[\frac{n \times mod(m+(M/2),M)}{(M/2)}\right]} & n = 0: N-1\ m = 1: M-1, \end{cases} \quad (22)$$

wherein each sector may comprise two beams of a beam codebook having N beams. Alternative aspects of the present disclosure may provide for variations to formulas and functions used to generate sector codebook matrices. For example, the fix(•) function in equation (22) may be replaced with a round(•) function. Other variations may be made in accordance with alternative applications and aspects, as will be appreciated by those skilled in the art.

Figure 9A:
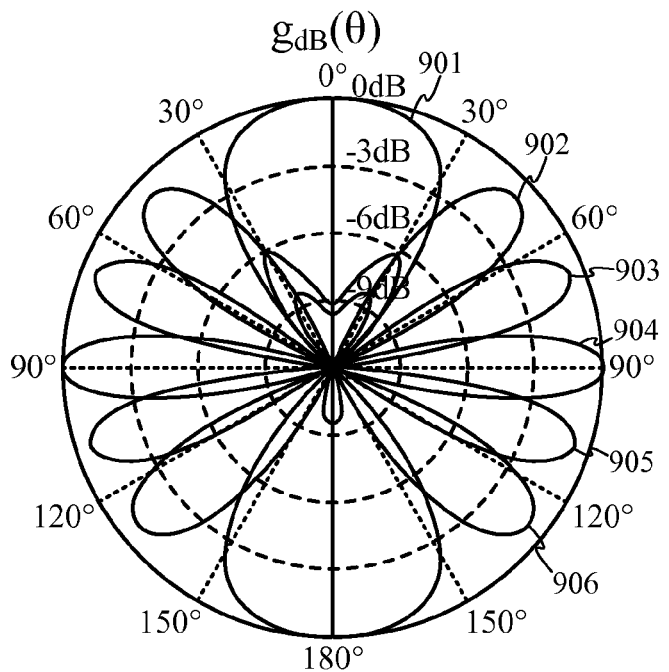
FIG. 9A illustrates a beam pattern comprising six beam patterns generated by one-dimensional six-element array in accordance with certain aspects of the present disclosure.

FIG. 9A illustrates a beam pattern comprising six beam patterns 901-906 generated by a one-dimensional six-element array. Sector beam patterns may be generated by combining beam pairs. For example, a first sector may comprise beam patterns 901 and 904, a second sector may comprise beam patterns 902 and 905, and a third sector may comprise beam patterns 903 and 906. Thus, sectors may comprise adjacent or non-adjacent beam patterns. Furthermore, sectors may overlap.

Figure 9B:
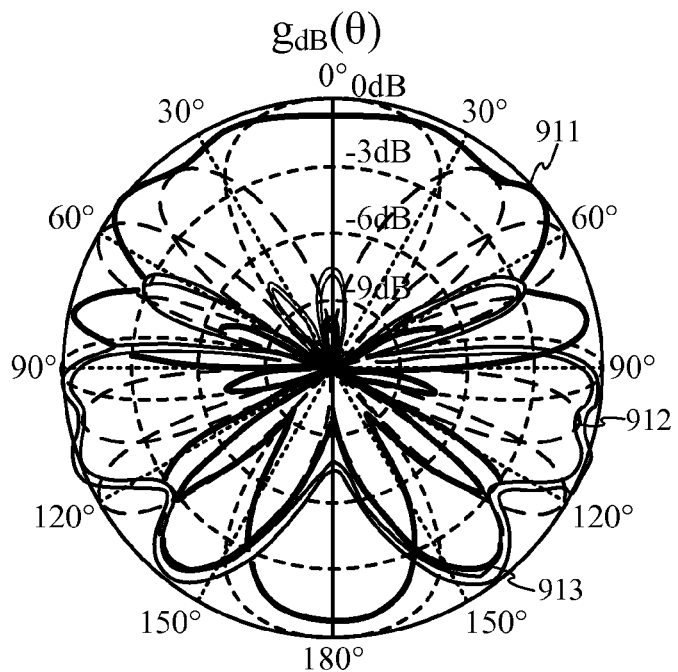
FIG. 9B illustrates a pair of sector beam patterns in accordance with certain aspects of the present disclosure.

FIG. 9B illustrates a pair of sector beam patterns 911 and 912 for a linear six-element antenna array. A corresponding two-sector codebook may be given by:

$$W = \begin{bmatrix} +1 & +1 \\ +1 & -1 \\ -j & -j \\ -1 & +1 \\ +1 & +1 \\ -1 & +1 \end{bmatrix}. \quad (23)$$

In alternative aspects of the present disclosure, sector codebooks may be also provided for the case when M≠N/2.

Beamforming Optimality Criterions

Two beamforming optimality criterions are proposed in the present disclosure: a beam switching (steering) and tracking (BST) criterion suitable for all antenna configurations, and pattern estimation and tracking (PET) criterion suitable only for one-dimensional (1-D) linear antenna arrays and two-dimensional (2-D) planar antenna arrays. All devices (DEVs) that support the PET approach may also support the BST. The PET may be used only if both DEVs that form a communication link support this particular criterion.

The BST criterion may be independent of utilized antenna configuration, i.e., the BST may be applied with switched antennas, sectored antennas, and antenna arrays that employ multiple-input multiple-output (MIMO) transmission/reception. It is important to note that the BST does not require any knowledge about a codebook used by a particular device (DEV), i.e., a DEV2 does not need to know the codebook used by a DEV1, and the DEV2 does not need to know how many antennas the DEV1 uses. Therefore, the BST represents the beamforming criterion that works with any antenna configuration and with any amount of available information about another DEV. The BST criterion is based on selecting a preferred set of patterns at each level of beamforming, as well as on tracking a preferred pattern during a tracking phase. On the other hand, the PET criterion is based on finding the preferred beam former and combiner vectors (i.e., antenna weights) that do not necessarily fall into a given set of beam patterns.

Beamforming Protocols

Certain aspects of the present disclosure support two beamforming protocols: an on-demand beamforming protocol and a pro-active beamforming protocol. The on-demand beamforming may take place within a channel time allocation period (CTAP) allocated to a DEV. A DEV1 may reserve a CTAP for the special purpose of beamforming acquisition with another device DEV2. In the pro-active beamforming, the sector level training may take place in the sector training section of a beacon part of a super-frame. The number of sectors at a DEV may be specified, for example, within the beamforming capability information element (IE), as illustrated in FIG. 10. The DEV may send its beamforming capability IE to a piconet controller (PNC) during or after an association procedure. The PNC may broadcast the beamforming capability IE or may relay it to any other device willing to communicate with the DEV. The message exchange following the sector-level training and the beam-level training may take place in the beamforming CTAP allocated to the PNC and to the DEV.

In the case of on-demand beamforming, the DEV1 may request a service period (SP) in order to perform beamforming with DEV2. The SP may be allocated with a special stream index. The SP allocation along with DEV1 and DEV2 beamforming capabilities may be broadcasted within the beamforming capability Information Element (IE). One example of the structure of the beamforming capability IE is illustrated in FIG. 10.

The beamforming capability IE may specify the number of omni-directions and sectors at both transmitting and receiving devices. For certain aspects of the present disclosure, if the field "# Tx Q-omni directions" is equal to 1, then a device may be omni-capable on transmission. Also, if the field "# Rx Q-omni directions" is equal to 1, then the device may be omni-capable on reception. For certain aspects of the present disclosure, if the "Antenna array type" field is equal to 0 then a switched antenna may be utilized, if the "Antenna array type" field is equal to 1 then sectored antennas may be used, if this field is equal to 2 then 1-D linear antenna array with antenna spacing of one half of the wavelength may be used, and if this field is equal to 3 then 2-D planar antenna array with antenna spacing of one half of the wavelength may be used. Value 4 of the "Antenna array type" field may be unspecified, while values 5-7 may be reserved.

The beamforming capability IE may comprise information about a maximum number of beamforming levels that each device is capable of. The beamforming capability IE may also specify a number of transmit and receive antennas at both transmitting and receiving devices. The "PET" field of the beamforming capability IE may indicate that the pattern estimation and tracking procedure based on codebooks may need to be used for beamforming. The tracking support may be also provided, as illustrated in FIG. 10.

Multiresolution Beamforming

A two-dimensional transmitter array having, for example, 8×8=64 elements would typically transmit 64 training sequences in 64 different directions specified by 8×8 beamforming codebooks. A two-dimensional receiver array having, for example, 6×6=36 elements will receive each of the 64 transmissions in 36 different combining directions. Thus, 64×36=2304 training sequences are required to identify the preferred transmit/receive beam pair. This procedure may have prohibitively large processing latency. Certain aspects of the present disclosure support a method for beamforming that employs multiple resolutions which reduces computational complexity and processing latency of the beamforming.

For certain aspects of the present disclosure, the transmitter may employ a plurality of sector patterns along each of the x-axis and the z-axis. Each sector pattern may comprise a plurality of narrower x-axis and z-axis beam patterns. Once the preferred sector pattern is determined, the preferred narrow beam within the sector may be determined. Therefore, the number of training sequences required to identify the preferred transmit/receive beam pair may be substantially reduced.

Figure 11:
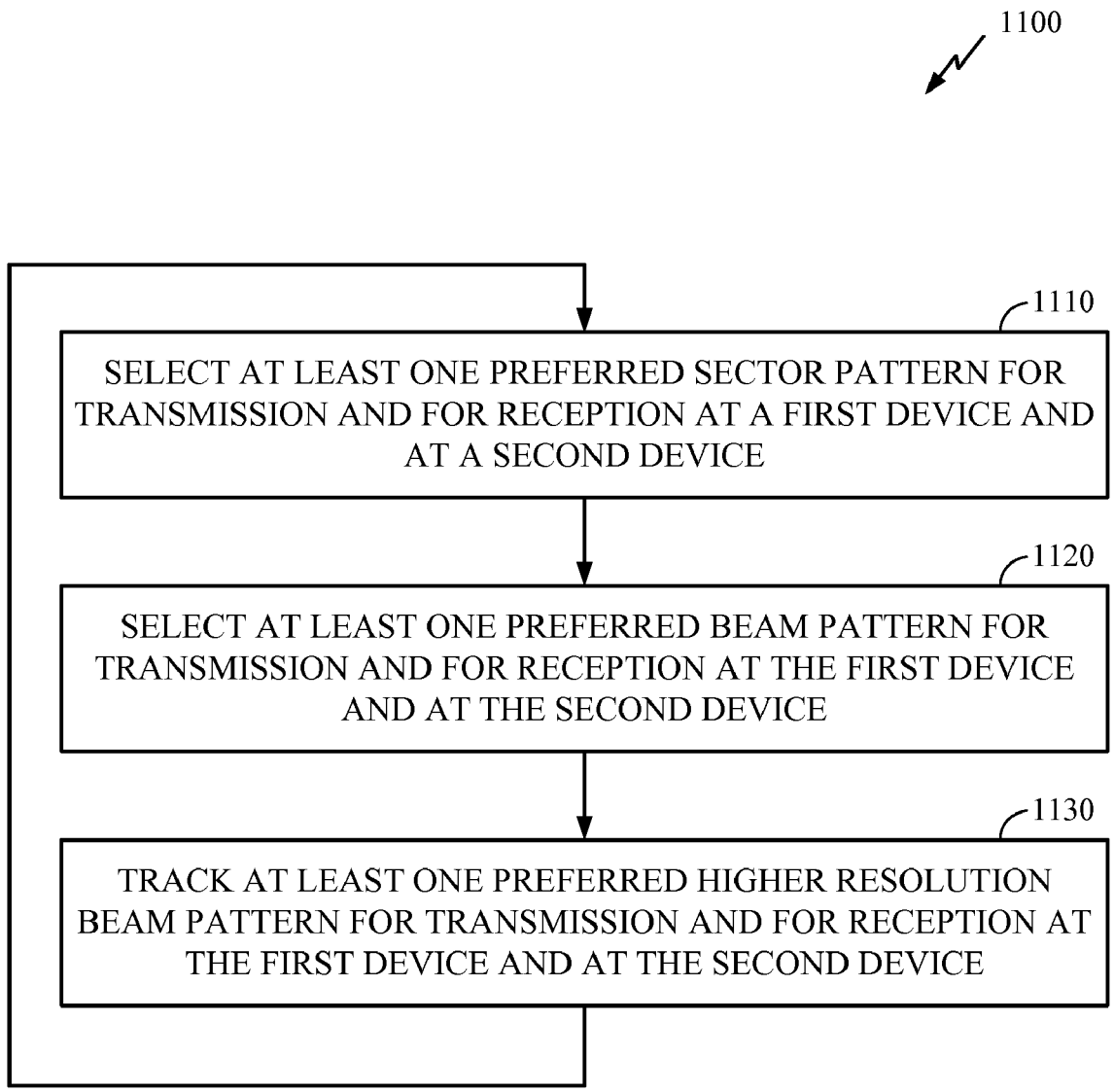
FIG. 11 illustrates example operations for a multi-resolution beamforming in accordance with certain aspects of the present disclosure.
Figure 11A:
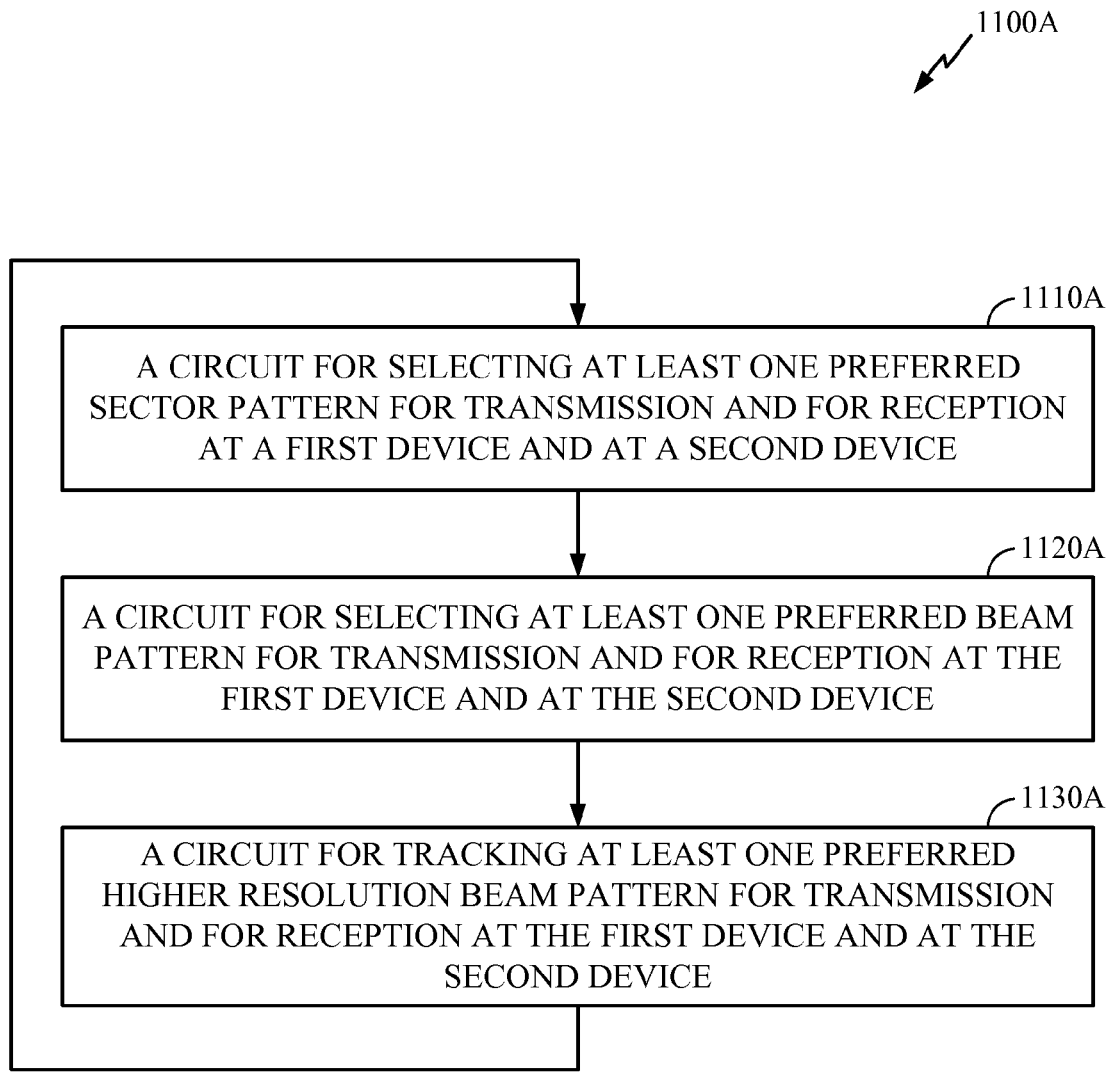
FIG. 11A illustrates example components capable of performing the operations illustrated in FIG. 1.

FIG. 11 illustrates example operations 1100 for the multi-resolution beamforming. Prior to the beamforming process, a first device and a second device may exchange antenna array information (not shown), such as the number of antennas along the z-axis, the number of antennas along the x-axis, the number of sectors the first device and the second device are going to use during coarse acquisition, the codebook identification (or number of beams) to be used during the beam-level training, and the codebook identification (or number of HRS beams) to be used during a tracking process. Furthermore, before every beamforming process, i.e., preceding every data session, the first device and the second device may exchange information about a number of one or more beamforming levels to be used for that particular data session.

As an exemplary case, a first device (e.g., a piconet controller) and a second device (e.g., a subscriber device) both have 1-D linear array of eight elements and employ the same sectoring. When the second device associates with the PNC, the two devices may exchange the following information: number of antennas along the z-axis $N_z$=8, number of antennas along the x-axis $N_x$=1, number of sectors equal to two, number of beams equal to eight, number of HRS beams for tracking equal to 32, a clustering information such as, for example, that one cluster comprises one beam that is equal to four HRS beams.

At 1110, according to some signal-quality metric, at least one preferred sector pattern may be selected for transmission/reception at the first device and at the second device. This selection process may be referred as a coarse-acquisition process. Each sector pattern may comprise a plurality of beam patterns. For example, one or more sectors used for transmission may be identified as providing the best signal (as measured by any combination of signal quality or performance metrics) at a receiver side.

The beam patterns within each selected sector may be grouped into clusters. Thus, each cluster may comprise a plurality of adjacent beam patterns, which may reside along both the x-axis and the z-axis, and each sector comprises one or more clusters. Clusters may comprise beams within the sector that are selected with respect to any combination of signal-quality or performance metrics.

At 1120, at least one preferred beam pattern for transmission and for reception may be selected at the first device and at the second device. This selection process may be referred as the fine acquisition process, and it may also comprise selection of one or more preferred clusters with respect to any combination of signal-quality or performance metrics. One or more beams may be selected with respect to any combination of signal-quality or performance metrics (such as the ESNR) and used for data communications. For certain aspects of the present disclosure, preferred beams may be intentionally selected within non-adjacent clusters in order to provide more than one separate paths between communicating devices. This may be especially beneficial when the preferred beam direction suddenly experience strong loss, and the alternative path is required in order to maintain a signal quality.

At 1130, at least one preferred beam pattern for transmission and reception may be tracked at the first device and at the second device. Tracking may also employ HRS beam codebooks for beams that provide higher resolution than the regular beams. HRS beams may be assigned to each selected cluster and used for low-rate tracking. Any combination of performance criteria may be used to update the selection of which HRS beam to use, and this re-evaluation process may be performed periodically at a low rate relative to data transmissions.

Figure 27:
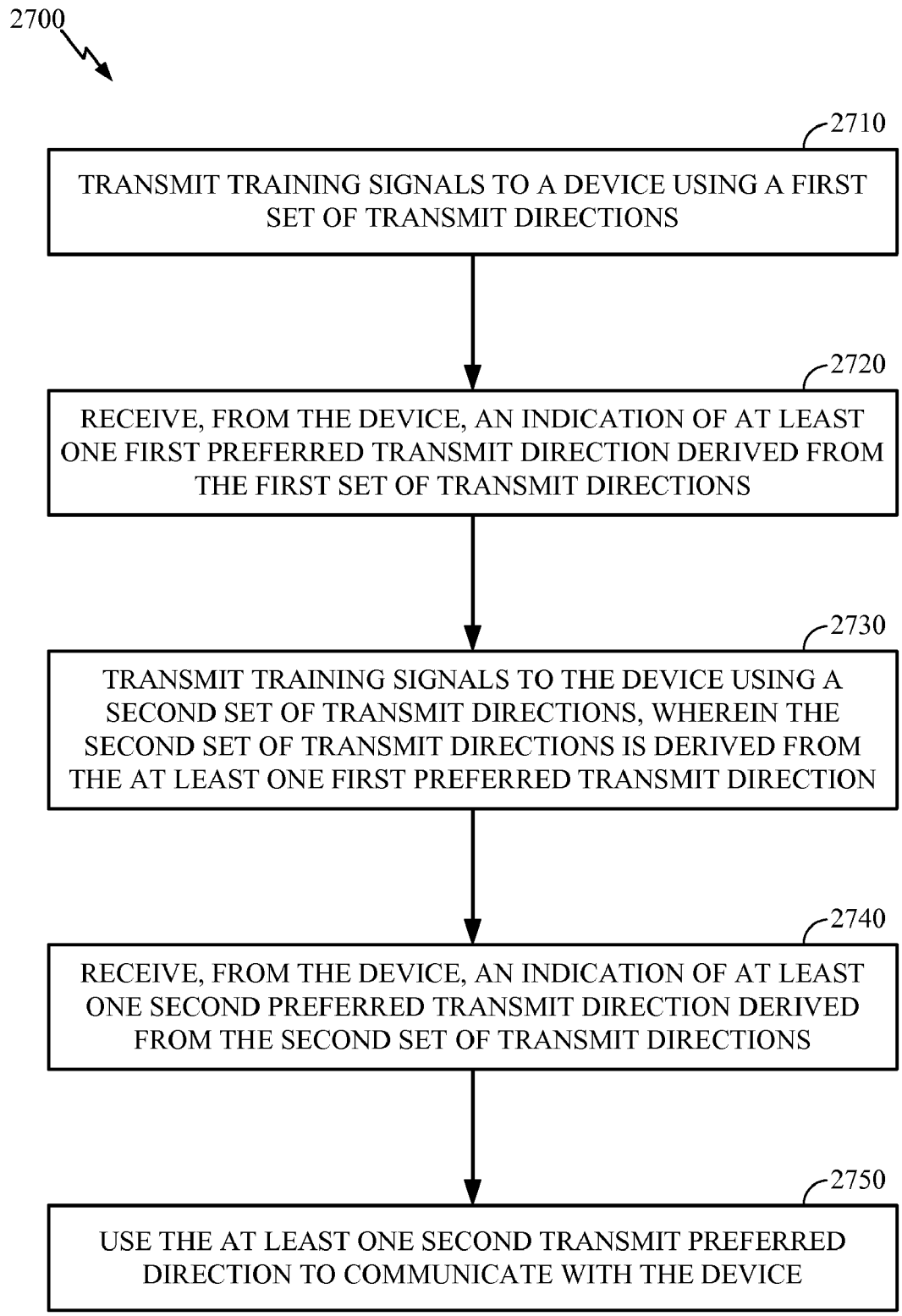
FIG. 27 illustrates example operations from a transmitter perspective for determining preferred transmit directions in accordance with certain aspects of the present disclosure.
Figure 27A:
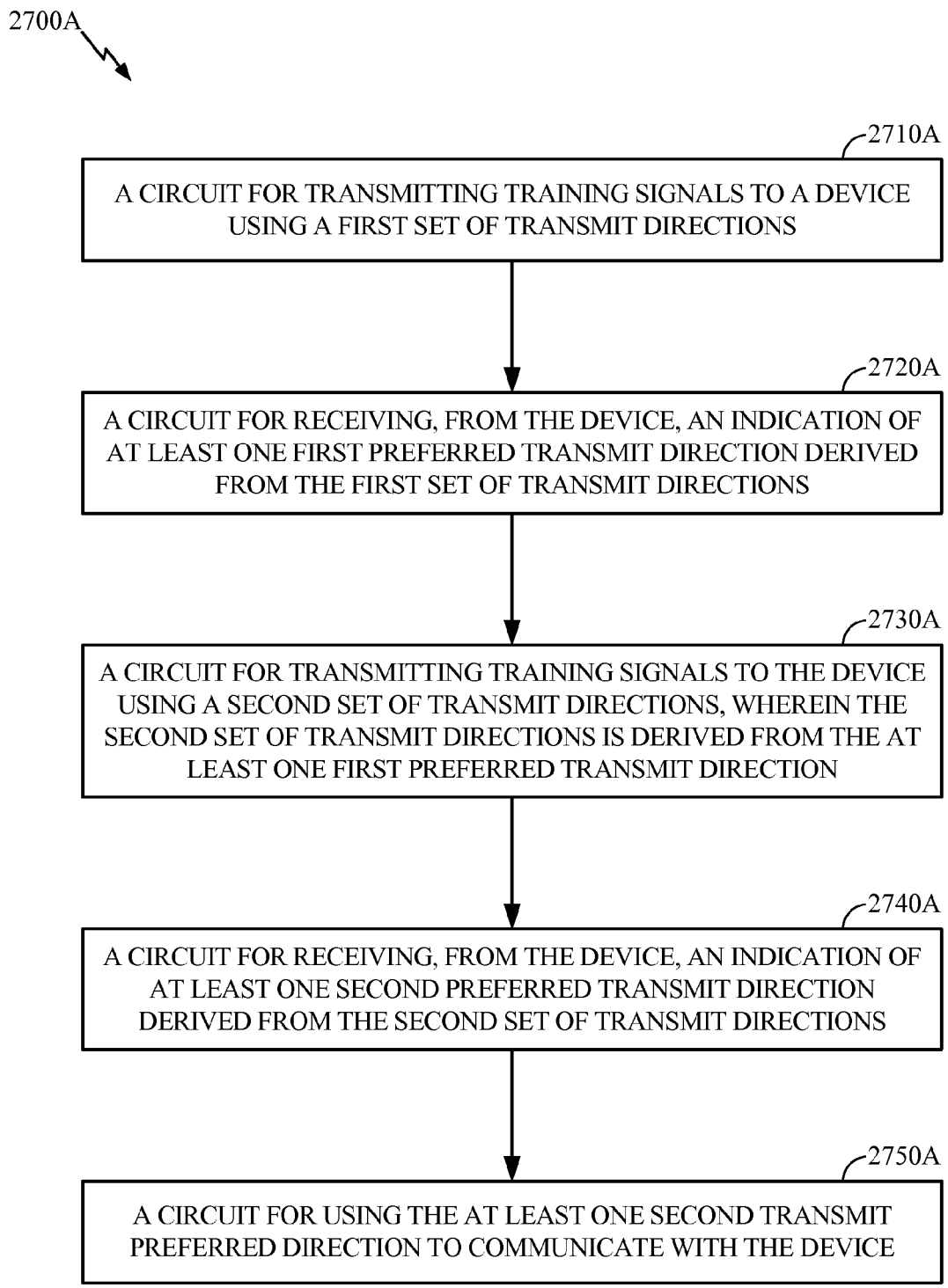
FIG. 27A illustrates example components capable of performing the operations illustrated in FIG. 27.

FIG. 27 illustrates example operations from a transmitter perspective for determining preferred transmit directions in accordance with certain aspects of the present disclosure. At 2710, training signals may be transmitted to a device using a first set of transmit directions. At 2720, an indication of at least one first preferred transmit direction derived from the first set of transmit directions may be received from the device. At 2730, training signals may be transmitted to the device using a second set of transmit directions, wherein the second set of transmit directions is derived from the at least one first preferred transmit direction. At 2740, an indication of at least one second preferred transmit direction derived from the second set of transmit directions may be received from the device. At 2750, the at least one second transmit preferred direction may be used to communicate with the device.

Figure 28:
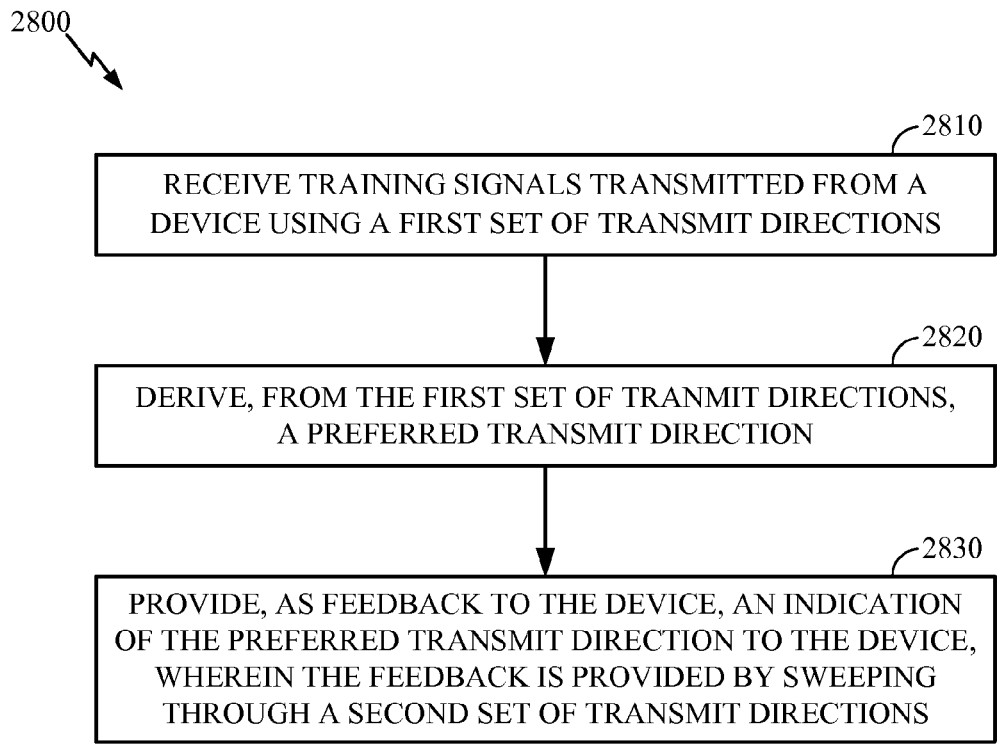
FIG. 28 illustrates example operations from a receiver perspective for determining preferred transmit directions in accordance with certain aspects of the present disclosure.
Figure 28A:
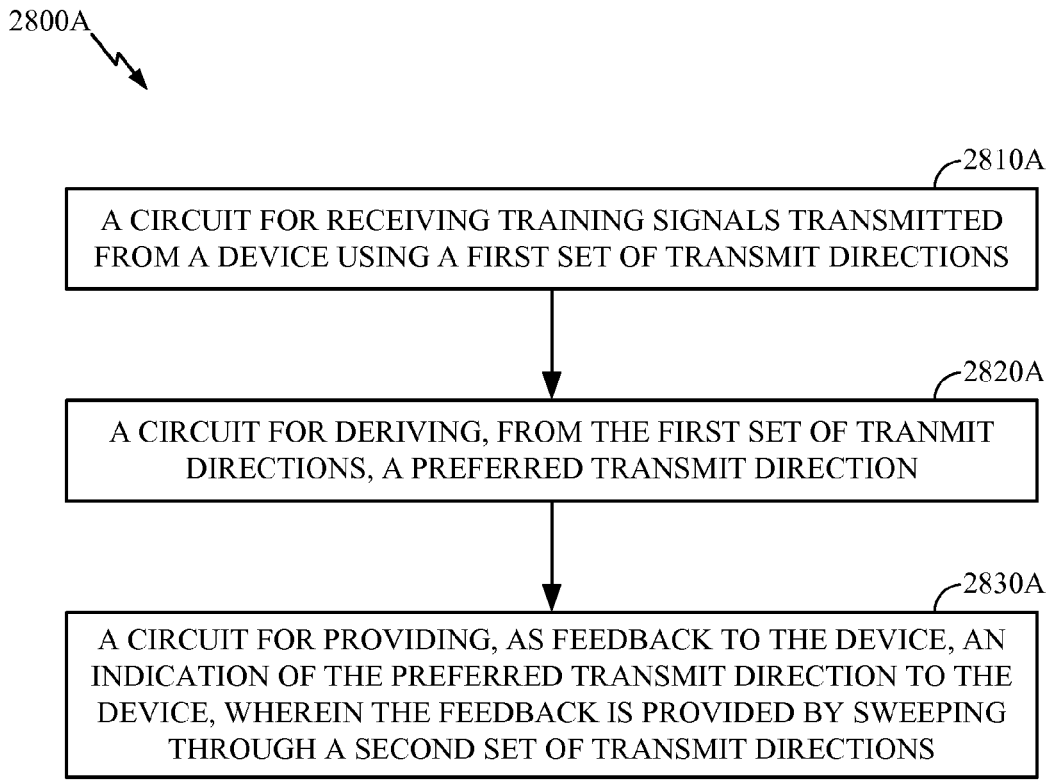
FIG. 28A illustrates example components capable of performing the operations illustrated in FIG. 28.

FIG. 28 illustrates example operations from a receiver perspective for determining preferred transmit directions in accordance with certain aspects of the present disclosure. At 2810, training signals transmitted from a device using a first set of transmit directions may be received. At 2820, a preferred transmit direction may be derived from the first set of transmit directions. At 2830, an indication of the preferred transmit direction to the device may be provided as a feedback to the device, wherein the feedback is provided by sweeping through a second set of transmit directions.

Operations 2700 and 2800 are general examples of multi-resolution beamforming. More specific examples of multi-resolution beamforming are described in the following text of the present disclosure.

Figure 12:
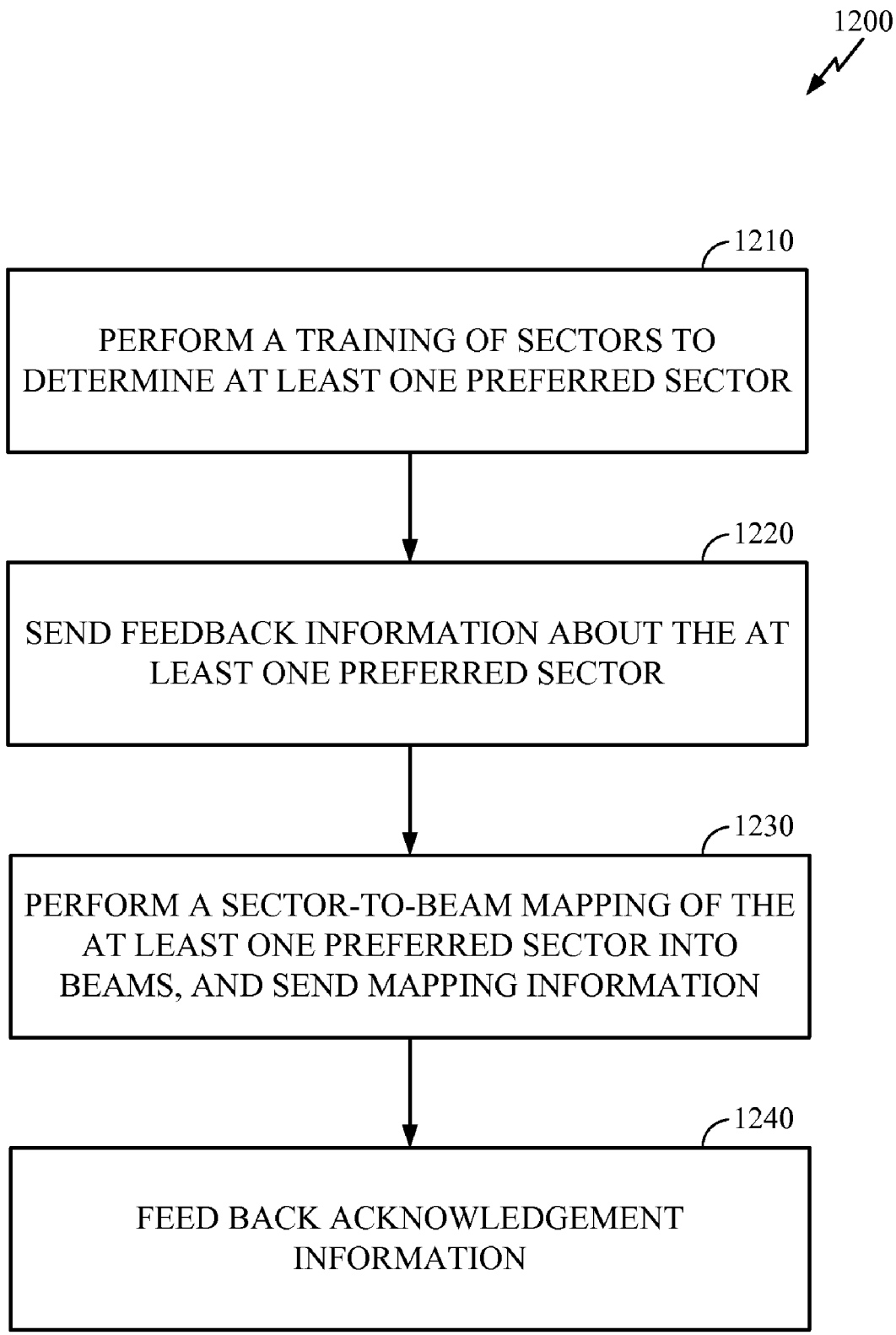
FIG. 12 illustrates example operations for sector-level training in accordance with certain aspects of the present disclosure.
Figure 12A:
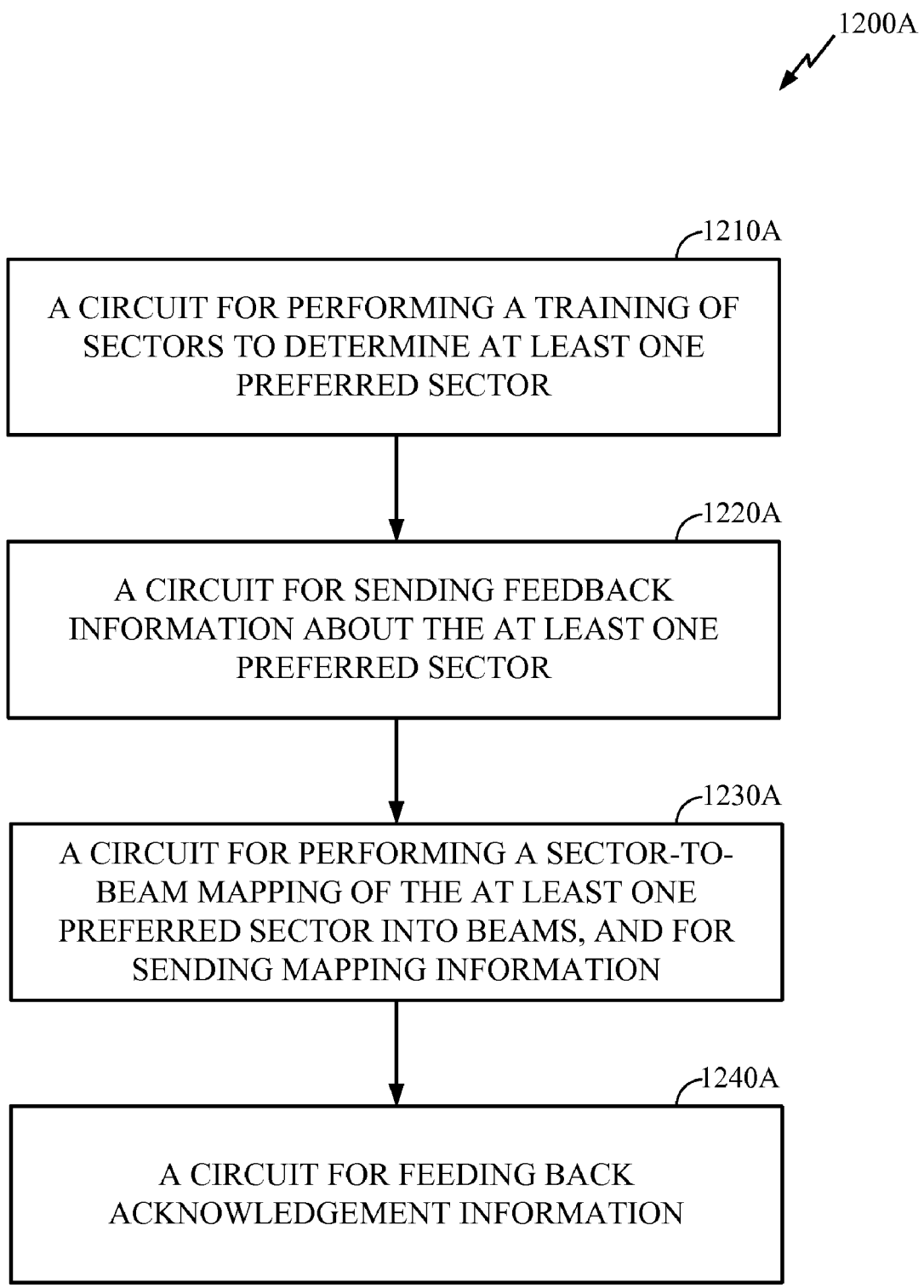
FIG. 12A illustrates example components capable of performing the operations illustrated in FIG. 12.

FIG. 12 illustrates example operations 1200 for four-stage sector-level training in accordance with certain aspects of the present disclosure. At 1210, training of sectors may be performed to determine at least one preferred sector. At 1220, feedback information may be sent to another device about the at least one preferred sector. After that, at 1230, a sector-to-beam mapping of the at least one preferred sector into beams be performed. For example, mapping may be implemented by slicing the at least one preferred sector into beams. A mapping message sent to another device may comprise information about a number of transmit and receive beam directions that this particular device may use in the beam-level training. Finally, at 1240, acknowledgement information may be fed back from this device in order to acknowledge a reception of the mapping message.

It is important to note that operations 1200 represent a logical division of sector-level training stages, i.e., some of these stages may be combined together during a communication over a physical wireless channel. For example, following the sector-level training stage 1210 from a DEV1 to a DEV2, the feedback and mapping messages may be sent combined from the DEV2 to the DEV1 as a part of the training sequences transmitted from the DEV2 to the DEV1 (i.e., as a part of the sector-level training stage 1210 from the DEV2 to the DEV1).

Figure 13:
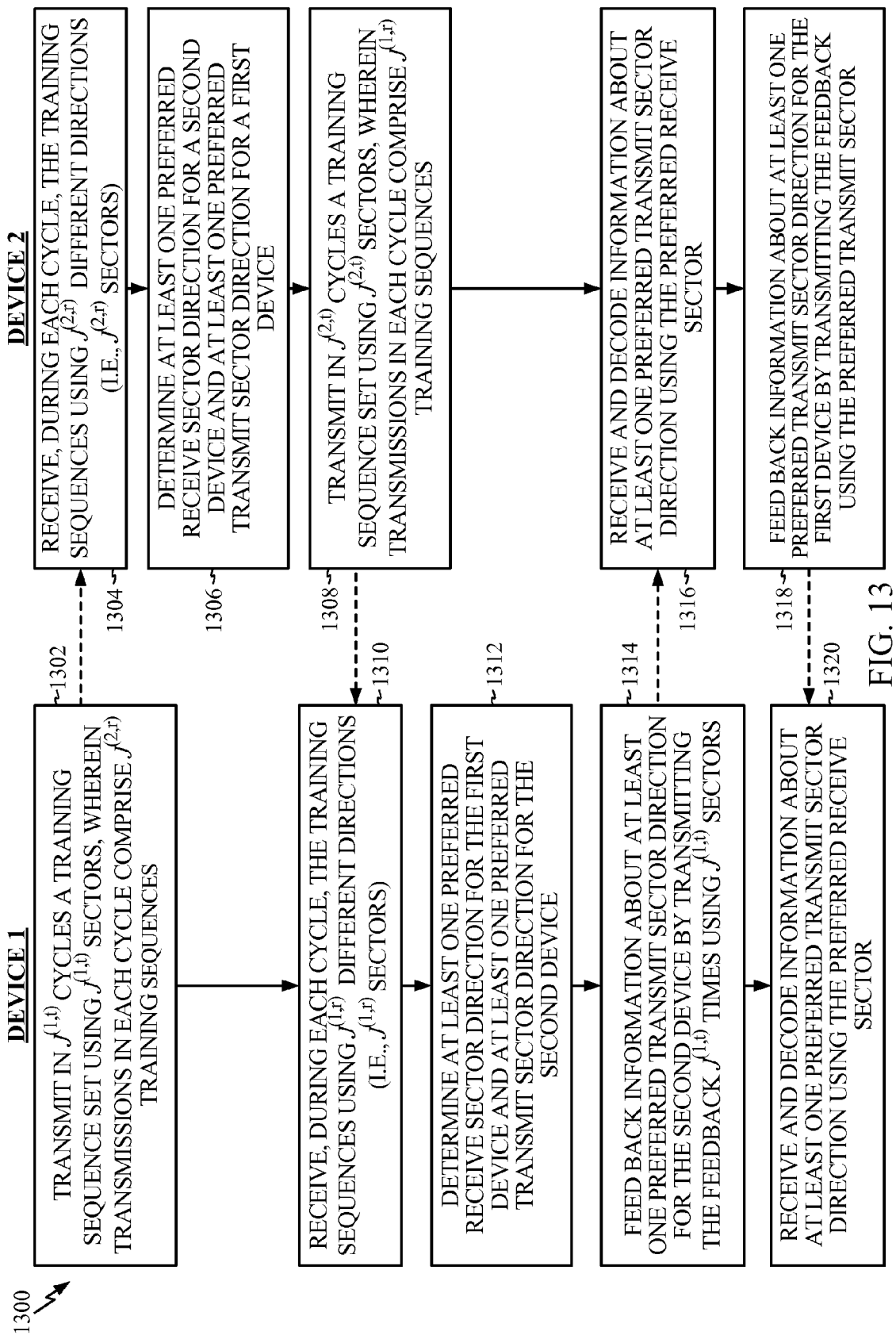
FIG. 13 illustrates example operations for determining preferred sectors in an Asymmetric Antenna System (AAS) in accordance with certain aspects of the present disclosure.
Figure 13A:
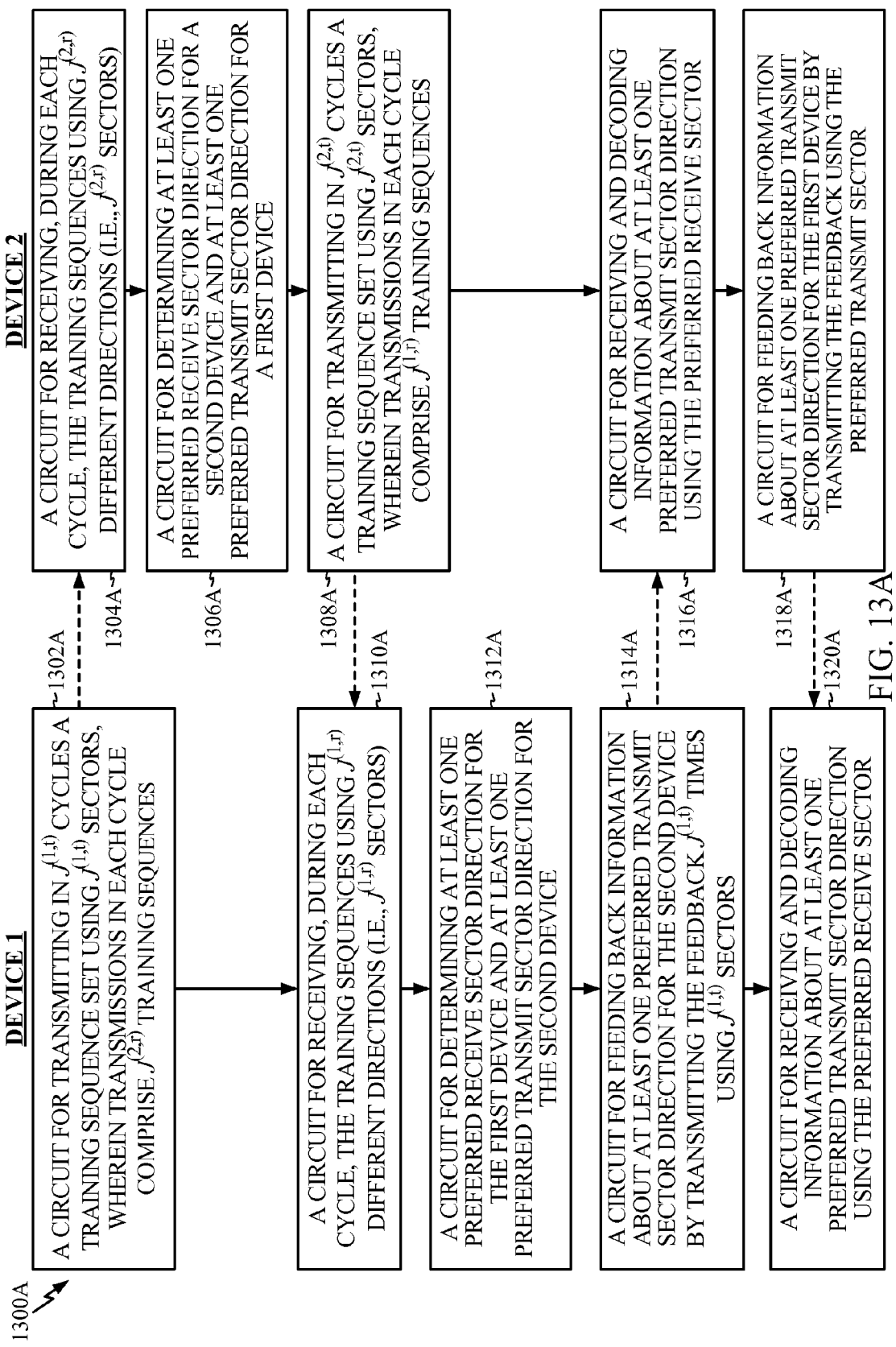
FIG. 13A illustrates example components capable of performing the operations illustrated in FIG. 13.

FIG. 13 illustrates example operations 1300 for determining preferred sectors in an Asymmetric Antenna System (AAS), and FIGS. 14A-14D illustrate frame structures broadcasted during the training and feedback phases. Operations 1300 may also correspond to step 1110 in FIG. 11. Steps 1302-1312 may correspond to the sector training stage 1210 from FIG. 12, while steps 1314-1320 may correspond to the feedback stage 1220. It can be assumed, without loss of generality, that devices may employ two-dimensional antenna arrays for both transmission and reception. The total number of transmit and receive antenna elements for DEV number d may be equal to $M^{(d,t)}$ and $M^{(d,r)}$, respectively. Each device may select its own sector codebooks. Each device may select its beam codebooks based on the number of antennas and a predetermined number of beams.

At 1302, the first device may transmit in $J^{(1,t)}$ cycles a training sequence set using $J^{(1,t)}$ sectors, as also illustrated in FIG. 14A. Each training sequence from the training sequence set is known at the second device and may be based on a pair of Golay sequences. The transmissions in each cycle may comprise $J^{(2,r)}$ training sequences sent in the same transmit sector of the first device and correspond to all possible receive sectors of the second device. At 1304, the second device may receive, during each cycle, the training sequences using $J^{(2,r)}$ different sectors. At 1306, based on received training sequences, at least one preferred receive sector direction for the second device may be determined, and at least one preferred transmit sector direction for the first device may be determined. Preferred sectors may be determined with respect to any combination of signal-quality or performance metrics. For certain aspects of the present disclosure, at 1302, $J^{(1,t)}$ training sequences in each cycle may be transmitted from the first device using $J^{(1,t)}$ different transmit sectors in each cycle. All $J^{(1,t)}$ training sequences within a cycle may be received at the second device with one out of $J^{(2,r)}$ different receive sectors, at 1304. In every next cycle, a new receive sector may be employed at the second device, and after $J^{(2,r)}$ cycles all $J^{(2,r)}$ receive sectors of the second device may be utilized.

At 1308, the second device may transmit in $J^{(2,t)}$ cycles a training sequence set using $J^{(2,t)}$ sectors, as illustrated in FIG. 14B. Each training sequence from the training sequence set is known at the first device and may be based on a pair of Golay sequences. The transmissions in each cycle may comprise $J^{(1,r)}$ training sequences sent in the same transmit sector of the second device and correspond to all possible receive sectors of the first device. At 1310, the first device may receive, during each cycle, the training sequences using $J^{(1,r)}$ different sectors. At 1312, based on received training sequences, at least one preferred receive sector direction for the first device may be determined, and at least one preferred transmit sector direction for the second device may be determined. Preferred sectors may be determined with respect to any combination of signal-quality or performance metrics. For certain aspects of the present disclosure, at 1308, $J^{(2,t)}$ training sequences in each cycle may be transmitted from the second device using $J^{(2,t)}$ different transmit sectors in each cycle. All $J^{(2,t)}$ training sequences within a cycle may be received at the first device with one out of $J^{(1,r)}$ receive sectors, at 1310. In every next cycle, a new receive sector may be employed at the first device, and after $J^{(1,r)}$ cycles all $J^{(1,r)}$ receive sectors of the first device may be utilized.

At 1314, the first device may feed back information about at least one preferred transmit sector direction for the second device by transmitting the feedback message $J^{(1,t)}$ times using $J^{(1,t)}$ sectors $S_0^{(1,t)}, \ldots, S_{f(1,t)}^{(1,t)}, \ldots, S_{f(1,t)-1}^{(1,t)}$, as also illustrated in FIG. 14C. At 1316, the second device may receive and decode information about at least one preferred transmit sector direction using the preferred receive sector $S_{f(2,r)}^{(2,r)}$, as illustrated in FIG. 14C. For certain aspects of the present disclosure when the first device is omni-capable, sweeping through all transmit sectors may not be required. At 1318, the second device may feed back information about at least one preferred transmit sector direction for the first device by transmitting the feedback message using the preferred transmit sector $S_{f(2,t)}^{(2,t)}$, as illustrated in FIG. 14D. At 1320, the first device may receive and decode information about at least one preferred transmit sector direction using its preferred receive sector $S_{f(1,r)}^{(1,r)}$, as illustrated in FIG. 14D.

Upon completion of the feedback stage, both devices may know their preferred transmit and receive sector(s). The mapping stage may follow the feedback stage, as illustrated in FIG. 12 with the step 1230. In this stage, one device may map preferred transmit and receive sector(s) into beams and may send related information to the other device. Upon successful reception of this information, the other device may feed back an acknowledgement message, as illustrated in FIG. 12 with the step 1240.

Figure 15:
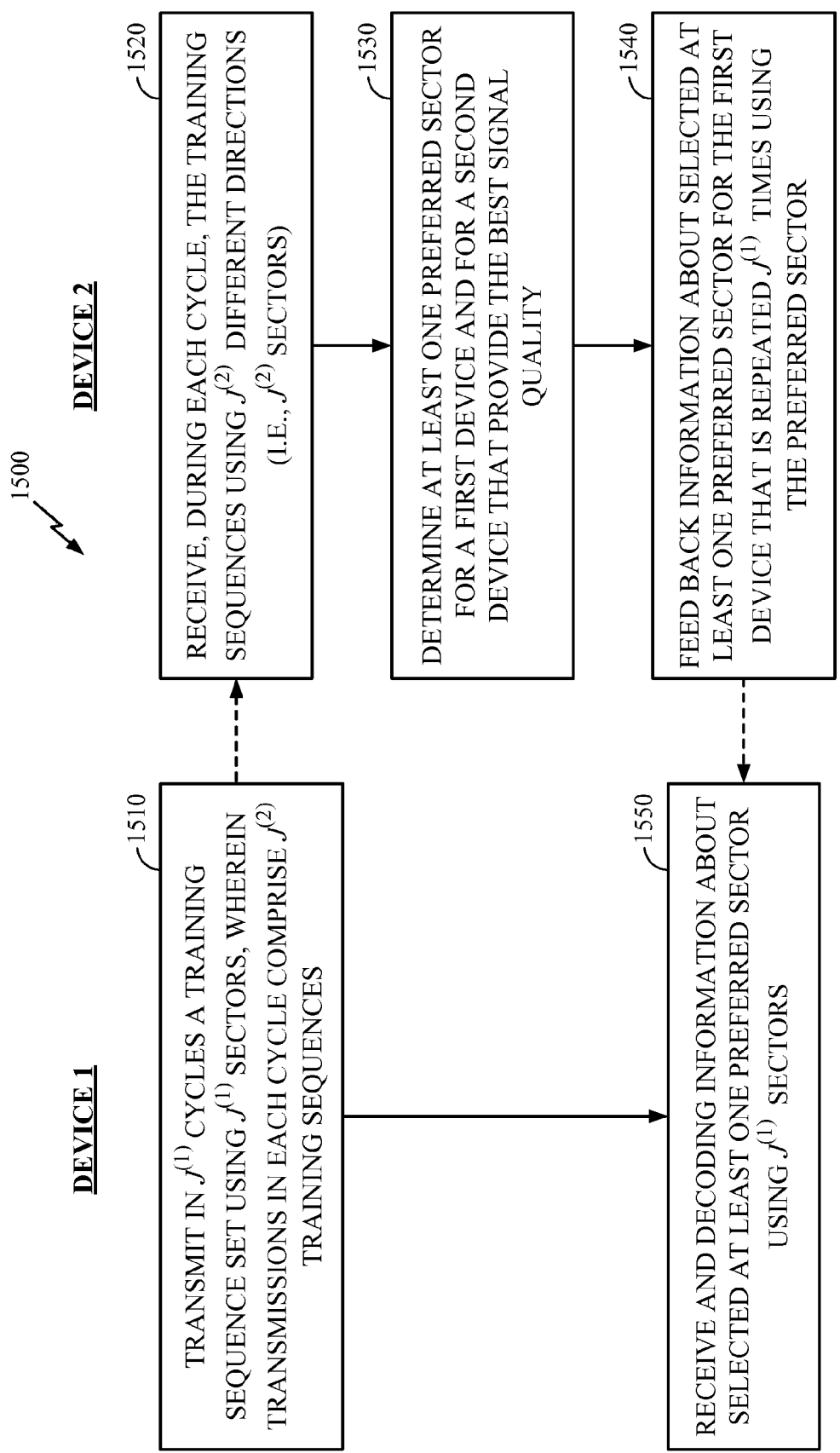
FIG. 15 illustrates example operations for determining preferred sectors in a Symmetric Antenna System (SAS) in accordance with certain aspects of the present disclosure.
Figure 15A:
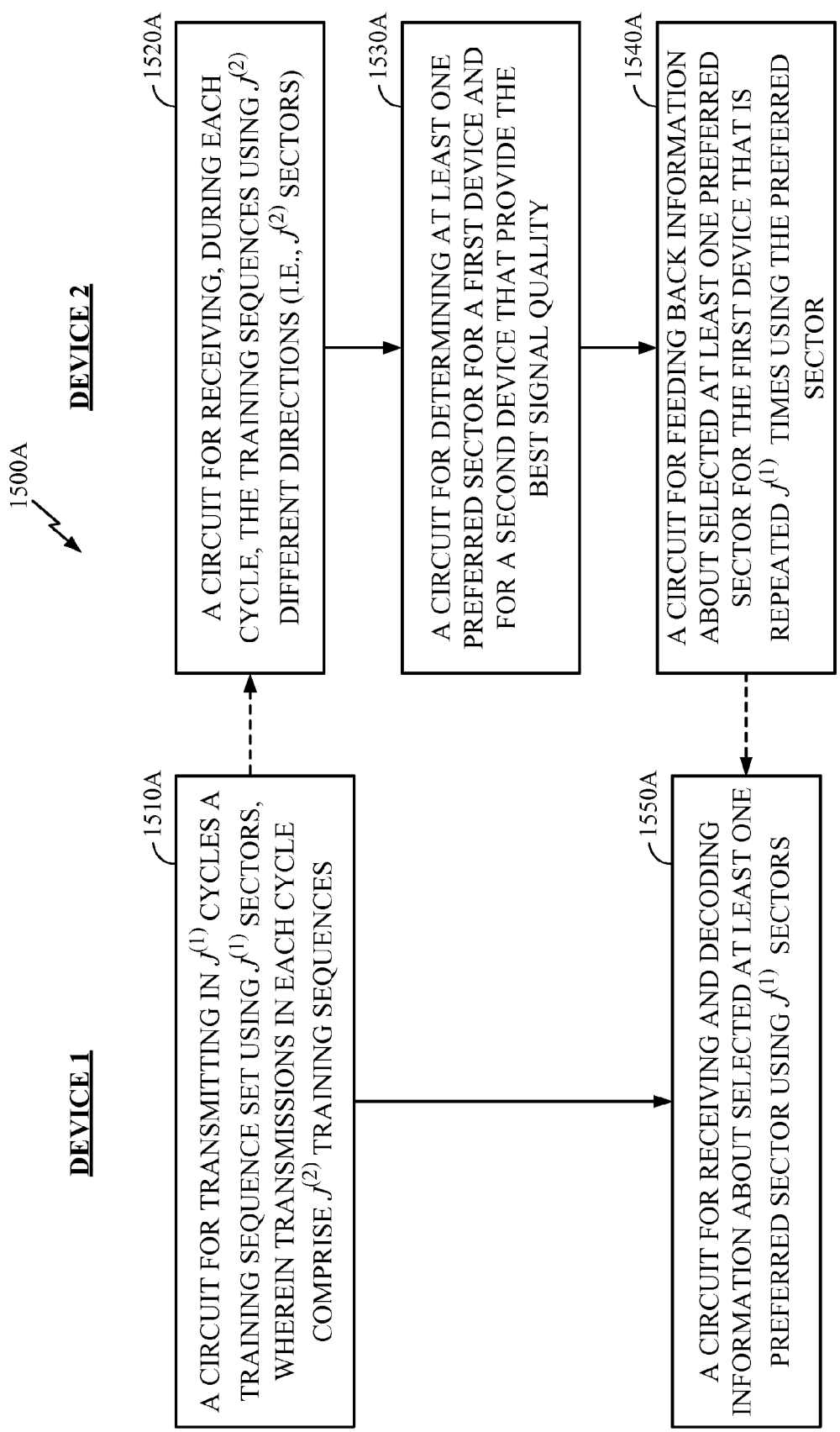
FIG. 15A illustrates example components capable of performing the operations illustrated in FIG. 15.

FIG. 15 illustrates example operations for determining preferred sectors in a Symmetric Antenna System (SAS), and FIGS. 16A-16B illustrate frame structures broadcasted during the training and feedback phases. Operations 1500 may also correspond to step 1110 in FIG. 11. Steps 1510-1530 may correspond to the sector training stage 1210 from FIG. 12, while steps 1540-1550 may correspond to the feedback stage 1220. It can be again assumed, without loss of generality, that devices may employ two-dimensional antenna arrays for both transmission and reception, while each device utilizes identical antenna arrays for both transmission and reception. A first device may comprise a two-dimensional antenna array having $N_x \times N_z = M^{(1)}$ elements, and a second device comprises a two-dimensional antenna array having $M_x \times M = M^{(2)}$ elements. For this aspect of the present disclosure, $J^{(1)}$ denotes the number of sectors for the first device, and $J^{(2)}$ denotes the number of sectors for the second device. Each device may select its own sector codebooks. Each device may select its beam codebooks based on the number of antennas and a predetermined number of beams.

At 1510, the first device may transmit in $J^{(1)}$ cycles a training sequence set using $J^{(1)}$ sectors, as illustrated in FIG. 16A. Each training sequence from the training sequence set is known at the second device and may be based on a pair of Golay sequences. The transmissions in each cycle may comprise $J^{(2)}$ training sequences sent in the same sector of the first device and correspond to all possible sectors of the second device. At 1520, the second device may receive, during each cycle, the training sequences using $J^{(2)}$ different sectors. At 1530, based on received training sequences, at least one preferred sector direction for the second device may be determined, and at least one preferred sector direction for the first device may be determined. Preferred sectors may be determined with respect to any combination of signal-quality or performance metrics. For certain aspects of the present disclosure, at 1510, $J^{(1)}$ training sequences in each cycle may be transmitted from the first device using $J^{(1)}$ different sectors in each cycle. All $J^{(1)}$ training sequences within a cycle may be received at the second device with one out of $J^{(2)}$ sectors, at 1520. In every next cycle, a new sector may be employed at the second device, and after $J^{(2)}$ cycles all $J^{(2)}$ sectors of the second device may be utilized.

At 1540, the second device may feed back information about at least one previously determined preferred sector direction for the first device by transmitting the feedback message $J^{(1)}$ times using its preferred sector $S_{j^{(2)}}^{(2)}$, as illustrated in FIG. 16B. At 1550, the first device may receive and decode information about at least one preferred sector direction using $J^{(1)}$ sectors $S_0^{(1)}, \ldots, S_{j^{(1)}}^{(1)}, \ldots, S_{J^{(1)}-1}^{(1)}$, as illustrated in FIG. 16B.

Upon completion of the feedback stage, both devices may know their preferred sector(s). The mapping stage may follow the feedback stage, as illustrated in FIG. 12 with the step 1230. In this stage, one device may map preferred sector(s) into clusters of beams and into beam patterns, and may also send related information to the other device. Upon successful reception of this information, the other device may feed back an acknowledgement message, as illustrated in FIG. 12 with the step 1240.

Figure 17:
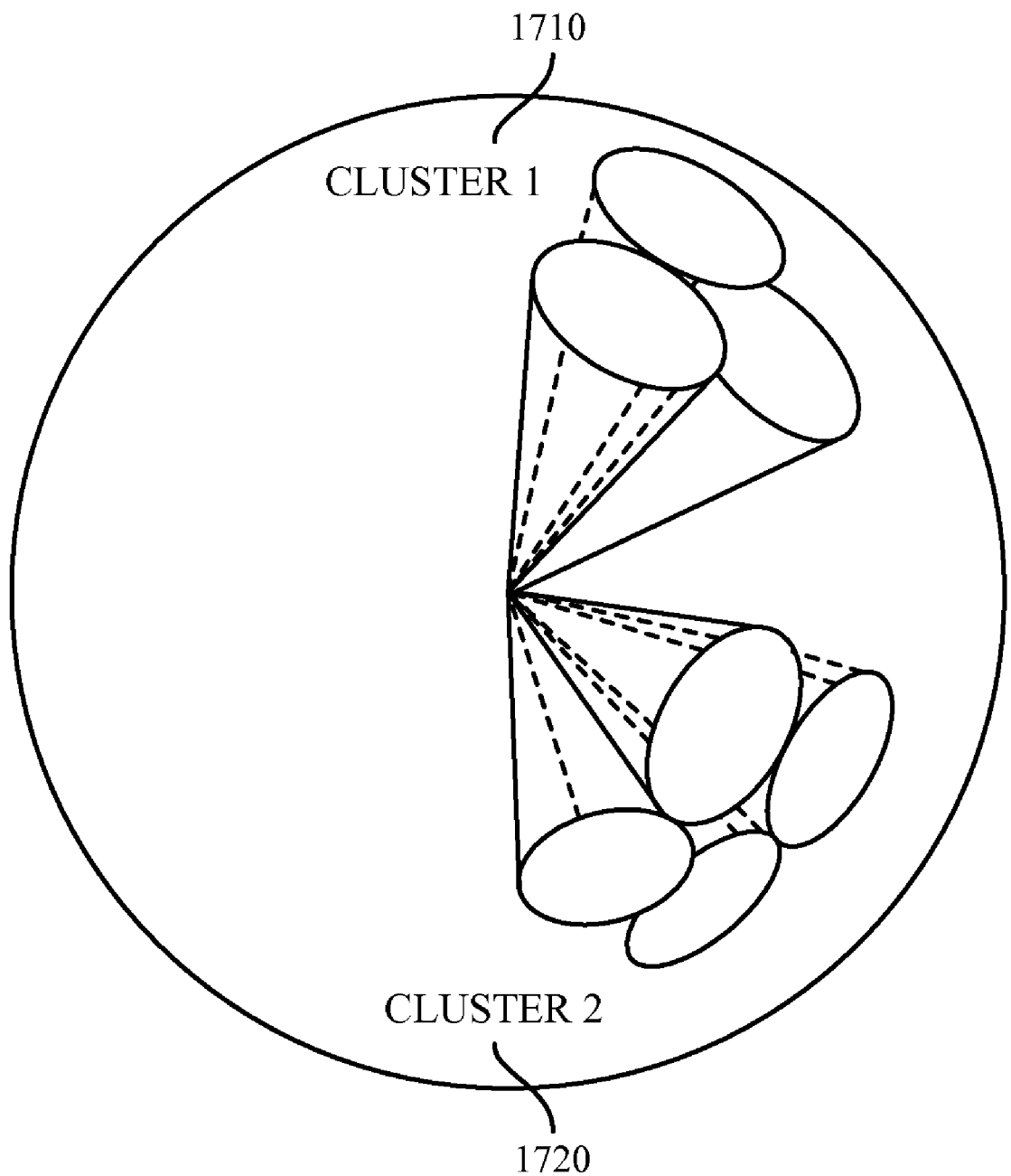
FIG. 17 illustrates example of a pair of clusters comprising a plurality of beams in accordance with certain aspects of the present disclosure.

FIG. 17 illustrates an exemplary case wherein the device selects two preferred sectors and partitions the sectors into clusters 1710 and 1720. Each cluster may comprise a plurality of beams. As illustrated in FIG. 17, a cluster, as used herein, may refer to a set of adjacent beams. The device may also employ the beam codebooks for mapping the beams to the sector(s).

Figure 18:
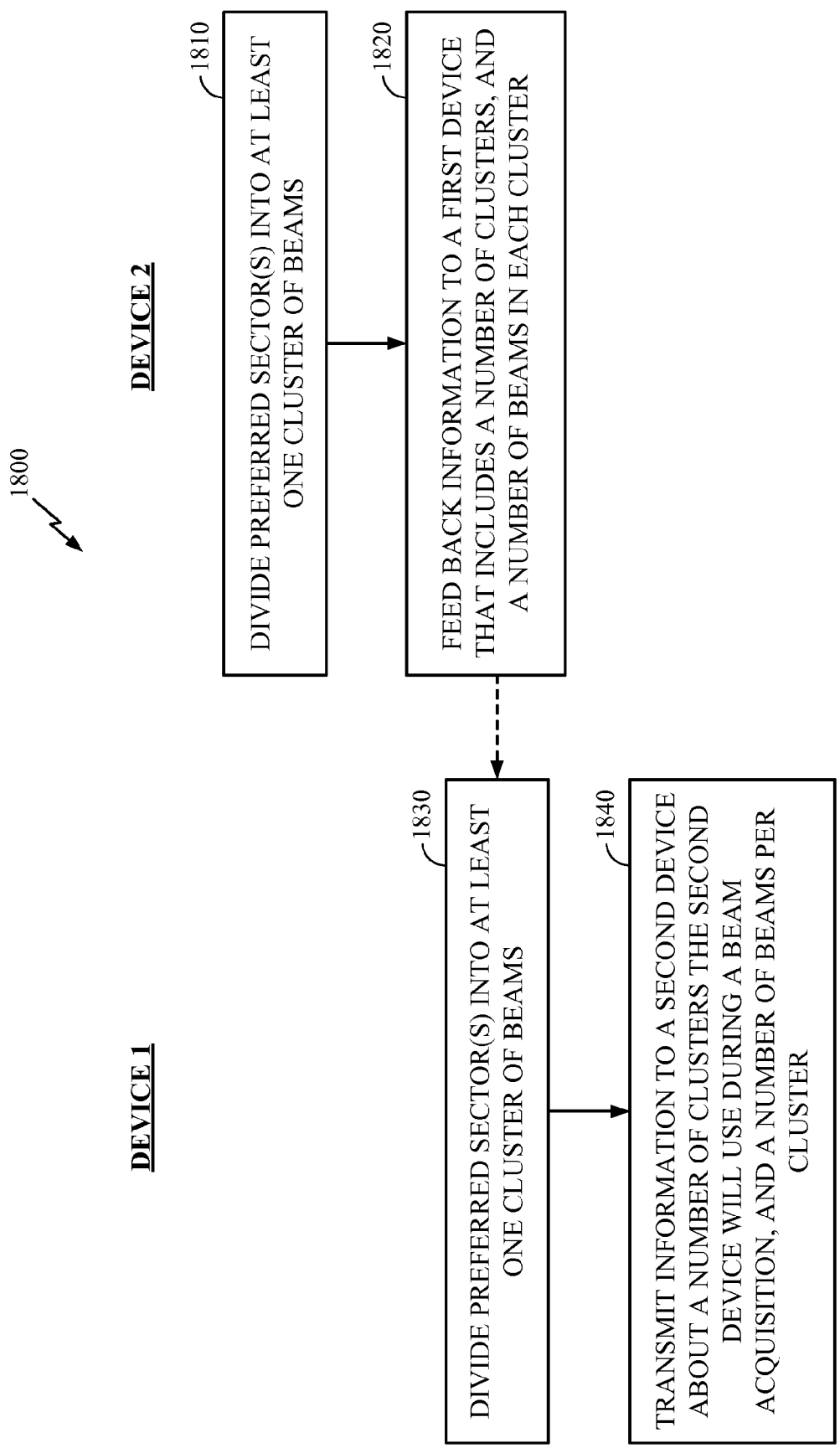
FIG. 18 illustrates example operations for dividing preferred sectors into clusters of beams in accordance with certain aspects of the present disclosure.
Figure 18A:
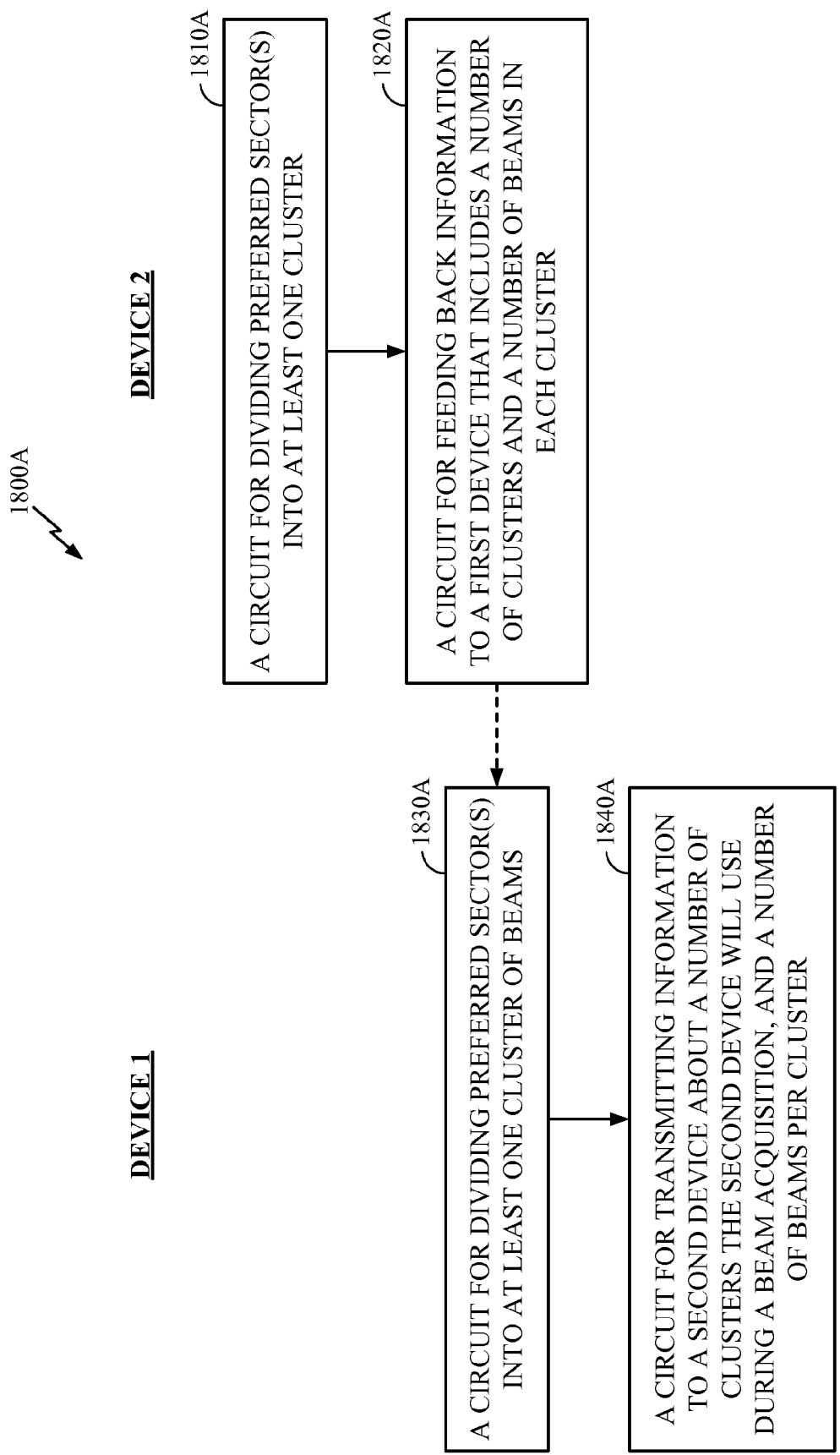
FIG. 18A illustrates example components capable of performing the operations illustrated in FIG. 18.

FIG. 18 illustrates example operations 1800 for dividing preferred sectors into clusters of beams as a part of the mapping stage 1230 from FIG. 12. At 1810, a device may divide its preferred transmit and receive sector(s) into at least one cluster of beams. At 1820, the device may send feedback information to other device that includes a number of clusters, a number of beams in each cluster, codeword identifiers of the beams in each cluster, and which beams belong to which clusters.

The other device may also divide its preferred transmit and receive sector(s) into at least one cluster of beams, at 1830, and it may inform, at 1840, the device about the number of clusters it will use during beam acquisition, the number of beams per cluster, and codeword identifiers of beams in each cluster.

Figure 19:
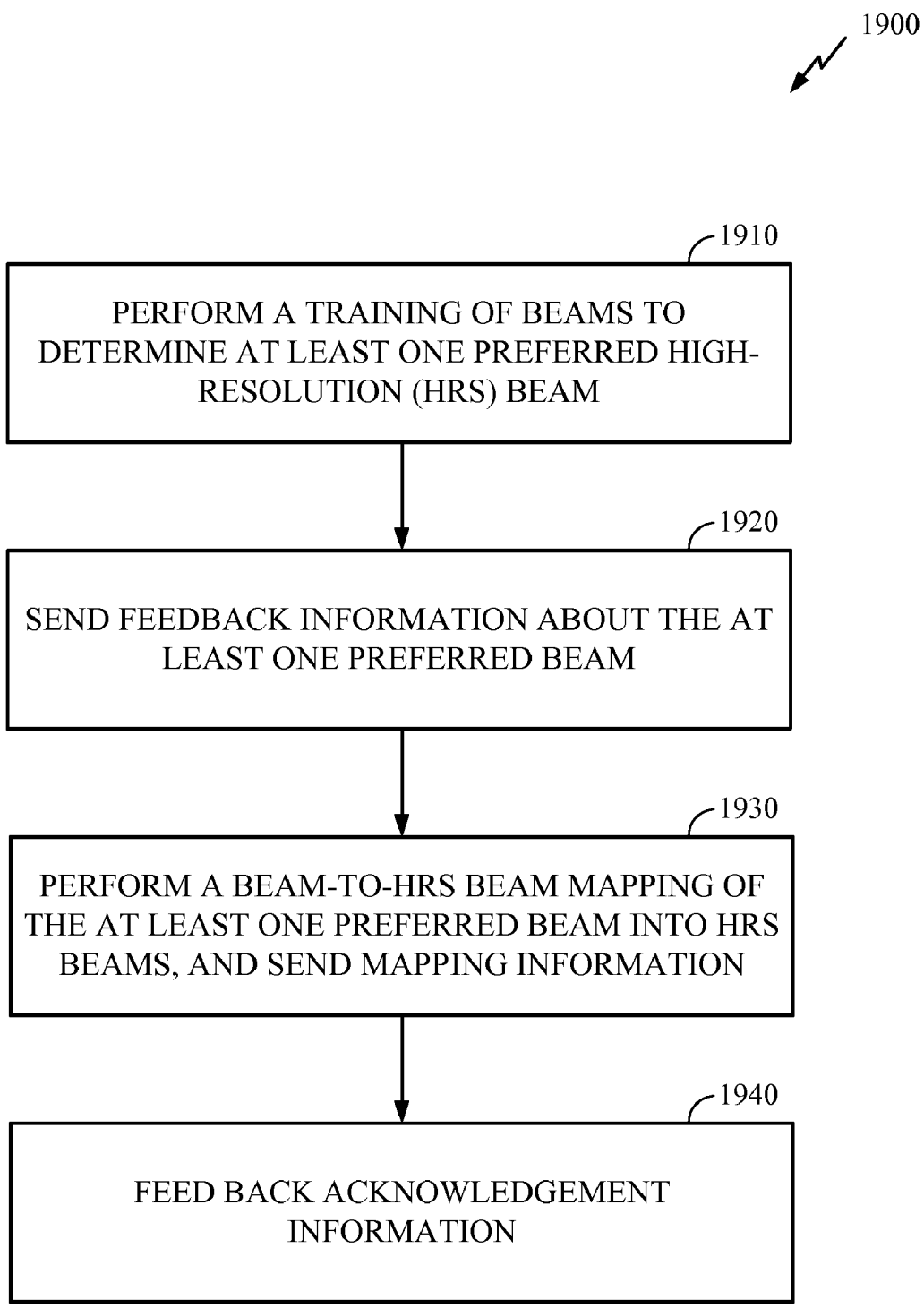
FIG. 19 illustrates example operations for beam-level training in accordance with certain aspects of the present disclosure.
Figure 19A:
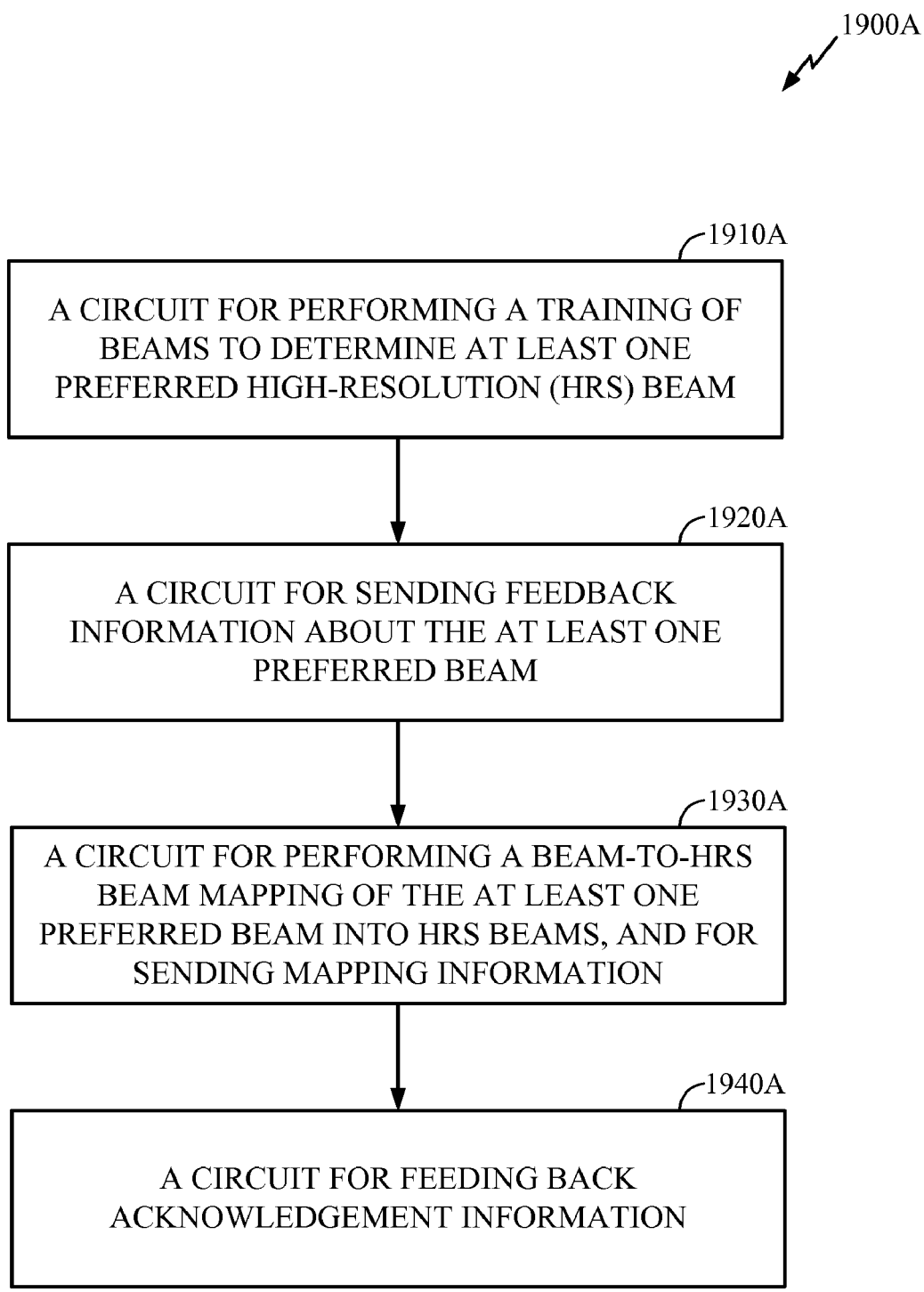
FIG. 19A illustrates example components capable of performing the operations illustrated in FIG. 19.

FIG. 19 illustrates example operations 1900 for four-stage beam-level training in accordance with certain aspects of the present disclosure. At 1910, training of beams may be performed to determine at least one preferred beam. At 1920, feedback information may be sent to another device about the at least one preferred beam. After that, at 1930, a sector-to-HRS beam mapping of the at least one preferred beam into HRS beams may be performed. For example, mapping may be implemented by slicing the at least one preferred sector into beams. A mapping message sent to another device may comprise information about a number of transmit and receive HRS beam directions that this particular device may use during the tracking phase. Finally, at 1940, acknowledgement information may be fed back from this device in order to acknowledge a reception of the mapping message.

It is important to note that operations 1900 represent a logical division of beam-level training stages, i.e., some of these stages may be combined together during a communication over a physical wireless channel. For example, following the beam-level training stage 1910 from a DEV1 to a DEV2, the feedback and mapping messages may be sent combined from the DEV2 to the DEV1 as a part of the training sequences transmitted from the DEV2 to the DEV1 (i.e., as a part of the beam-level training stage 1910 from the DEV2 to the DEV1).

Figure 20A:
FIG. 20A illustrates example components capable of performing the operations illustrated in FIG. 20.

FIG. 20 illustrates example operations 2000 for determining preferred beams within sectors in the AAS, and FIGS. 21A-21D illustrate frame structures broadcasted during the training and feedback phases. Operations 2000 may also correspond to step 1120 in FIG. 11. Steps 2002-2012 may correspond to the beam training stage 1910 from FIG. 19, while steps 2014-2020 may correspond to the feedback stage 1920.

At 2002, the first device may transmit in $K^{(1,t)}$ cycles a training sequence set using $K^{(1,t)}$ beams, as illustrated in FIG. 21A. Each training sequence from the training sequence set is known at the second device and may be based on a pair of Golay sequences. The transmissions in each cycle may comprise $K^{(2,r)}$ training sequences sent in the same transmit beam of the first device and correspond to all possible receive beams of the second device. At 2004, the second device may receive, during each cycle, the training sequences using $K^{(2,r)}$ different beams. At 2006, based on received training sequences, at least one preferred receive beam direction for the second device may be determined, and at least one preferred transmit beam direction for the first device may be determined. Preferred beams may be determined with respect to any combination of signal-quality or performance metrics. For certain aspects of the present disclosure, at 2002, $K^{(1,t)}$ training sequences in each cycle may be transmitted from the first device using $K^{(1,t)}$ different transmit beams in each cycle. All $K^{(1,t)}$ training sequences within a cycle may be received at the second device with one out of $K^{(2,r)}$ receive beams, at 2004. In every next cycle, a new receive beam may be employed at the second device, and after $K^{(2,r)}$ cycles all $K^{(2,r)}$ receive beams of the second device may be utilized.

At 2008, the second device may transmit in $K^{(2,t)}$ cycles a training sequence set using $K^{(2,t)}$ beams, as illustrated in FIG. 21B. Each training sequence from the training sequence set is known at the first device and may be based on a pair of Golay sequences. The transmissions in each cycle may comprise $K^{(1,r)}$ training sequences sent in the same transmit beam of the second device and correspond to all possible receive beams of the first device. At 2010, the first device may receive, during each cycle, the training sequences using $K^{(1,r)}$ different beams. At 2012, based on received training sequences, at least one preferred receive beam direction for the first device may be determined, and at least one preferred transmit beam direction for the second device may be determined. Preferred beams may be determined with respect to any combination of signal-quality or performance metrics. For certain aspects of the present disclosure, at 2008, $K^{(2,t)}$ training sequences in each cycle may be transmitted from the second device using $K^{(2,t)}$ different transmit beams in each cycle. All $K^{(2,t)}$ training sequences within a cycle may be received at the first device with one out of $K^{(1,r)}$ receive beams. In every next cycle, a new receive beam may be employed at the first device, and after $K^{(1,r)}$ cycles all $K^{(1,r)}$ receive beams of the first device may be utilized.

At 2014, the first device may feed back information about at least one preferred transmit beam direction for the second device by transmitting the feedback message using the preferred transmit sector $S_{j^{(1,t)}}{}^{(1,t)}$ chosen in the sector-level training, as illustrated in FIG. 21C. At 2016, the second device may receive and decode information about at least one preferred transmit beam direction using the preferred receive sector $S_{j^{(2,r)}}{}^{(2,r)}$, as illustrated in FIG. 21C. At 2018, the second device may feed back information about at least one preferred transmit beam direction for the first device by transmitting the feedback message using the preferred transmit beam $B_{k^{(2,t)}}{}^{(2,t)}$, as illustrated in FIG. 21D, or the preferred transmit sector $S_{j^{(2,t)}}{}^{(2,t)}$ chosen in the sector-level training. At 2020, the first device may receive and decode information about at least one preferred transmit beam direction using the preferred receive beam $B_{k^{(1,r)}}{}^{(1,r)}$, as illustrated in FIG. 21D, or using the preferred receive sector $S_{j^{(1,r)}}{}^{(1,r)}$ chosen in the sector-level training.

Upon completion of the feedback stage, both devices may know their preferred transmit and receive beam(s). The mapping stage may follow the feedback stage, as illustrated in FIG. 19 with the step 1930. In this stage, one device may map preferred transmit and receive beam(s) into high-resolution beams and may send related information to the other device. Upon successful reception of this information, the other device may feed back an acknowledgement message, as illustrated in FIG. 19 with the step 1940.

In addition to the beam-acquisition procedure where the preferred beams are determined at both devices, the first device may also adapt the number of beams in one or more clusters and transmit those changes to the second device. For example, the first device may reduce the number of beams in each cluster. The first device may transmit this information using its preferred transmit beam. The second device may receive this information using its preferred receive beam and feeds back an acknowledgment message.

Figure 22:
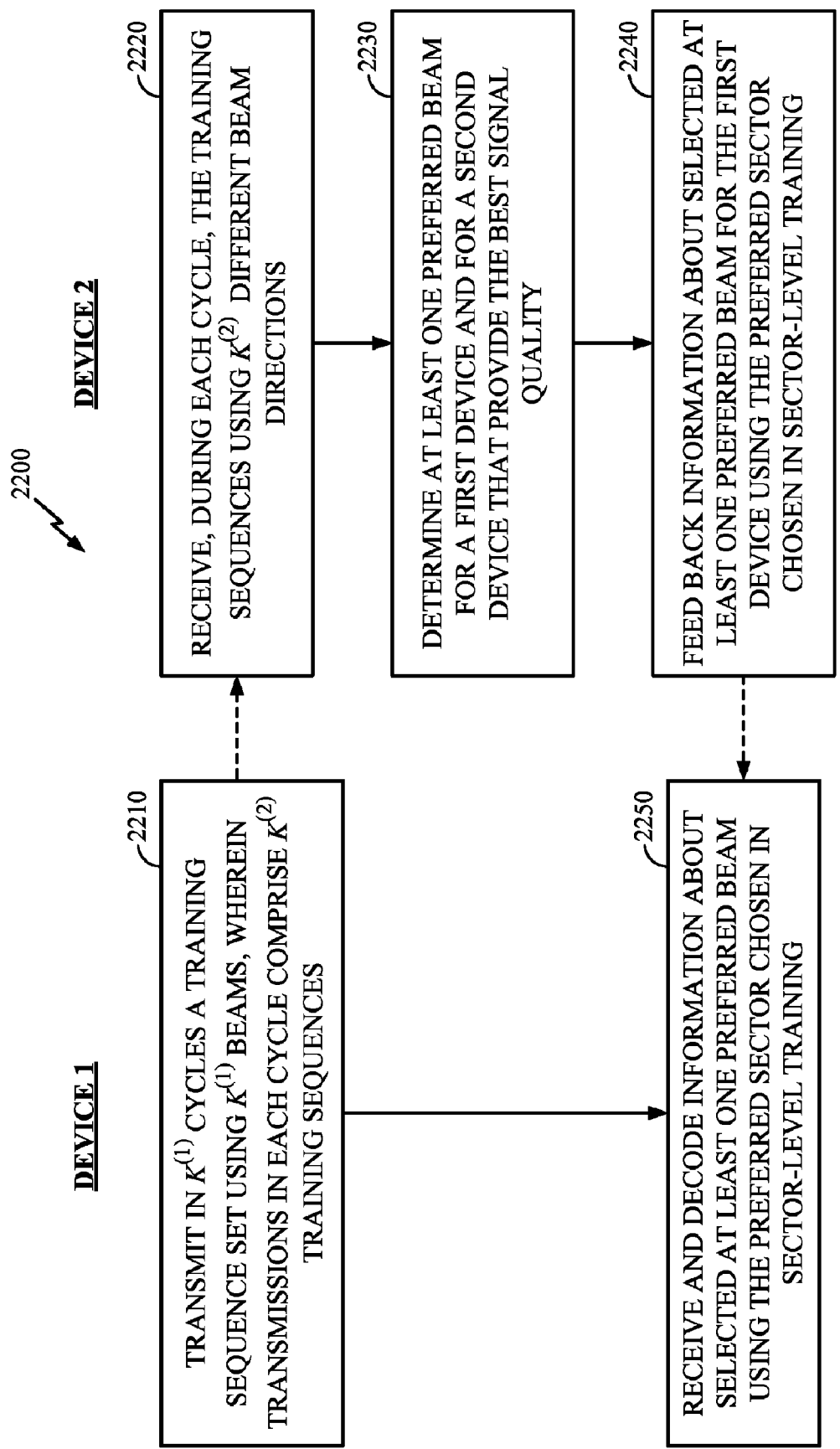
FIG. 22 illustrates example operations for determining preferred beams in the SAS in accordance with certain aspects of the present disclosure.
Figure 22A:
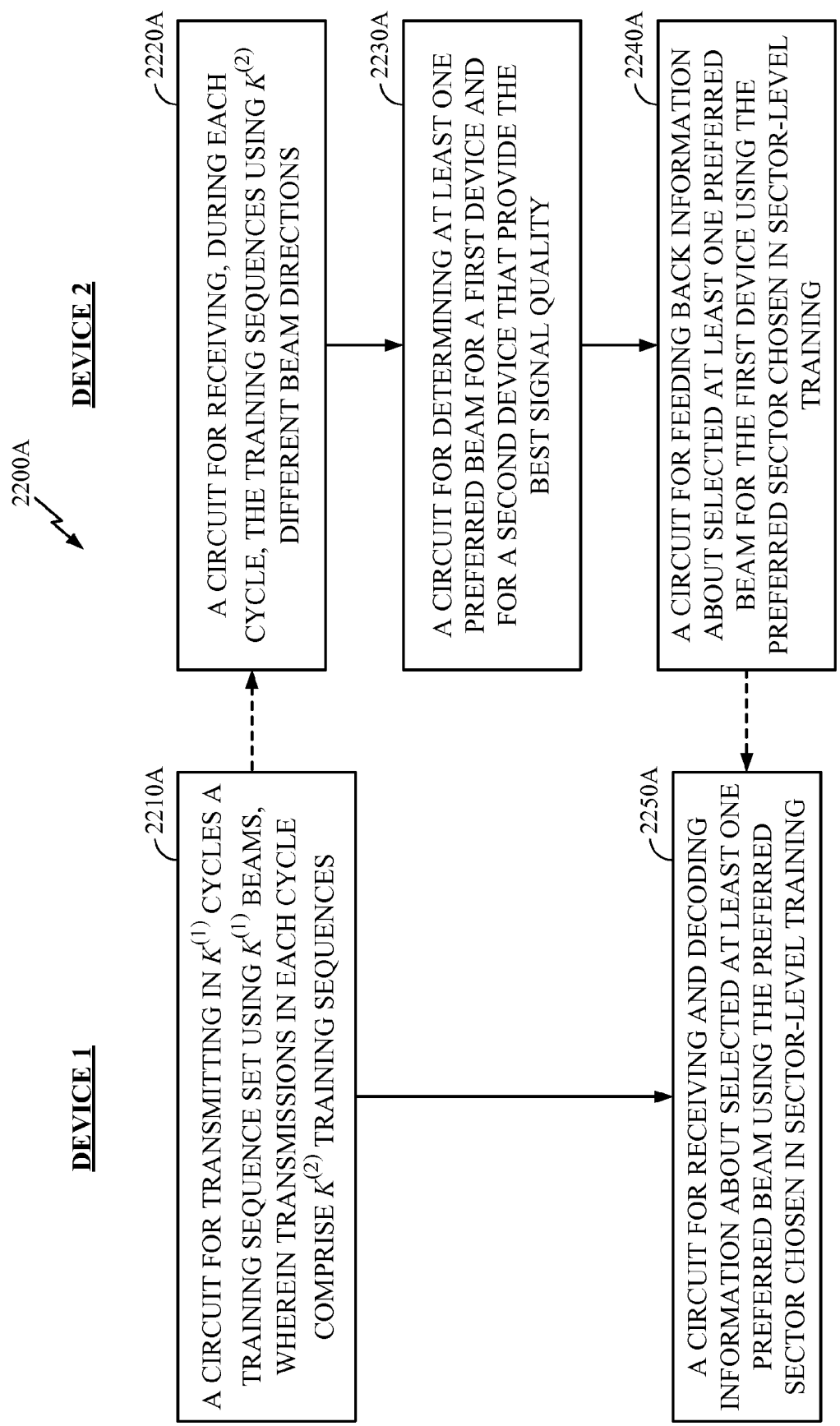
FIG. 22A illustrates example components capable of performing the operations illustrated in FIG. 22.
Figure 23A:
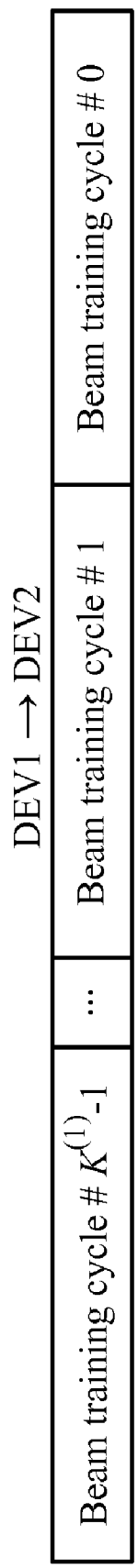
FIGS. 23A-23B illustrate frame structures used for determining preferred beams in the SAS in accordance with certain aspects of the present disclosure.
Figure 23B:
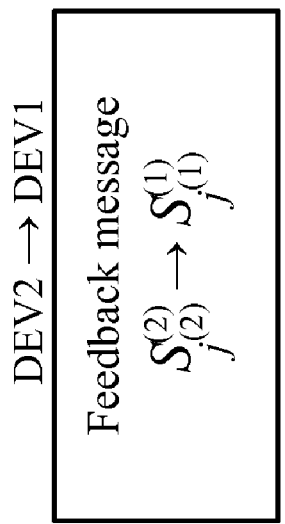

FIG. 22 illustrates example operations for determining preferred beams for transmission/reception in the SAS, and FIGS. 23A-23B illustrate frame structures broadcasted during the training and feedback phases. Operations 2200 may also correspond to step 1120 in FIG. 11. Steps 2210-2230 may correspond to the beam training stage 1910 from FIG. 19, while steps 2240-2250 may correspond to the feedback stage 1920. For this aspect of the present disclosure, $K^{(1)}$ denotes the number of beams for the first device, and $K^{(2)}$ denotes the number of beams for the second device.

At 2210, the first device may transmit in $K^{(1)}$ cycles a training sequence set using $K^{(1)}$ beams, as illustrated in FIG. 23A. Each training sequence from the training sequence set is known at the second device and may be based on a pair of Golay sequences. The transmissions in each cycle may comprises $K^{(2)}$ training sequences sent in the same beam of the first device and correspond to all possible beams of the second device. At 2220, the second device may receive, during each cycle, the training sequences using $K^{(2)}$ different beams. At 2230, based on received training sequences, at least one preferred beam direction for the second device may be determined, and at least one preferred beam direction for the first device may be determined. Preferred beams may be determined with respect to any combination of signal-quality or performance metrics. For certain aspects of the present disclosure, at 2210, $K^{(1)}$ training sequences in each cycle may be transmitted from the first device using $K^{(1)}$ different beams in each cycle. All $K^{(1)}$ training sequences within a cycle may be received at the second device with one out of $K^{(2)}$ beams. In every next cycle, a new beam may be employed at the second device, and after $K^{(2)}$ cycles all $K^{(2)}$ beams of the second device may be utilized.

At 2240, the second device may feed back information about at least one previously determined preferred beam direction for the first device by transmitting the feedback message using the preferred sector $S_{j^{(2)}}{}^{(2)}$ chosen in the sector-level training, as illustrated in FIG. 23B. At 2250, the first device may receive and decode information about at least one preferred beam direction using the preferred sector $S_{j^{(1)}}{}^{(1)}$ chosen in the sector-level training, as illustrated in FIG. 23B.

Upon completion of the feedback stage, both devices may know their preferred beam(s). The mapping stage may follow the feedback stage, as illustrated in FIG. 19 with the step 1930. In this stage, one device may map preferred beam(s) into high-resolution beams and may send related information to the other device. Upon successful reception of this information, the other device may feed back an acknowledgement message, as illustrated in FIG. 19 with the step 1940.

Figure 24:
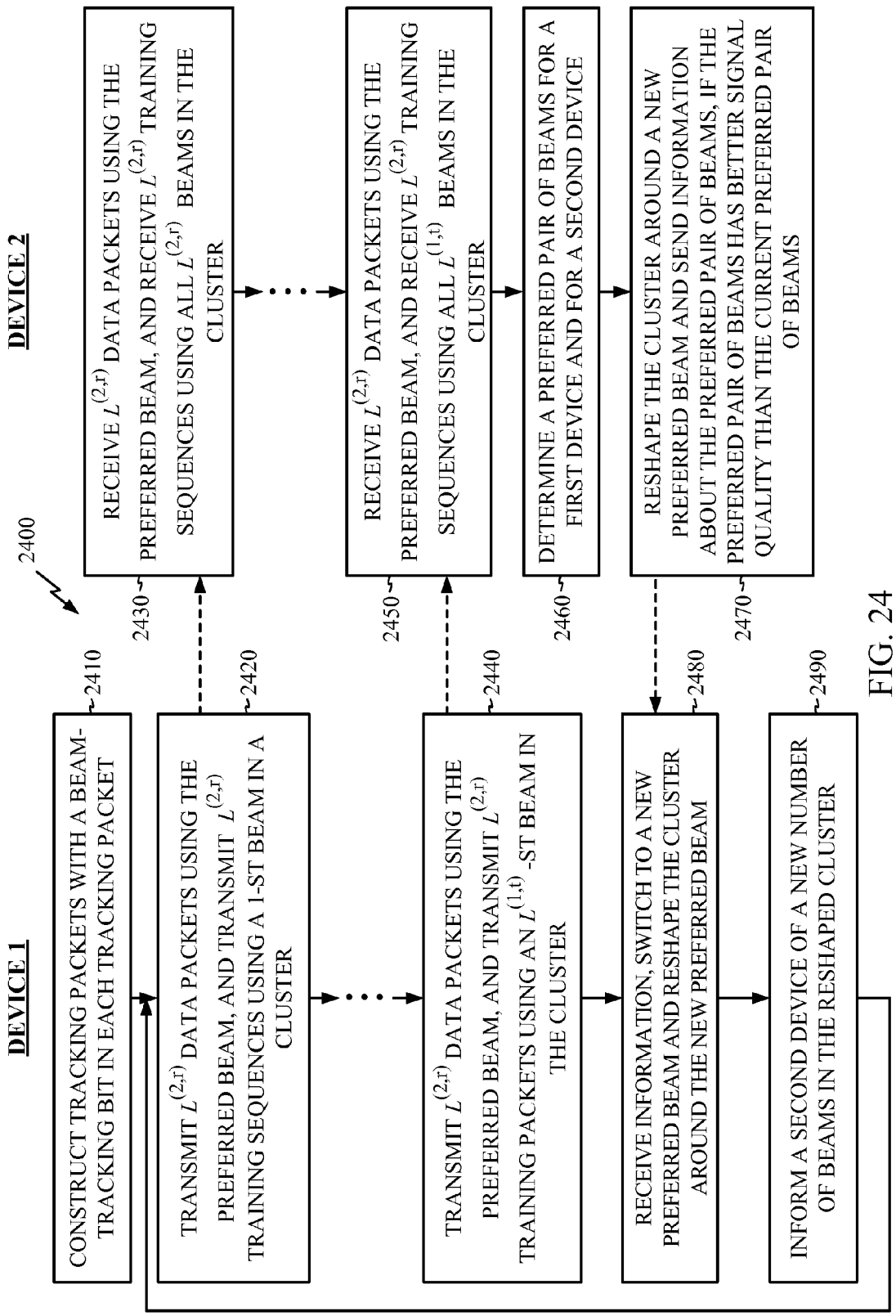
FIG. 24 illustrates example operations for beam-tracking in accordance with certain aspects of the present disclosure.
Figure 24A:
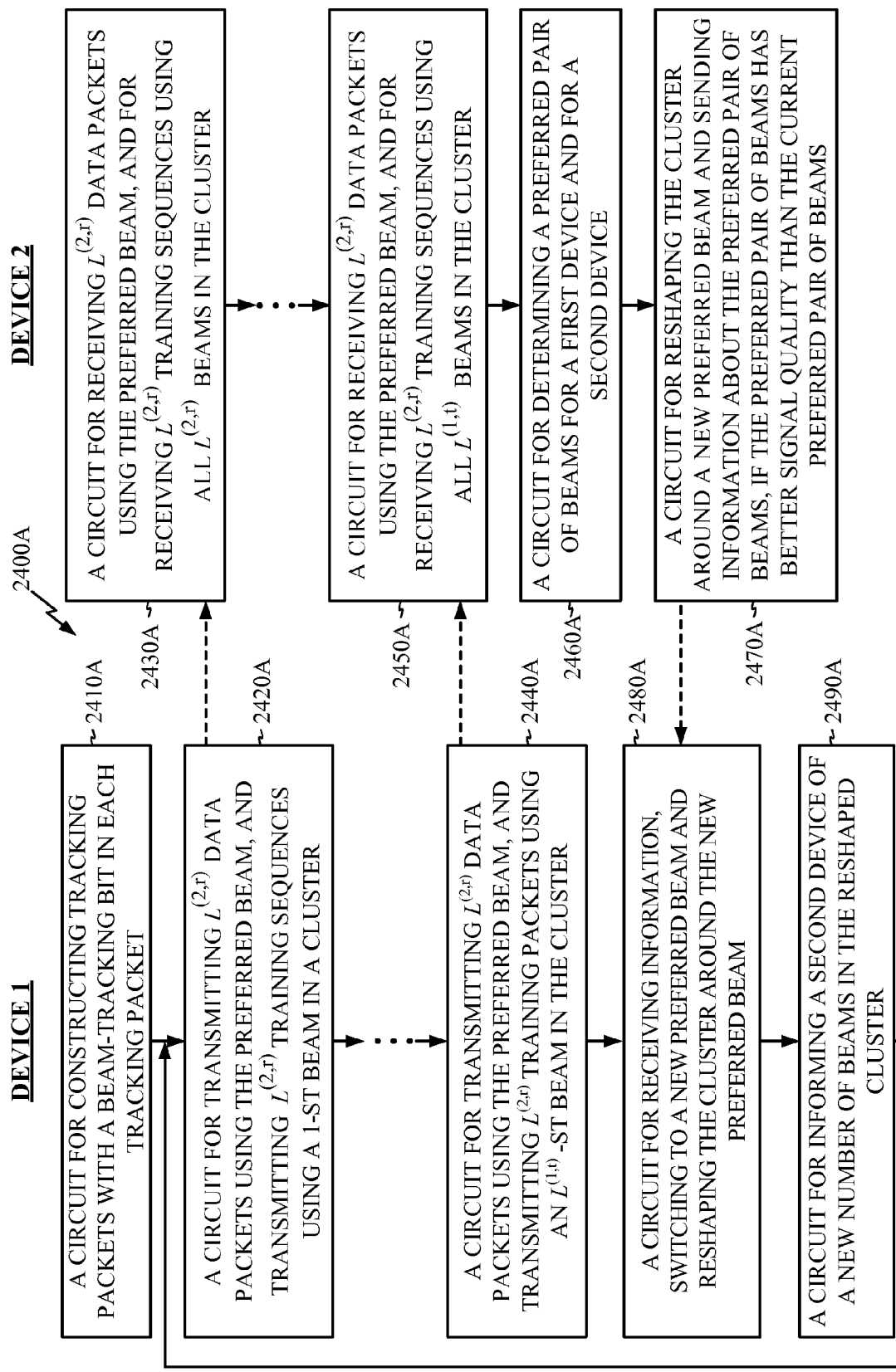
FIG. 24A illustrates example components capable of performing the operations illustrated in FIG. 24.
Figure 25:
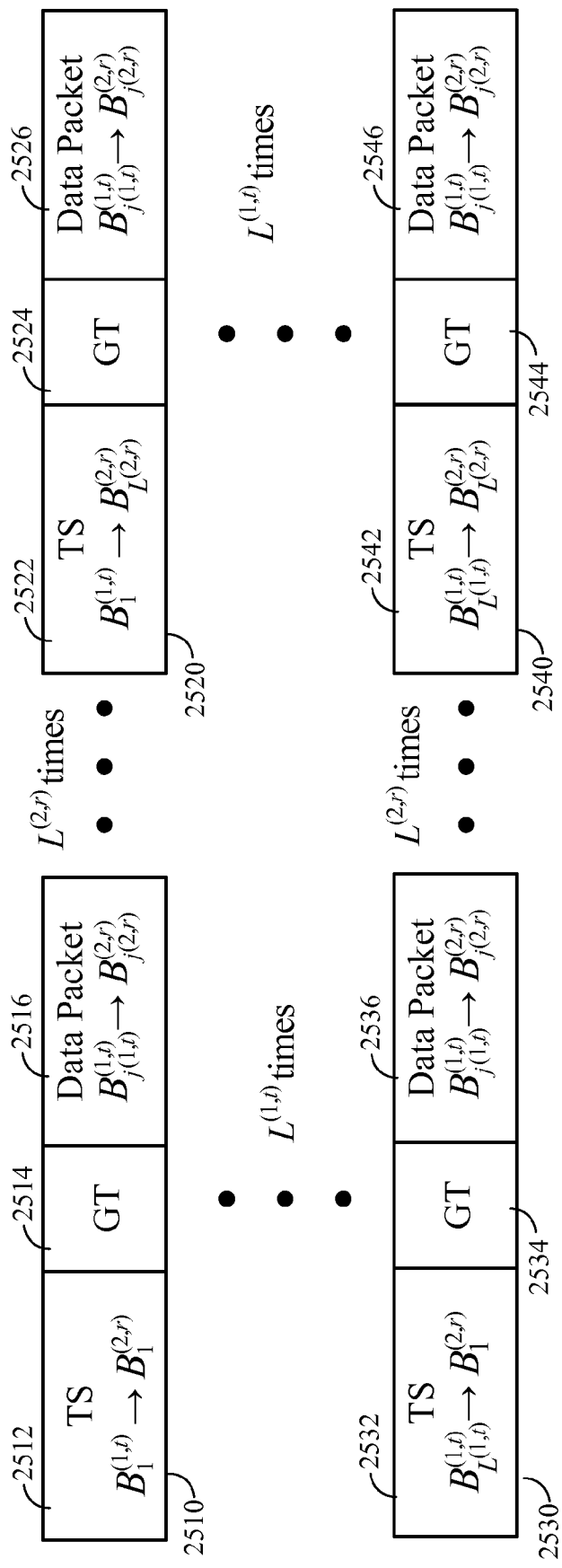
FIG. 25 illustrates a structure of data packet with tracking ability in accordance with certain aspects of the present disclosure.

FIG. 24 illustrates example operations 2400 for beam-tracking, and FIG. 25 illustrates a structure of packets with tracking ability. Operations 2400 may also correspond to step 1130 in FIG. 11. A first device may be configured to send data packets to a second device, wherein both the first device and the second device comprise antenna arrays. Operations 2400 can be applied for tracking of beams in the SAS, as well as for tracking of the preferred transmit beam and the preferred receive beam of the first device and the second device, respectively in the AAS. Terms 'first device' and 'second device' may be also swapped in this case, and operations 2400 can be applied for tracking of the preferred transmit beam and the preferred receive beam of the second device and the first device, respectively. Tracking procedure may be also performed on high-resolution beams providing the highest resolution for updating the preferred directions for transmission and reception.

At 2410, the first device may construct tracking packets with a beam-tracking bit in each tracking packet to indicate that each tracking packet contains a training sequence used for tracking. For example, a packet with its beam-tracking bit set to "1" may indicate that it is a tracking packet. One example of the packet structure is illustrated in FIG. 25. For example, a tracking packet 2510 that includes the beam tracking bit may comprise a training sequence (TS) 2512, followed by a Guard Time (GT) slot 2514, and a data packet 2516.

At 2420, the first device may transmit a plurality of $L^{(2,r)}$ tracking packets, where $L^{(2,r)}$ is a number of beams within a cluster of a second device. All $L^{(2,r)}$ data packets may be transmitted from the first device using the preferred beam $B_{j^{(1,t)}}{}^{(1,t)}$ (data packets 2516 and 2526 of the tracking packets 2510 and 2520, respectively in FIG. 25), and all $L^{(2,r)}$ training sequences may be transmitted using a beam $B_1^{(1,t)}$ within a cluster of the first device (training sequences 2512 and 2522 in FIG. 25). At 2430, the second device may receive $L^{(2,r)}$ data packets using the preferred beam $B_{j^{(2,r)}}{}^{(2,r)}$, and may receive $L^{(2,r)}$ training sequences using all $L^{(2,r)}$ beams within the cluster.

This process may be repeated for each beam in the cluster of the first device. After $L^{(1,t)}$ cycles, where $L^{(1,t)}$ is a total number of beams in the cluster of the first device, the first device may transmit, at 2440, $L^{(2,r)}$ data packets using the preferred beam $B_{j^{(1,t)}}{}^{(1,t)}$ (data packets 2536 and 2546 of the tracking packets 2530 and 2540, respectively in FIG. 25), and all $L^{(2,r)}$ training sequences may be transmitted using a beam $B_{L^{(1,t)}}{}^{(1,t)}$ within the cluster (training sequences 2532 and 2542 in FIG. 25). Following that, at 2450, the second device may receive $L^{(2,r)}$ data packets using the preferred beam $B_{j^{(2,r)}}^{(2,r)}$, and may receive $L^{(2,r)}$ training sequences using all $L^{(2,r)}$ beams in the cluster.

At 2460, the second device may determine a preferred pair of beams for the first device and for the second device. If this particular pair of beams has better signal quality than the current preferred pair of beams used for data transmission/reception, then, at 2470, the second device may reshape the cluster around a new preferred beam and send feedback information to the first device about the preferred pair of beams. At 2480, the first device may receive information about the preferred pair of beams, may switch to a new preferred beam for data transmission, and may reshape the cluster around the new preferred beam. At 2490, the first device may inform the second device about a new number of beams in the reshaped cluster of the first device. Steps 2420-2490 may be repeated for a plurality of sets of tracking packets.

The scope of the disclosure should not be interpreted as being limited to the array processing aspects illustrated herein. Rather, the Applicants anticipate that alternative aspects may comprise antenna arrays with more than eight elements along a particular axis and antenna arrays comprising antennas with a plurality of polarizations, and that such antenna-array configurations fall within the scope of the disclosure. In one aspect, two dipole antennas with orthogonal linear polarizations may be employed together to produce a quasi-omni pattern.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 610-640, 710-730, 1110-1130, 1210-1240, 1302-1320, 1510-1550, 1810-1840, 1910-1940, 2002-2020, 2210-2250, 2410-2490, 2610-2630, 2710-2750, and 2810-2830, illustrated in FIGS. 6, 7, 11, 12, 13, 15, 18, 19, 20, 22, 24, 26, 27, and 28 correspond to circuit blocks 610A-640A, 710A-730A, 1110A-1130A, 1210A-1240A, 1302A-1320A, 1510A-1550A, 1810A-1840A, 1910A-1940A, 2002A-2020A, 2210A-2250A, 2410A-2490A, 2610A-2630A, 2710A-2750A, and 2810A-2830A, illustrated in FIGS. 6A, 7A, 11A, 12A, 13A, 15A, 18A, 19A, 20A, 22A, 24A, 26A, 27A, and 28A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Storage media that may be used include random access memory (RAM), read only memory (ROM), flash memory, EPROM memory, EEPROM memory, registers, a hard disk, a removable disk, and a CD-ROM. The computer readable medium does not include a carrier wave, which may take the form of electrical, electromagnetic, or optical signal. Software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point or other type of wireless device with processing logic and elements to perform the techniques provided herein.

The invention claimed is:

1. A method for wireless communications, comprising:
   receiving beamforming capability information from a device either directly or via a piconet controller (PNC);
   receiving training signals using a first subset of a first set of codebooks;
   employing a second subset of the first set of codebooks to acquire channel state information (CSI), wherein the second subset is same or different than the first subset;
   estimating a first preferred vector of weights from the first subset and a second preferred vector of weights from the second subset;
   providing, as a feedback to the device, the first preferred vector of weights; and
   using the second preferred vector of weights to communicate with the device on a receive direction from a set of receive directions, wherein
   the beamforming capability information comprises an indication if codebooks are used for beamforming, a total number of N transmit antennas, and a total number of M transmit directions from a first set of transmit directions,
   the first set of codebooks is employed for transmitting the training signals using transmit directions from the first set of transmit directions, and
   the first set of codebooks is represented in a matrix form for the total of N transmit antennas and the total of M transmit directions from the first set of transmit directions as:

$$W(n,m) = j^{fix\left[\frac{n \times mod(m+(M/2),M)}{(M/4)}\right]} \text{ for } n = 0: N-1 \text{ and } m = 0: M-1$$

wherein fix(•) is a function that returns the integer part of its argument.

2. The method of claim 1, wherein the first preferred vector of weights from the first subset of the first set of codebooks and the second preferred vector of weights from the second subset of the first set of codebooks are determined based on a signal-quality metric.

3. The method of claim 2, wherein the signal-quality metric comprises an effective signal-to-noise ratio (ESNR) at the device.

4. A method for wireless communications, comprising:
   receiving beamforming capability information from a device either directly or via a piconet controller (PNC), wherein the beamforming capability information comprises an indication if codebooks are used for beamforming, a total number of N transmit antennas, and a total number of M transmit directions from a first set of transmit directions
   receiving training signals using a first subset of a first set of codebooks;
   employing a second subset of the first set of codebooks to acquire channel state information (CSI), wherein the second subset is same or different than the first subset;
   estimating a first preferred vector of weights from the first subset and a second preferred vector of weights from the second subset;
   providing, as a feedback to the device, the first preferred vector of weights; and
   using the second preferred vector of weights to communicate with the device on a receive direction from a set of receive directions,
   wherein a second set of codebooks is employed for transmitting the training signals using transmit directions from a second set of transmit directions, wherein transmit directions from the first set of transmit directions have higher resolution than transmit directions from the second set of transmit directions, and
   wherein the second set of codebooks is represented in a matrix form for the total number of N transmit antennas, N is an even number and P=N/2 transmit directions from the second set of transmit directions as:

$$W(n,m) = \begin{cases} (-j)^{mod(n,2)} & m = 0 \\ (-1)^{fix\left[\frac{n \times mod(m+(P/2),P)}{(P/2)}\right]} & n = 0: N-1 \ m = 1: P-1 \end{cases}$$

wherein each transmit direction from the second set of transmit directions comprises two transmit directions from the first set of transmit directions of a codebook from a first set of codebooks having N transmit directions from the first set of transmit directions, and wherein fix(•) is a function that returns the integer part of its argument.

5. The method of claim 1, wherein at least a part of each training signal is based on Golay sequences.

6. An apparatus for wireless communications, comprising:
   a receiver for receiving training signals using a first subset of a first set of codebooks and receiving beamforming capability information from a device either directly or via a piconet controller (PNC);
   a circuit for employing a second subset of the first set of codebooks to acquire channel state information (CSI), wherein the second subset is same or different than the first subset;
   an estimator for estimating a first preferred vector of weights from the first subset and a second preferred vector of weights from the second subset;
   a circuit for providing, as a feedback to the device, the first preferred vector of weights; and a circuit for using the second preferred vector of weights to communicate with the device on a receive direction from a set of receive directions, wherein the beamforming capability information comprises an indication if codebooks are used for beamforming, a total number of N transmit antennas, and a total number of M transmit directions from a first set of transmit directions, the first set of codebooks is employed for transmitting the training signals using transmit directions from the first set of transmit directions, and the first set of codebooks is represented in a matrix form for the total of N transmit antennas and the total of M transmit directions from the first set of transmit directions as:

$$W(n, m) = j^{fix\left[\frac{n \times mod(m+(M/2),M)}{(M/4)}\right]} \text{ for } n = 0: N-1 \text{ and } m = 0: M-1$$

wherein fix(•) is a function that returns the integer part of its argument.

7. The apparatus of claim 6, wherein the first preferred vector of weights from the first subset of the first set of codebooks and the second preferred vector of weights from the second subset of the first set of codebooks are determined based on a signal-quality metric.

8. The apparatus of claim 7, wherein the signal-quality metric comprises an effective signal-to-noise ratio (ESNR) at the device.

9. An apparatus for wireless communications, comprising:
a receiver for receiving training signals using a first subset of a first set of codebooks and receiving beamforming capability information from a device either directly or via a piconet controller (PNC), wherein the beamforming capability information comprises an indication if codebooks are used for beamforming, a total number of N transmit antennas, and a total number of M transmit directions from a first set of transmit directions;

a circuit for employing a second subset of the first set of codebooks to acquire channel state information (CSI), wherein the second subset is same or different than the first subset;

an estimator for estimating a first preferred vector of weights from the first subset and a second preferred vector of weights from the second subset;

a circuit for providing, as a feedback to the device, the first preferred vector of weights; and a circuit for using the second preferred vector of weights to communicate with the device on a receive direction from a set of receive directions, wherein a second set of codebooks is employed for transmitting the training signals using transmit directions from a second set of transmit directions, wherein transmit directions from the first set of transmit directions have higher resolution than transmit directions from the second set of transmit directions, and wherein the second set of codebooks is represented in a matrix form for the total number of N transmit antennas, N is an even number and P=N/2 transmit directions from the second set of transmit directions as:

$$W(n, m) = \begin{cases} (-j)^{mod(n,2)} & m = 0 \\ (-1)^{fix\left[\frac{n \times mod(m+(P/2),P)}{(P/2)}\right]} & n = 0: N-1 \ m = 1: P-1 \end{cases}$$

wherein each transmit direction from the second set of transmit directions comprises two transmit directions from the first set of transmit directions of a codebook from a first set of codebooks having N transmit directions from the first set of transmit directions, and wherein fix(•) is a function that returns the integer part of its argument.

10. The apparatus of claim 6, wherein at least a part of each training signal is based on Golay sequences.

11. An apparatus for wireless communications, comprising:
means for receiving training signals using a first subset of a first set of codebooks and receiving beamforming capability information from a device either directly or via a piconet controller (PNC);

means for employing a second subset of the first set of codebooks to acquire channel state information (CSI), wherein the second subset is same or different than the first subset;

means for estimating a first preferred vector of weights from the first subset and a second preferred vector of weights from the second subset;

means for providing, as a feedback to the device, the first preferred vector of weights; and means for using the second preferred vector of weights to communicate with the device on a receive direction from a set of receive directions, wherein the beamforming capability information comprises an indication if codebooks are used for beamforming, a total number of N transmit antennas, and a total number of M transmit directions from a first set of transmit directions, the first set of codebooks is employed for transmitting the training signals using transmit directions from the first set of transmit directions, and the first set of codebooks is represented in a matrix form for the total of N transmit antennas and the total of M transmit directions from the first set of transmit directions as:

$$W(n, m) = j^{fix\left[\frac{n \times mod(m+(M/2),M)}{(M/4)}\right]} \text{ for } n = 0: N-1 \text{ and } m = 0: M-1$$

wherein fix(•) is a function that returns the integer part of its argument.

12. The apparatus of claim 11, wherein the first preferred vector of weights from the first subset of the first set of codebooks and the second preferred vector of weights from the second subset of the first set of codebooks are determined based on a signal-quality metric.

13. The apparatus of claim 12, wherein the signal-quality metric comprises an effective signal-to-noise ratio (ESNR) at the device.

14. An apparatus for wireless communications, comprising:
means for receiving training signals using a first subset of a first set of codebooks and receiving beamforming capability information from a device either directly or via a piconet controller (PNC), wherein the beamforming capability information comprises an indication if codebooks are used for beamforming, a total number of N transmit antennas, and a total number of M transmit directions from a first set of transmit directions;

means for employing a second subset of the first set of codebooks to acquire channel state information (CSI), wherein the second subset is same or different than the first subset;

means for estimating a first preferred vector of weights from the first subset and a second preferred vector of weights from the second subset;

means for providing, as a feedback to a device, the first preferred vector of weights; and means for using the second preferred vector of weights to communicate with the device on a receive direction from a set of receive directions, wherein a second set of codebooks is employed for transmitting the training signals using transmit directions from a second set of transmit directions, wherein transmit directions from the first set of transmit directions have higher resolution than transmit directions from the second set of transmit directions, and wherein the second set of codebooks is represented in a matrix form for the total number of N transmit antennas, N is an even number and P=N/2 transmit directions from the second set of transmit directions as:

$$W(n,m) = \begin{cases} (-j)^{mod(n,2)} & m = 0 \\ (-1)^{fix\left[\frac{n \times mod(m+(P/2),P)}{(P/2)}\right]} & n = 0: N-1 \ m = 1: P-1 \end{cases}$$

wherein each transmit direction from the second set of transmit directions comprises two transmit directions from the first set of transmit directions of a codebook from a first set of codebooks having N transmit directions from the first set of transmit directions, and wherein fix(•) is a function that returns the integer part of its argument.

15. The apparatus of claim 11, wherein at least a part of each training signal is based on Golay sequences.

16. A computer-program product for wireless communications, comprising a computer readable storage medium encoded with instructions executable to:

receive training signals using a first subset of a first set of codebooks;

receive beamforming capability information from a device either directly or via a piconet controller (PNC);

employ a second subset of the first set of codebooks to acquire channel state information (CSI), wherein the second subset is same or different than the first subset;

estimate a first preferred vector of weights from the first subset and a second preferred vector of weights from the second subset;

provide, as a feedback to the device, the first preferred vector of weights; and use the second preferred vector of weights to communicate with the device on a receive direction from a set of receive directions, wherein the beamforming capability information comprises an indication if codebooks are used for beamforming, a total number of N transmit antennas, and a total number of M transmit directions from a first set of transmit directions, the first set of codebooks is employed for transmitting the training signals using transmit directions from the first set of transmit directions, and the first set of codebooks is represented in a matrix form for the total of N transmit antennas and the total of M transmit directions from the first set of transmit directions as:

$$W(n,m) = j^{fix\left[\frac{n \times mod(m+(M/2),M)}{(M/4)}\right]} \text{ for } n = 0: N-1 \text{ and } m = 0: M-1$$

wherein fix(•) is a function that returns the integer part of its argument.

17. An access point, comprising:

at least one antenna;

a receiver for receiving via the at least one antenna training signals using a first subset of a first set of codebooks and receiving beamforming capability information from a device either directly or via a piconet controller (PNC);

a circuit for employing a second subset of the first set of codebooks to acquire channel state information (CSI), wherein the second subset is same or different than the first subset;

an estimator for estimating a first preferred vector of weights from the first subset and a second preferred vector of weights from the second subset;

a circuit for providing, as a feedback to the device, the first preferred vector of weights; and a circuit for using the second preferred vector of weights to communicate with the device on a receive direction from a set of receive directions, wherein the beamforming capability information comprises an indication if codebooks are used for beamforming, a total number of N transmit antennas, and a total number of M transmit directions from a first set of transmit directions, the first set of codebooks is employed for transmitting the training signals using transmit directions from the first set of transmit directions, and the first set of codebooks is represented in a matrix form for the total of N transmit antennas and the total of M transmit directions from the first set of transmit directions as:

$$W(n,m) = j^{fix\left[\frac{n \times mod(m+(M/2),M)}{(M/4)}\right]} \text{ for } n = 0: N-1 \text{ and } m = 0: M-1$$

wherein fix(•) is a function that returns the integer part of its argument.

18. A method for wireless communications, comprising:

transmitting beamforming capability information to a device either directly or via a piconet controller (PNC);

transmitting training signals using a first subset of a first set of codebooks;

receiving, as a feedback from the device, a first preferred vector of weights; and using the first preferred vector of weights to communicate with the device on a transmit direction from a first set of transmit directions, wherein the beamforming capability information comprises an indication if codebooks are used for beamforming, a total number of N transmit antennas, and a total number of M transmit directions from the first set of transmit directions, the first set of codebooks is employed for transmitting the training signals using transmit directions from the first set of transmit directions, and the first set of codebooks is represented in a matrix form for a total of N transmit antennas and a total of M transmit directions from the first set of transmit directions as:

$$W(n,m) = j^{fix\left[\frac{n \times mod(m+(M/2),M)}{(M/4)}\right]} \text{ for } n = 0: N-1 \text{ and } m = 0: M-1$$

wherein fix(•) is a function that returns the integer part of its argument.

19. An apparatus for wireless communications, comprising:
- a transmitter for transmitting training signals using a first subset of a first set of codebooks and transmitting beamforming capability information to a device either directly or via a piconet controller (PNC);
- a receiver for receiving, as a feedback from the device, a first preferred vector of weights; and
- a circuit for using the first preferred vector of weights to communicate with the device on a transmit direction from a first set of transmit directions, wherein
- the beamforming capability information comprises an indication if codebooks are used for beamforming, a total number of N transmit antennas, and a total number of M transmit directions from the first set of transmit directions,
- the first set of codebooks is employed for transmitting the training signals using transmit directions from the first set of transmit directions, and
- the first set of codebooks is represented in a matrix form for a total of N transmit antennas and a total of M transmit directions from the first set of transmit directions as:

$$W(n,m) = j^{fix\left[\frac{n \times mod(m+(M/2),M)}{(M/4)}\right]}$$

for $n = 0:N-1$ and $m = 0:M-1$ wherein fix(•) is a function that returns the integer part of its argument.

20. An apparatus for wireless communications, comprising:
- means for transmitting training signals using a first subset of a first set of codebooks and transmitting beamforming capability information to a device either directly or via a piconet controller (PNC);
- means for receiving, as a feedback from the device, a first preferred vector of weights; and
- means for using the first preferred vector of weights to communicate with the device on a transmit direction from a first set of transmit directions, wherein
- the beamforming capability information comprises an indication if codebooks are used for beamforming, a total number of N transmit antennas, and a total number of M transmit directions from the first set of transmit directions,
- the first set of codebooks is employed for transmitting the training signals using transmit directions from the first set of transmit directions, and
- the first set of codebooks is represented in a matrix form for a total of N transmit antennas and a total of M transmit directions from the first set of transmit directions as:

$$W(n,m) = j^{fix\left[\frac{n \times mod(m+(M/2),M)}{(M/4)}\right]}$$

for $n = 0:N-1$ and $m = 0:M-1$ wherein fix(•) is a function that returns the integer part of its argument.

21. A computer-program product for wireless communications, comprising a computer readable storage medium encoded with instructions executable to:
- transmit beamforming capability information to a device either directly or via a piconet controller (PNC);
- transmit training signals using a first subset of a first set of codebooks;
- receive, as a feedback from the device, a first preferred vector of weights; and
- use the first preferred vector of weights to communicate with the device on a transmit direction from a first set of transmit directions, wherein
- the beamforming capability information comprises an indication if codebooks are used for beamforming, a total number of N transmit antennas, and a total number of M transmit directions from the first set of transmit directions,
- the first set of codebooks is employed for transmitting the training signals using transmit directions from the first set of transmit directions, and
- the first set of codebooks is represented in a matrix form for a total of N transmit antennas and a total of M transmit directions from the first set of transmit directions as:

$$W(n,m) = j^{fix\left[\frac{n \times mod(m+(M/2),M)}{(M/4)}\right]}$$

for $n = 0:N-1$ and $m = 0:M-1$ wherein fix(•) is a function that returns the integer part of its argument.

22. An access point, comprising:
- at least one antenna;
- a transmitter for transmitting via the at least one antenna training signals using a first subset of a first set of codebooks and transmitting beamforming capability information to a device either directly or via a piconet controller (PNC);
- a receiver for receiving via the at least one antenna, as a feedback from the device, a first preferred vector of weights; and
- a circuit for using the first preferred vector of weights to communicate with the device on a transmit direction from a first set of transmit directions, wherein
- the beamforming capability information comprises an indication if codebooks are used for beamforming, a total number of N transmit antennas, and a total number of M transmit directions from the first set of transmit directions,
- the first set of codebooks is employed for transmitting the training signals using transmit directions from the first set of transmit directions, and
- the first set of codebooks is represented in a matrix form for a total of N transmit antennas and a total of M transmit directions from the first set of transmit directions as:

$$W(n,m) = j^{fix\left[\frac{n \times mod(m+(M/2),M)}{(M/4)}\right]}$$

for $n = 0:N-1$ and $m = 0:M-1$ wherein fix(•) is a function that returns the integer part of its argument.

* * * * *